US009541718B2

(12) United States Patent
Ogura et al.

(10) Patent No.: US 9,541,718 B2
(45) Date of Patent: Jan. 10, 2017

(54) PHOTOELECTRIC HYBRID DEVICE AND METHOD FOR MANUFACTURING SAME

(71) Applicant: Photonics Electronics Technology Research Association, Tokyo (JP)

(72) Inventors: Ichiro Ogura, Tokyo (JP); Koichi Takemura, Tokyo (JP); Mitsuru Kurihara, Tokyo (JP); Toshinori Uemura, Tokyo (JP); Akio Ukita, Tokyo (JP); Kazuhiko Kurata, Tokyo (JP)

(73) Assignee: PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

(21) Appl. No.: 14/781,249

(22) PCT Filed: Mar. 20, 2014

(86) PCT No.: PCT/JP2014/057783
§ 371 (c)(1),
(2) Date: Sep. 29, 2015

(87) PCT Pub. No.: WO2014/156962
PCT Pub. Date: Oct. 2, 2014

(65) Prior Publication Data
US 2016/0062063 A1 Mar. 3, 2016

(30) Foreign Application Priority Data

Mar. 29, 2013 (JP) ................................ 2013-071843
Aug. 23, 2013 (JP) ................................ 2013-173031
Oct. 21, 2013 (JP) ................................ 2013-218315

(51) Int. Cl.
*G02B 6/12* (2006.01)
*G02B 6/13* (2006.01)
(Continued)

(52) U.S. Cl.
CPC ......... *G02B 6/4251* (2013.01); *G02B 6/12004* (2013.01); *G02B 6/138* (2013.01);
(Continued)

(58) Field of Classification Search
CPC .... G02B 6/12004; G02B 6/138; G02B 6/4251
See application file for complete search history.

(56) References Cited

U.S. PATENT DOCUMENTS 6,529,668 B1  3/2003  Canning
7,394,952 B1  7/2008  Ueno et al.
(Continued)

FOREIGN PATENT DOCUMENTS

JP  2006-227042 A  8/2006
JP  2008-299180 A  12/2008
(Continued)

OTHER PUBLICATIONS

Paul Duran, "Blazar 40 Gbps Optical Active Cable", Jul. 2008, pp. 1-13 (13 sheets), Luxtera, Inc., USA.
(Continued)

*Primary Examiner* — Omar R Rojas
(74) *Attorney, Agent, or Firm* — Michael Best & Friedrich LLP

(57) ABSTRACT

A photoelectric hybrid device includes an optical connector on a flat optical surface at one end of vertical optical waveguides for inputting and outputting an optical signal. Integration of the photoelectric hybrid device into an interposer or the like is standardized. The photoelectric hybrid device includes: conductive pins connected to an electric signal pathway for a photoelectric hybrid substrate; a translucent member having a flat optical surface and a translucent part; and self-organizing optical waveguides that form an optical path between the translucent part and an optical waveguide. The flat optical surface is not lower than the tops (Continued)

of the electrical connection parts on the conductive pins. Collision of the optical connector and the tops of the electrical connection parts can be avoided when an optical connector on which an optical waveguide that transmits an optical signal among the optical waveguides.

42 Claims, 37 Drawing Sheets

(51) Int. Cl.
  *G02B 6/42* (2006.01)
  *G02B 6/138* (2006.01)
  *G02B 6/30* (2006.01)

(52) U.S. Cl.
  CPC ............ *G02B 6/305* (2013.01); *G02B 6/423* (2013.01); *G02B 6/4207* (2013.01); *G02B 6/428* (2013.01); *G02B 6/4248* (2013.01); *G02B 6/4279* (2013.01); *G02B 6/4292* (2013.01); *G02B 6/425* (2013.01); *G02B 6/4214* (2013.01)

(56) References Cited

U.S. PATENT DOCUMENTS

| | | |
|---|---|---|
| 2005/0135732 A1 | 6/2005 | Crow et al. |
| 2005/0269586 A1 | 12/2005 | Gardner et al. |
| 2010/0142896 A1 | 6/2010 | Riester et al. |
| 2012/0155797 A1* | 6/2012 | Zhang .................... G02B 6/122 385/14 |

FOREIGN PATENT DOCUMENTS

| | | |
|---|---|---|
| JP | 2009-175475 A | 8/2009 |
| JP | 2009-536362 A | 10/2009 |
| JP | 2013003177 A | 1/2013 |
| WO | WO-2012/073441 A1 | 6/2012 |

OTHER PUBLICATIONS

Thierry Pinguet et al., "Silicon Photonics Multicore Transceivers", 2012 IEEE Photonics Society Summer Topical Meeting Series, Jul. 2012, pp. 238-239 (2 sheets), IEEE, USA.

Adithyaram Narasimha et al., "An Ultra Low Power CMOS Photonics Technology Platform for H/S Optoelectronic Transceivers at less than $1 per Gbps", Optical Fiber Communication (OFC) 2010, Mar. 2010, OMV4, pp. 1-3 (3 sheets), IEEE, USA.

Drew Guckenberger et al., "Advantages of CMOS Photonics for Future Transceiver Applications", ECOC 2010 (Italy), Sep. 2010, Tu.4.C.2., pp. 1-6 (6 sheets), IEEE, USA.

Yutaka Urino et al., "Demonstration of 12.5-Gbps optical interconnects integrated with lasers, optical splitters, optical modulators, and photodetectors on single silicon substrate", Optics Express, vol. 20, Issue 26 (https://www.osapublishing.org/oe/fulltext.cfm?uri=oe-20-26-B256&id=246439), Dec. 10, 2012, pp. B256-B2636 (8 sheets), Optical Society of America, USA.

Krishnamurthy, "The Luxtera CMOS Integrated Photonic Chip in a Molex Cable", www.chipworks.com/blog/technologyblog/2012/12/03, Dec. 3, 2012, Technology Blog, (7 sheets), Chipworks Inc.

International Search Report issued in Application No. PCT/JP2014/057783, mailed Jul. 1, 2014.

Extended Search Report issued in European Patent Application No. 14775978.1, dated Nov. 8, 2016.

* cited by examiner

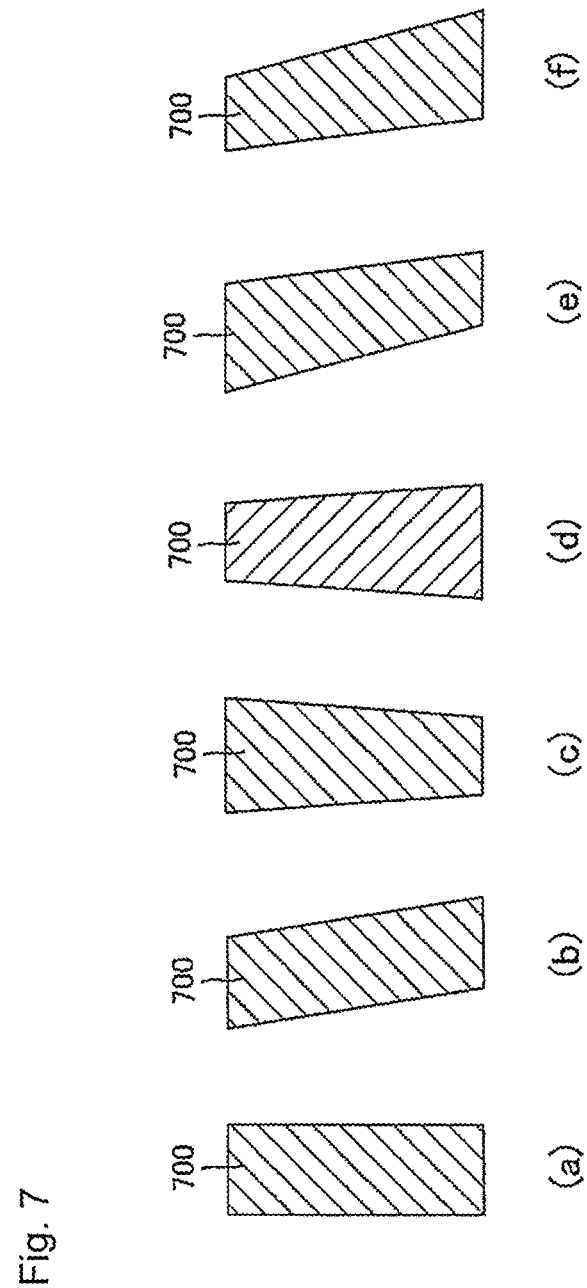

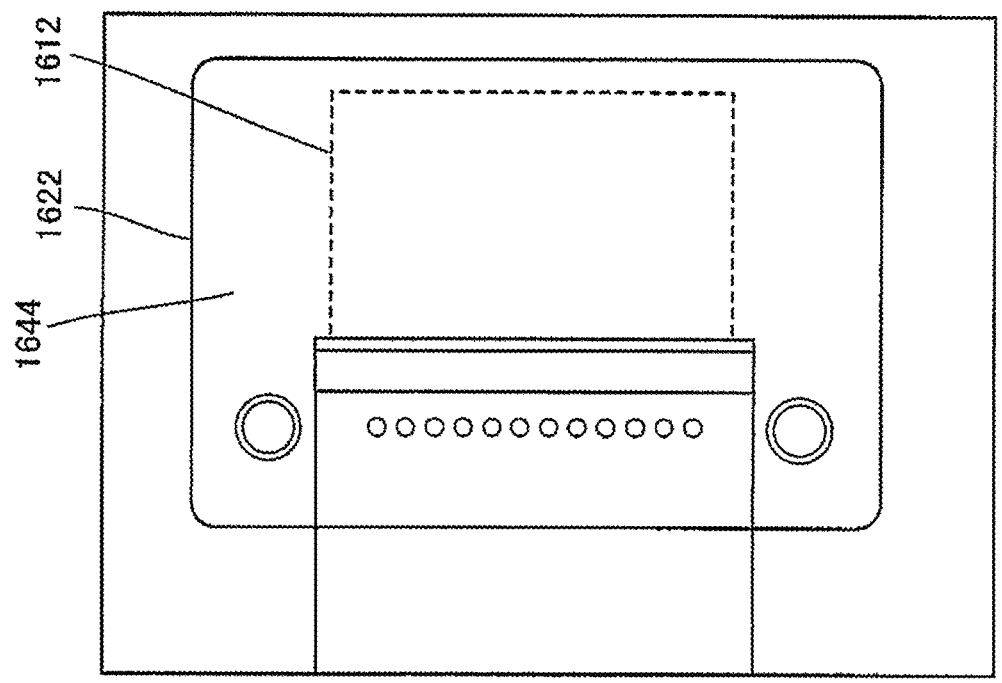
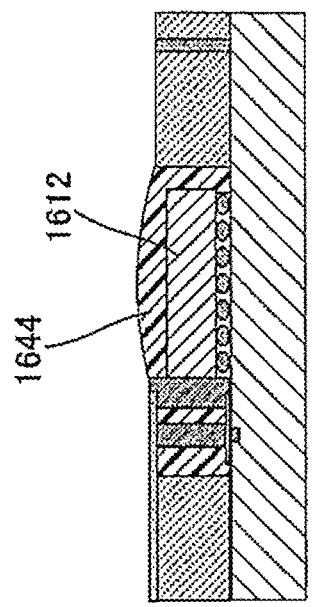
Fig. 24

PHOTOELECTRIC HYBRID DEVICE AND METHOD FOR MANUFACTURING SAME

TECHNICAL FIELD

The present invention relates to a photoelectric hybrid device and a method for manufacturing the device that converts an electric signal to an optical signal and/or an optical signal to an electric signal, and is suitable to be used as a signal conversion element to be incorporated into a module for data communication, such as an interposer, an AOC (Active Optical Cable) circuit board, and so on.

BACKGROUND ART

In recent years, in the connection between boards, between computers, between peripheral devices and so on, problems such as delay of signals, generation of heat, generation of EMI (electromagnetic noise) and so on due to electrical wiring are coming to surface. For solving these problems that occur in the electrical wiring, optical interconnection that uses silicon photonics techniques is being developed (refer to Non-patent-related Documents 1, 2, and 3). In this regard, it is interpreted that the silicon photonics means an optical device technique that uses silicon as a material, and that the optical interconnection means a technique for communicating signals by converting an electric signal from an external device to an optical signal and/or converting an optical signal to an electric signal, and transmitting the optical signal or the electric signal to another external device or the like. The optical interconnection is an innovative technique for eliminating problems relating to the electrical wiring, such as delay of a signal due to parasitic capacitance, deterioration of signal due to instable grounding, EMI radiation from an electrical line and so on. However, specifications of the constructions for inputting/outputting optical signals and electric signals and so on are often unique to the constructions respectively, that is, the specifications are not standardized.

For realizing the optical interconnection, some suggestions regarding a photoelectric hybrid device that mixedly loads optical circuits and electronic parts on a circuit board have been proposed (for example, refer to the "Background Art" section of Patent-related Document 1, FIG. 13 of Patent-related Document 2, etc.).

For example, regarding a device relating to a chip-type optical transceiver using a silicon photonics, a silicon photo-chip provided from Luxtera, that is installed on a printed circuit board (PCB) available from Molex, is available. The silicon photo-chip is an optical transceiver (refer to page 11 of Non-patent-related Document 3), and it is constructed in such a manner that an electric signal and an optical signal are to be inputted into and outputted from the upper surface of the chip. The silicon photo-chip of Luxtera and the PCB of Molex are electrically connected by wire-bonding; and optical fibers for communicating optical signals are directly adhered to the top part of a silicon CMOS chip by use of an epoxy resin (refer to Non-patent-related Document 2).

In prior art, as an elemental technology for fabricating a photoelectric hybrid device, a technique of a self-forming optical waveguide has been known. In the self-forming optical waveguide technique, by allowing light having a photosensitive wavelength for a photocurable resin to propagate through the resin, a part in the resin through which the light propagated is cured and made to be an optical waveguide core (for example, refer to Patent-related Document 2). An example implementation of a photoelectric hybrid device 29400, which may be fabricated by use of such a prior-art self-forming optical waveguide technique, is shown in FIG. 32. A photodetector 29450 is placed on a substrate 29410 in such a manner that the light receiving surface of the photodetector 29450 faces upward. An optical waveguide core 29420, which may be made of photocurable resin, is formed on the top part of the photodetector 29450 in such a manner that the optical waveguide core 29420 is vertical to the substrate 29410 and extends upwardly from the light receiving surface of the photodetector 29450. The part around the optical waveguide core 29420 is covered by a resin that acts as a clad layer 29430. A 45-degree mirror 29460 is placed above the upper end surface of the optical waveguide core 29420, and an optical fiber 29470 is placed at a position that is above the clad layer 29430 and beside the 45-degree mirror 29460. In such an implementation, an optical path of an optical signal that has been transmitted via the optical fiber 29470 is vertically bended by the 45-degree mirror 29460 toward the substrate 29410. As a result, the optical signal enters the optical waveguide core 29420 and propagates therethrough, and the photodetector 29450 receives the propagated optical signal.

FIGS. 33A and 33B illustrate an example of a method for fabricating the optical waveguide core 29420 formed of a photocurable resin (refer to FIG. 2 of Patent-related Document 2). First, a photocurable resin 29422 is supplied onto the substrate 29410 (the photodetector is not shown), and a mask 29510 for forming an optical waveguide core is placed on the photocurable resin 29422. The mask 29510 comprises a glass plate 29514 and a chrome film 29516 formed on one of the surfaces of the glass plate 29514 except for an area for an opening 29512. Next, the photocurable resin 29422 is irradiated by a light 29520 having a photosensitive wavelength for the photocurable resin 29422 (for example, UV light) via the mask 29510 (FIG. 33A). By the light passing through the opening 29512 and propagating through the photocurable resin, a part of the photocurable resin through which the light propagates is cured and the optical waveguide core 29420 is consequently formed (FIG. 33B). Next, an uncured portion of the photocurable resin 29422 is washed and removed by a developing solution. Further, a resin 29430 for a clad layer is filled in the space around the optical waveguide core 29420.

CITATION LIST

Patent-Related Documents

Patent-related Document 1: JP Patent Application Public Disclosure No. 2009-536362

Patent-related Document 2: JP Patent Application Public Disclosure No. 2008-299180

Non-Patent-Related Documents

Non-patent-related Document 1: "Demonstration of 12.5-Gbps optical interconnects integrated with lasers, optical splitters, optical modulators and photodetectors on a single silicon substrate," OPTICS EXPRESS, Vol. 20, No, 26, Dec. 12, 2012, B256-B263

Non-patent-related Document 2: "The Luxtera CMOS Integrated Photonic Chip in a Molex Cable," URL: http://www.chipworks.com/blog/technologyblog/2012/12/03/the-luxtera-cmos-integrated-photonic-chip-in-a-molex-cable/

Non-patent-related Document 3: "Blazar 40 GbpsOptical Active Cable," URL: http://www.datcominc.com/picture_library/upload/Luxtera/Blazar %2040 Gbps%20Optical %20Active %20Cable.pdf

SUMMARY OF INVENTION

Technical Problem

As explained above, Non-patent-related Document 2 discloses a technique to install a chip-type optical transceiver, that is constructed by use of a silicon photonics technique, onto a PCB and use the resultant board as an AOC circuit board. However, regarding the chip-type optical transceiver, an optical fiber for communicating optical signals is directly adhered to the top part of a silicon CMOS chip by use of an epoxy resin; thus, it is not possible to apply the chip-type optical transceiver as it stands to a PCB having a different input/output construction. Accordingly, to install the chip-type optical transceiver onto a PCB of a different type, it is necessary to adopt an input/output construction suitable for the PCB on which the chip-type optical transceiver is to be installed. Thus, standardization of the specification of the input/output construction of the chip-type optical transceiver, that functions as a signal conversion element, can be considered. However, for standardizing the specification of the input/output construction, it is necessary to simplify the construction for optical connection of the photoelectric hybrid device so as to be able to precisely and easily carry out optical connection.

Further, regarding the photoelectric hybrid device, for ensuring reliability of electronic components installed on a circuit board in terms of coping with humidity and moist, it is considered, for example, to cover and seal the whole of the electronic components on the circuit board by a cover made of glass. However, if the whole of the electronic components on the circuit board are covered by a cover made of glass, a problem regarding deterioration of heat dissipation of the electronic components may arise and, thus, a task to consider a simple method to fabricate a photoelectric hybrid device having a good heat dissipation may be given.

Still further, regarding fabrication of the photoelectric hybrid device, in the case that an optical waveguide core is intended to be formed in a slanted (tilted) configuration with respect to the circuit board, there will be a risk that a problem of unintentionally curing a part of the photocurable resin arises; that is, as shown in FIG. 34, light 29620 having a photosensitive wavelength for a photocurable resin 29422 propagates through the photocurable resin 29422 in a slanted direction, the light is reflected by the surface of the substrate 29410, and the reflected light 29622 may unintentionally cause the curing of a portion of the photocurable resin at which an optical waveguide core should not be formed. Thus, when forming an optical waveguide core comprising a photocurable resin on a substrate, it is necessary to prevent unnecessary curing of the photocurable resin due to reflection of light from a substrate, at places other than the place for the optical waveguide core.

Solution to Problem

For solving the above problems, a photoelectric hybrid device of the present invention has a construction that is suitable to be used as a signal conversion element that is to be incorporated in a module for data communication. In this regard, note that there are three types of the photoelectric hybrid devices, i.e., an optical transmission type, an optical reception type, and an optical transmission/reception type.

A first basic construction of a photoelectric hybrid device comprises: a sealing structure placed on the photoelectric hybrid substrate for covering the photoelectric hybrid substrate except for a specific part thereof that is used for inputting/outputting optical signals to/from the photoelectric hybrid substrate; and a vertical optical waveguide having an optically flat surface and forming optical paths in the specific part for inputting/outputting the optical signals to/from the photoelectric hybrid substrate; wherein the photoelectric hybrid device is constructed in such a manner that an optical connector, that is provided with an optical waveguide for communicating an optical signal with the vertical optical waveguide, can be precisely and easily placed on the optically flat surface of the vertical optical waveguide.

A second basic construction of a photoelectric hybrid device comprises: a sealing structure placed on the photoelectric hybrid substrate for covering the photoelectric hybrid substrate except for a specific part thereof that is used for inputting/outputting optical signals to/from the photoelectric hybrid substrate; a transparent member placed to cover the specific part and having an optically flat surface and a transparent part; and a vertical optical waveguide forming optical paths between the transparent part of the transparent member and the optical waveguides of the photoelectric hybrid device; wherein the photoelectric hybrid device is constructed in such a manner that an optical connector, that is provided with an optical waveguide for communicating an optical signal with the vertical optical waveguide, can be precisely and easily placed on the optically flat surface of the transparent member.

To solve the above problem regarding heat dissipation, i.e., to improve heat dissipation of the photoelectric hybrid device, according to an embodiment of the photoelectric hybrid device of the present invention, the transparent member is placed in such a manner that it does not cover the whole of the upper surface of the electronic circuit.

Also, to solve the above problem to achieve improvement of heat dissipation, according to another embodiment of the photoelectric hybrid device of the present invention, a resin layer that forms a clad of the vertical optical waveguide covers at least a part of the photoelectric hybrid substrate such that an opening is formed above the electronic circuit.

According to an embodiment of the photoelectric hybrid device of the present invention, for stabilizing positioning of the transparent member, a supporting member for supporting the transparent member is placed on the photoelectric hybrid substrate; and the supporting member comprises a material that is the same as a material forming a core of the vertical optical waveguide.

According to another embodiment of the photoelectric hybrid device of the present invention, for stabilizing positioning of the transparent member, the transparent member is placed above a spacer, that is placed on the photoelectric hybrid substrate, in such a manner that the transparent member overhangs from the spacer.

A construction for easily carrying out alignment when the photoelectric hybrid device is placed on a module for data communication comprises: forming marker holes for alignment on the transparent member of the photoelectric hybrid device; and mechanically aligning the marker holes and holes formed on the module for data communication by use of jigs; and, by this construction, precise alignment of the photoelectric hybrid device and the module for data communication can be carried out. Note that it is also possible to construct the photoelectric hybrid device in such a manner that an end part of the transparent member of the photoelectric hybrid device is to be used for alignment when the photoelectric hybrid device is placed on the module for data communication; and, by this construction, alignment of the photoelectric hybrid device and the module for data communication can be carried out.

Further, by adding constructions relating to one or more electrically conductive members (electrically conductive pins) that pierce through the sealing structure and couple to electric signal paths of the photoelectric hybrid substrate, and one or more electrical connection parts (solder balls, bumps, etc.) placed respectively on the one or more top parts of the one or more electrically conductive members to a construction such as the above first and second basic constructions, and by constructing the photoelectric hybrid device in such a manner that the position, in terms of height, of the optically flat surface is not set to be lower than the position of the top part of each electrical connection part, collision between the optical connector and the one or more the top parts of the one or more electrically conductive members can be avoided when the optical connector is placed on the optically flat surface.

Still further, a photoelectric hybrid device like the above can be constructed as a signal conversion element having application configurations as follows:

(A) In the case that the module for data communication is an interposer or an AOC (active optical cable) circuit board, the photoelectric hybrid device can be constructed in such a manner that the position, in terms of height, of the optically flat surface is not set to be lower than the position of the top part of each of the one or more electrical connection parts formed on the top part of each of the one or more conductive members coupled to the electric signal paths; and that, when the optical connector, that is provided with an optical waveguide for communicating an optical signal with the vertical optical waveguide (plural optical waveguides), is placed on the optically flat surface, collision between a bridge substrate, that integrally connects to the one or more electrical connection parts and inputs/outputs electric signals from/to an external part, and the optical connector is avoided.

(B) In the case that the module for data communication is a data communication module that carries out inputting/outputting of optical signals and electric signals on the same surface, for example, in the case that the module is a photoelectric interposer/printed circuit board that comprises an optical circuit and an electric circuit formed in the same substrate, the photoelectric hybrid device can be constructed in such a manner that the position, in terms of height, of the optically flat surface is set to coincide with the height of the top part of each of the one or more electrical connection parts formed on the top part of each of the one or more conductive members coupled to the electric signal paths; and that inputting/outputting of optical signals and electric signals are carried out on the same plane.

Regarding the shape of the optical waveguide included in the vertical optical waveguide of the photoelectric hybrid device, it is possible to adopt shapes such as a cylindrical shape and a slanted cylindrical shape. In the case that a slanted cylindrical shape is adopted, a degree of freedom with respect to positioning of an optical element can be increased. Also, it is possible to adopt a tapered shape that has a diameter that gradually reduces along the direction toward the optical waveguide of the photoelectric hybrid substrate, and a reverse tapered shape that has a diameter that gradually reduces along the direction toward the optically flat surface. The former shape is suitable to converge the light onto the light receiving element; and the latter shape is suitable to converge the light onto the optical fiber of the optical connector placed on the optically flat surface. Further, it is possible to slant the axis of the tapered shape (or the reverse tapered shape) to increase a degree of freedom with respect to positioning of an optical element, thereby allowing more efficient optical guiding.

To solve the above problem regarding possible unintentional curing of a photocurable resin at places other than a place for the optical waveguide core due to reflection from a substrate, an embodiment of the photoelectric hybrid device of the present invention comprises an antireflection layer that deals with light having a photosensitive wavelength of the photocurable resin, and is formed to contact with the end part of the optical-waveguide-side of the optical waveguide core. The antireflection layer can be constructed to be a light absorbing layer including, as a component, a light absorbing material that absorbs light having the photosensitive wavelength of the photocurable resin; and the antireflection layer can further include the photocurable resin as a component. Note that the antireflection layer can be constructed to be transparent to an emission wavelength of the light source or a wavelength to be sensed by the optical receiver.

Generally, an embodiment of a method of the present invention for manufacturing a photoelectric hybrid device is as follows:

First, prepare a photoelectric hybrid substrate that is the base of a device, and a photomask; and align the photomask with the photoelectric hybrid substrate and place the photomask on the photoelectric hybrid substrate. Next, supply a photocurable resin, that is to be cured by applying light thereto, to a space between the photoelectric hybrid substrate and the photomask; and expose the photocurable resin to the light for forming a vertical optical waveguide. Next, remove the part of the photocurable resin that has not been cured. Finally, remove the photomask.

In addition, another embodiment of a method of the present invention for manufacturing a photoelectric hybrid device is generally as follows:

First, prepare a photoelectric hybrid substrate that is the base of a device, and a transparent member having a transparent part and an optically flat surface; and align the transparent member with the photoelectric hybrid substrate and place the transparent member on the photoelectric hybrid substrate. Next, supply a photocurable resin, that is to be cured by applying light thereto, to a space between the photoelectric hybrid substrate and the transparent member; and expose the photocurable resin to the light for forming a vertical optical waveguide between the transparent member and the optical waveguide. Next, remove the part of the photocurable resin that has not been cured. Note that the transparent member can be used as a mask for exposure for forming the vertical optical waveguide and the transparent member can be left after exposure, so that the optical connector can be precisely and easily placed on the lat optical surface.

Further, the photoelectric hybrid device can be constructed to comprise one or more electrically conductive members coupled to the electric signal paths, and one or more electrical connection parts placed respectively on one or more top parts of the one or more electrically conductive members; and, by constructing the photoelectric hybrid device in such a manner that the position, in terms of height, of the optically flat surface is not set to be lower than the height of the top part of each electrical connection part, collision between a bridge substrate, that integrally connects to the one or more electrical connection parts and inputs/outputs electric signals from/to an external part, and the optical connector is avoided, when the optical connector, that is provided with an optical waveguide for communicating an optical signal with the vertical optical waveguide, is placed on the optically flat surface.

Regarding the manufacturing method of the photoelectric hybrid device, it is possible to construct the vertical optical waveguide to comprise plural optical waveguides; and in the step for forming the plural optical waveguides, it is possible to form the waveguides to have a cylindrical shape or a slanted cylindrical shape, or a tapered shape that has a diameter that gradually reduces along the direction toward the optical waveguide of the photoelectric hybrid substrate, or a reverse tapered shape that has a diameter that gradually reduces along the direction toward the optically flat surface; and, further, it is possible to form the waveguides to have the tapered shape or the reverse tapered shape having a slanted optical axis.

In the step for preparing the transparent member, it is possible to form marker holes for alignment for aligning the photoelectric hybrid device with the data communication module.

To solve the above problems regarding heat dissipation and so on, i.e., to improve heat dissipation and so on, according to an embodiment of a method for manufacturing the photoelectric hybrid device of the present invention, the following processes are carried out: supplying a photocurable resin, that is to be cured by applying light thereto, into a space between the photoelectric hybrid substrate and the transparent member, and onto the photoelectric hybrid substrate; irradiating the transparent member from a part thereabove by light, exposing the photocurable resin to the light that has transmitted through the transparent member for forming a vertical optical waveguide in a place between the transparent part and the optical waveguides, and also exposing the photocurable resin located on a peripheral part of the electronic circuit; and removing the part of the photocurable resin that has not been cured.

To solve the above problems regarding heat dissipation and so on, i.e., to improve heat dissipation and so on, according to another embodiment of a method for manufacturing the photoelectric hybrid device of the present invention, the following processes are carried out: supplying a photocurable resin for cores, for forming a core part of a vertical optical waveguide; exposing the photocurable resin for cores to the light for forming a core part of the vertical optical waveguide in a place between the transparent part and the optical waveguides; removing the part of the photocurable resin for cores that has not been cured; supplying a photocurable resin for a clad into a space between the photoelectric hybrid substrate and the transparent member and onto the photoelectric hybrid substrate, for forming a clad part of the vertical optical waveguide; exposing the photocurable resin for the clad, that is located in the clad part and on a peripheral part of the electronic circuit, to the light; and removing the part of the photocurable resin for the clad that has not been cured;

To solve the above problems regarding heat dissipation and so on, i.e., to improve heat dissipation and so on, according to another embodiment of a method for manufacturing the photoelectric hybrid device of the present invention, the following processes are carried out: supplying photocurable resin for cores into a space between the photoelectric hybrid substrate and the transparent member and onto the photoelectric hybrid substrate, for forming a core part of a vertical optical waveguide; exposing the photocurable resin for cores, that is located in the core part and on part of a peripheral part of the electronic circuit, to the light; removing the part of the photocurable resin for cores that has not been cured; supplying a photocurable resin for a clad into a space between the photoelectric hybrid substrate and the transparent member and onto the photoelectric hybrid substrate, for forming a clad part of the vertical optical waveguide; exposing the photocurable resin for the clad, that is located in the clad part and the remainder of the peripheral part of the electronic circuit, to the light; and removing part of the photocurable resin for the clad that has not been cured. Also, it is possible to carry out exposure by use of a mask that is constructed in such a manner that a part corresponding to the vertical optical waveguide transmits light, and a part corresponding to the opening on the electronic circuit blocks light; and that, after the photocurable resin located on the peripheral part of the opening on the electronic circuit has cured, the cured photocurable resin covers side surfaces of the electronic circuit and seals a bottom surface of the electronic circuit.

Further, by appropriately modifying the form of the mask or the like, it will be possible to form the waveguides included in the vertical optical waveguide to have a cylindrical shape or a slanted cylindrical shape, or a tapered shape that has a diameter that gradually reduces along the direction toward the optical waveguide of the photoelectric hybrid substrate, or a reverse tapered shape that has a diameter that gradually reduces along the direction toward the optically flat surface; and, further, it will be possible to form the waveguides to have the tapered shape or the reverse tapered shape having a slanted optical axis.

For stabilizing positioning of the transparent member, according to an embodiment of the manufacturing method of the photoelectric hybrid device, a spacer is placed on the photoelectric hybrid substrate, and the transparent member is placed above the spacer in such a manner that it overhangs from the spacer. Further, by exposing the photocurable resin in such a manner that an end of the overhung part of the transparent member is irradiated by light, a supporting member for supporting the end part of the transparent member and the vertical optical waveguide can be formed at the same time; and, by illuminating a part of the transparent member that is in contact with the spacer to cure the photocurable resin supplied into the part between the transparent member and the spacer, the transparent member and the spacer can be fixed together by the photocurable resin at the same time as forming of the vertical optical waveguide.

For stabilizing positioning of the transparent member, according to another embodiment of the manufacturing method of the photoelectric hybrid device, the transparent member is in contact with the photocurable resin and the height of the transparent member is maintained at a predetermined height, and, by exposing the photocurable resin in such a manner that the transparent member except for a part thereof corresponding to a part of the vertical optical waveguide is irradiated by light, a supporting member for supporting the transparent member on the photoelectric hybrid substrate is formed at the same time as forming of the vertical optical waveguide.

Also, according to another embodiment of a manufacturing method of the photoelectric hybrid device, the following processes are carried out: preparing, on a photoelectric hybrid substrate that is the base of a device, a sealing structure for covering the photoelectric hybrid substrate except for a specific part thereof that is used for inputting/outputting optical signals to/from the photoelectric hybrid substrate; preparing a glass wafer; preparing a photomask, supplying a photocurable resin into a space between the glass wafer and the photomask, forming plural optical waveguides at the same time on the glass wafer by exposing the photocurable resin through the photomask by light, and filling and curing a clad member, thereby forming plural vertical optical waveguides on the glass wafer; and dicing the glass wafer, on which the plural vertical optical waveguides are formed, to form respective vertical optical waveguide units; wherein the vertical optical waveguide unit is integrated into the specific part used for inputting/outputting optical signals to/from the photoelectric hybrid substrate, in such a manner that a back surface of a surface, on which the vertical optical waveguide is formed, is defined to be an optically flat surface and placed to be an upper surface.

Advantageous Effects of Invention

According to each of the first and second basic constructions of photoelectric hybrid devices of the present invention, the optical connector, that is provided with the optical waveguide for communicating an optical signal with the vertical optical waveguide (plural optical waveguides), can be precisely and easily placed on the optically flat surface.

Also, the photoelectric hybrid device of the present invention provides notable effect with respect to amelioration of heat dissipation and stabilization of positioning of transparent members.

In the case that constructions relating to one or more electrically conductive members (electrically conductive pins) that pierce through the sealing structure and couple to electric signal paths of the photoelectric hybrid substrate, and one or more electrical connection parts (solder balls, bumps, etc.) placed respectively on the one or more top parts of the one or more electrically conductive members are added to each of the first and second basic constructions of photoelectric hybrid devices of the present invention, and that the photoelectric hybrid device is constructed in such a manner that the position, in terms of height, of the optically flat surface is not set to be lower than the position of the top part of each electrical connection part, collision between the optical connector and the one or more the top parts of the one or more electrically conductive members can be avoided when the optical connector is placed on the optically flat surface.

Also, by standardizing the optical connection part and the electrical connection part to have a common specification, even if the module for data communication to be incorporated into the photoelectric hybrid device comprises any interposer or any AOC circuit board, it can be incorporated into photoelectric hybrid device in a similar way without modifying the photoelectric hybrid device for each circuit board.

Further, by constructing the photoelectric hybrid device in such a manner that the position, in terms of height, of the optically flat surface is set to coincide with the height of the top part of each of the one or more electrical connection parts formed on the top part of each of the one or more conductive members, the photoelectric hybrid device and the data communication module can be aligned, when the photoelectric hybrid device is incorporated into the photoelectric interposer/printed circuit board, that comprises an optical circuit and an electric circuit formed within the same circuit board, in such a manner that the input/output surface of the photoelectric hybrid device faces the input/output surface of the photoelectric interposer/printed circuit board.

By making marker holes for alignment on the transparent member of the photoelectric hybrid device, and by mechanically aligning the marker holes and holes formed on the data communication module by use of jigs, alignment when the photoelectric hybrid device is placed on the data communication module can be precisely and easily carried out.

Also, by using an end part of the transparent member of the photoelectric hybrid device for alignment at the time that the photoelectric hybrid device is placed on the data communication module, the alignment of the photoelectric hybrid device and the data communication module can be precisely and easily carried out.

Regarding the shape of the optical waveguide of the photoelectric hybrid device, in the case that a tapered shape that has a diameter that gradually reduces along the direction toward the optical waveguide of the photoelectric hybrid substrate, or a reverse tapered shape that has a diameter that gradually reduces along the direction toward the optically flat surface is adopted, it becomes possible to efficiently converge the light onto the light receiving element or efficiently converge the light onto the optical fiber of the optical connector. Further, in the case that the axis of the tapered shape (or the reverse tapered shape) is slanted, it becomes possible to increase a degree of freedom with respect to positioning of an optical element, thereby allowing more efficient optical guiding.

Also, by making an antireflection layer in the photoelectric hybrid device that has an waveguide having a slanted axis, the problem regarding unintentional curing of a photocurable resin at a part at which an optical waveguide core should not be formed can be solved.

Also, according to an embodiment of the manufacturing method of the photoelectric hybrid device of the present invention, since an optical waveguide is formed by use of a technique of a self-forming optical waveguide, it is possible to easily carry out alignment of the optical waveguide at a precise position with respect to the photoelectric hybrid device, and appropriately set the shape and the slant of the optical waveguide; and the transparent part, that remains since it was not removed, can be used as an optical flat when the optical connector is placed.

According to an embodiment of the manufacturing method of the photoelectric hybrid device of the present invention, since marker holes for alignment for aligning the photoelectric hybrid device with the data communication module can be formed in the step for preparing the transparent member, the manufacturing process can be simplified.

Also, according to an embodiment of the manufacturing method of the photoelectric hybrid device of the present invention, the photoelectric hybrid device providing notable effect with respect to amelioration of heat dissipation and stabilization of positioning of transparent members can be manufactured by use of an easy method.

BRIEF DESCRIPTION OF DRAWINGS

FIG. 7 is a drawing for explaining different shapes of optical waveguides.

FIG. 24 is a drawing showing the 9th step of the example of the manufacturing method of the photoelectric hybrid device.

DESCRIPTION OF EMBODIMENTS

The present invention has characteristics in a construction of a photoelectric hybrid device that is suitable to be used typically as a signal conversion element to be incorporated into a data communication module such as an interposer, an AOC (Active Optical Cable) circuit board, a photoelectric interposer/printed circuit board that comprises an optical circuit and an electric circuit formed on the same circuit board and is expected to be evolved, or the like, and characteristics in a method for manufacturing the photoelectric hybrid device; and, in the present invention, a vertical optical waveguide is used for inputting and outputting optical signals, the vertical optical waveguide is formed by use of a technique of a self-forming optical waveguide, and an optically flat surface is utilized, and so on; and, as a result thereof, incorporation of the photoelectric hybrid device into the interposer or the like can be simplified, and standardization can be easily carried out.

In the following, a construction, an application example, a manufacturing method, and so on of the photoelectric hybrid device will be explained.

[Construction of the Photoelectric Hybrid Device]

There are three types of the photoelectric hybrid devices that are appropriate to be used as signal conversion elements, i.e., an optical transmission type, an optical reception type, and an optical transmission/reception type.

Figure 1A:
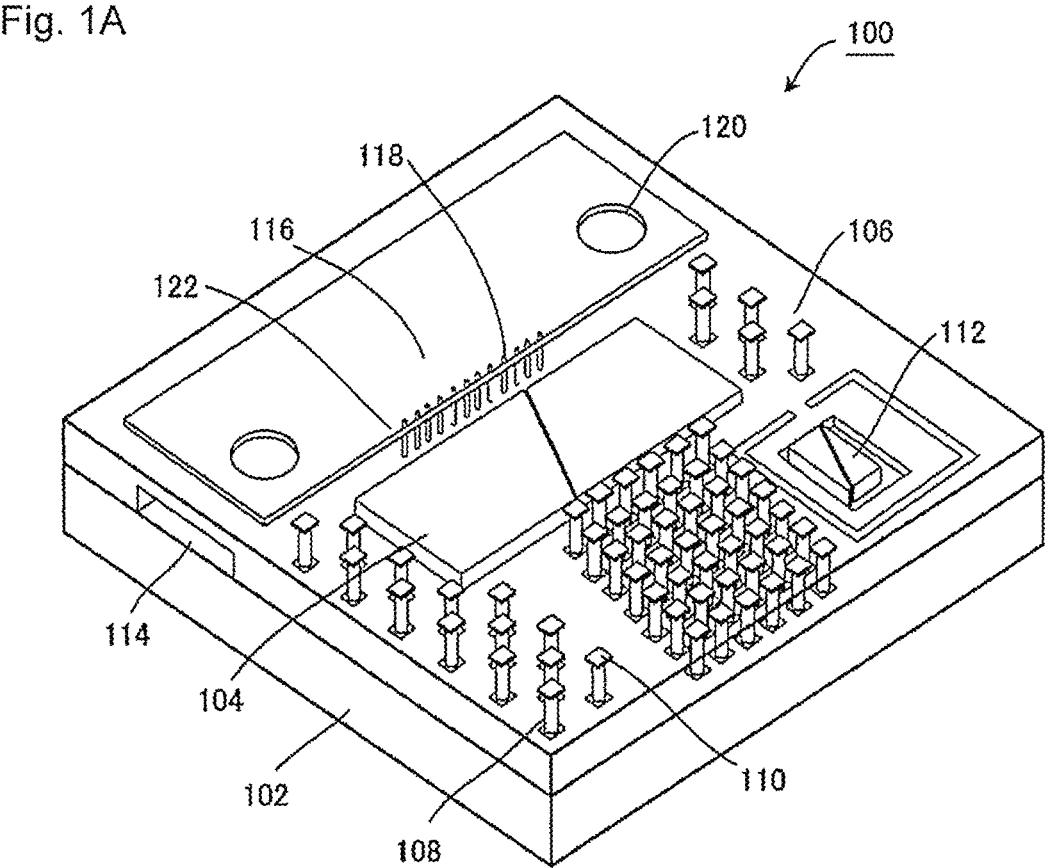
FIG. 1A is a schematic perspective view of an example of a photoelectric hybrid device.

FIG. 1A is a schematic perspective view of a photoelectric hybrid device 100 of an optical transmission/reception type, and the actual size thereof is approximately 5 mm×5 mm. Within a silicon substrate 102, an optical wave guide, an optical receiver, an optical modulator and so on, that are not shown, are formed by use of a silicon photonics technique; on the silicon substrate 102, an IC circuit 104 including a driver IC for controlling optical modulation, controlling a laser diode 112 and so on, and a receiver IC for carrying out amplification of a received-light signal and so on, electrical lines, and so on are provided; and a photoelectric hybrid circuit board is formed by the silicon substrate (optical circuit substrate) 102, the IC circuit 104, the electrical lines, and so on. A sealing structure 106 is formed by use of a glass material, for example; and the sealing structure 106 covers the silicon substrate 102 except for a specific part of the silicon substrate 102 that is used for inputting and outputting optical signals. Further, the sealing structure 106 comprises plural holes that pierce through the member from the front side to the back side; electrically conductive pins 108 are fitted into the holes; and solder bumps 110 are formed on the top part of the surface of the electrically conductive pins 108.

A transparent member 116, that has a surface forming an optically flat surface and transparent parts 118, is provided on the sealing structure 106 to cover the specific part; and, as a result, a space 114 surrounded by the silicon substrate 100, the sealing structure 106, and the transparent member 116 is formed. The space 114 is filled by a photocurable resin, and light (for example, ultraviolet rays) is irradiated on the transparent member 116 from above; and, by the light that passed through the transparent parts 118 of the transparent member 116, parts of the photocurable resin that correspond to the parts that the light passed through are cured and, as a result, self-forming optical waveguides (vertical optical waveguides) are formed. In this manner, plural optical waveguides 122 are formed in the space between the transparent parts and the optical waveguides; and, after the resin that has not been cured is removed, the plural optical waveguides 122 remain within the space 114 (a method for forming the optical waveguides will be explained later). Thereafter, a clad member (not shown in the figure) is formed in such a manner that it covers periphery of the optical waveguides. Note that the transparent member 116 is made by coating a surface of a glass substrate by a light-shielding chrome film, for example; and, by forming openings having predetermined shapes on predetermined places of the chrome film by carrying out an etching process or the like, the transparent parts 118 are formed.

Marker holes for alignment 120 on the transparent member 116 are formed by etching the glass substrate when the openings are formed by carrying out the etching process as explained above; and the alignment marker holes 120 are thus aligned with the transparent parts 118. Accordingly, by use of the alignment marker holes 120, it becomes possible to mechanically align the photoelectric hybrid device 100 with a substrate of an interposer or the like by use of jigs for alignment.

Figure 1B:
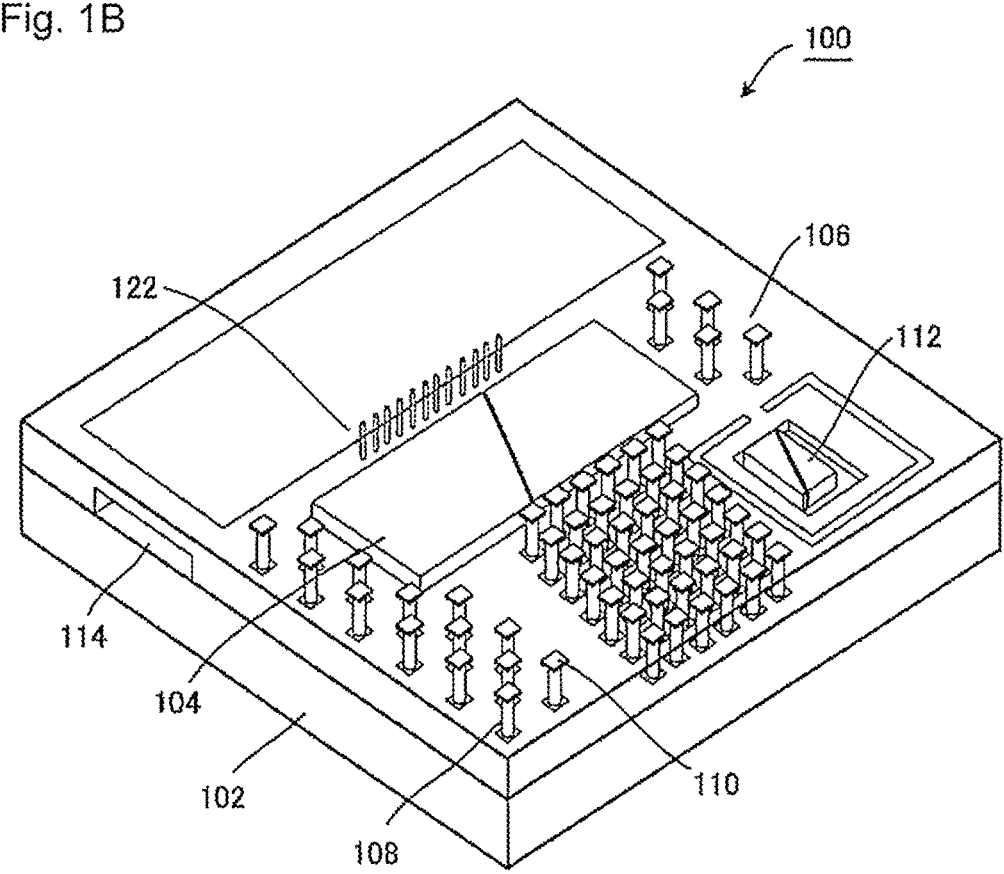
FIG. 1B is a schematic perspective view of another example of a photoelectric hybrid device.

The construction shown in FIG. 1B is different from that of FIG. 1A in that a space 114 surrounded by a silicon substrate 100, a sealing structure 106, and a photomask that is not shown is formed in the construction shown in FIG. 1B. The space 114 is then filled by a photocurable resin, and light (for example, ultraviolet rays) is irradiated on the photomask from above thereof; and, by the light that passed through the photomask, parts of the photocurable resin that correspond to the parts that the light passed through are cured, and, as a result, self-forming optical waveguides (vertical optical waveguides) are formed. In this manner, plural optical waveguides 122 are formed in the space between the photomask and the optical waveguides or optical receivers; and, after the resin that has not been cured is removed, the plural optical waveguides 122 remain within the space 114 (a method for forming the optical waveguides will be explained later). Thereafter, a clad member (not shown in the figure) is formed in such a manner that it covers periphery of the optical waveguides, and the photomask is removed to thereby complete the photoelectric hybrid device. Note that the photomask is made by coating a surface of a glass substrate by a light-shielding chrome film, for example; and openings having predetermined shapes are formed on predetermined places of the chrome film by carrying out an etching process or the like.

Figure 2:
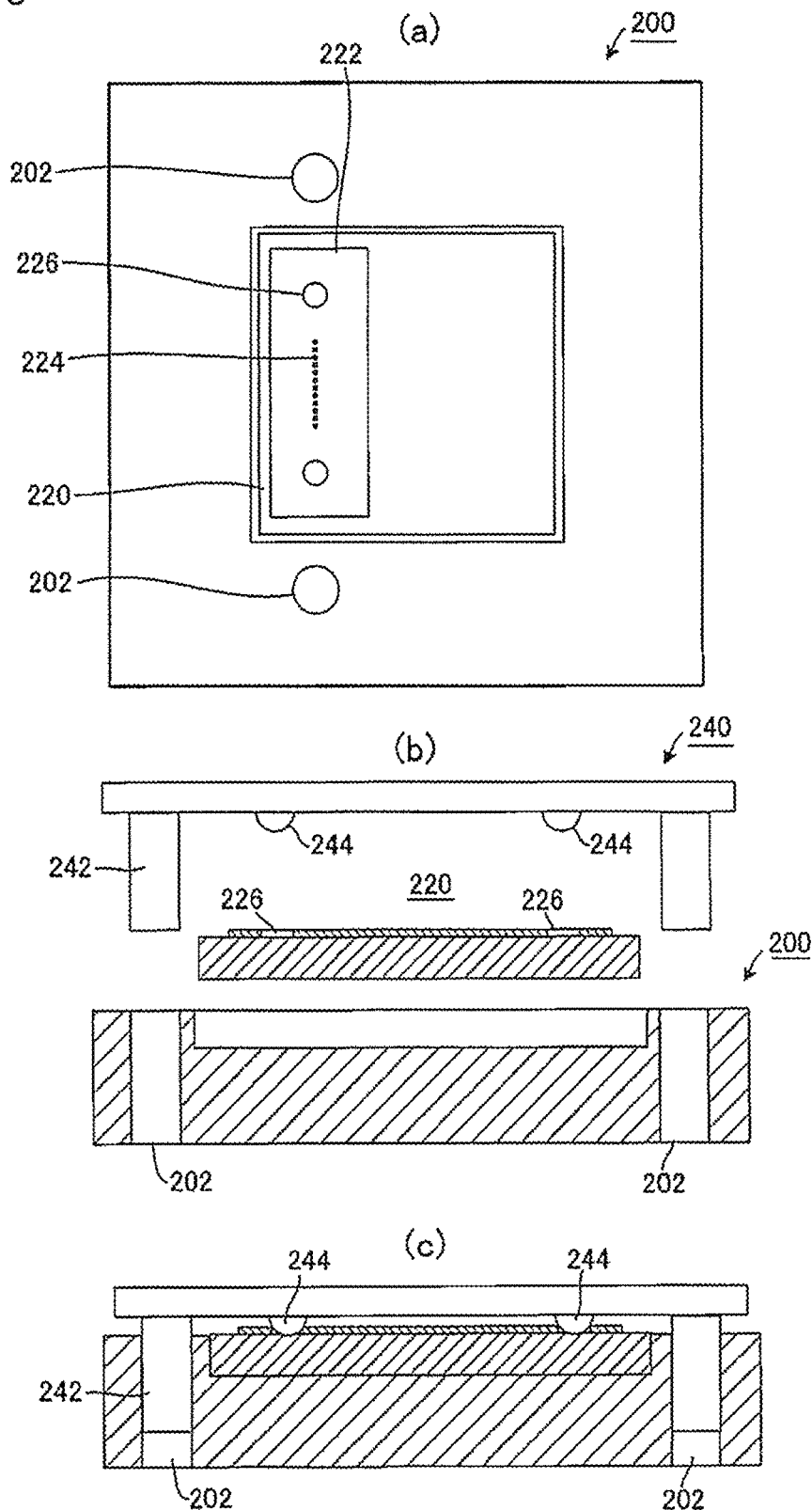
FIG. 2 is an explanatory drawing for explaining a structure for mechanically aligning a circuit board of an interposer or the like with a photoelectric hybrid device by use of alignment jigs.

With referring to FIG. 2, a construction for mechanically aligning, by use of alignment jig 240, a substrate 200 of an interposer or the like, on which a photoelectric hybrid device is loaded, and a photoelectric hybrid device 220 will be explained. (a) of FIG. 2 is a plane view that shows a state that the photoelectric hybrid device 220 was placed on the substrate 200, and alignment thereof was completed. (b) and (c) of FIG. 2 are drawings for explaining mechanical alignment processes that use alignment jig 240. First, the photoelectric hybrid device 220 is temporarily placed on the substrate 200, and leg parts 242 of the alignment jig 240 are inserted into fitting holes 202 formed on the substrate 200. As the insertion process of the leg parts 242 into the fitting holes 202 progresses, parts of surfaces of hemispherical protruding parts 244 of the alignment jig 240 contact with parts of edge parts of the alignment marker holes 266 of the photoelectric hybrid device 220. As the insertion process of the leg parts 242 into the fitting holes 202 further progresses, the edge parts of the alignment marker holes 266 of the photoelectric hybrid device 220 are pushed by the hemispherical protruding parts 244 of the alignment jig 240, and positions of the marker holes 226 are finally determined by the protruding parts 244 (refer to (c) of FIG. 2), and the substrate 200 and the photoelectric hybrid device 220 are positionally aligned. Thereafter, the photoelectric hybrid device 220 is fixed to the substrate 200. Note that, in place of an alignment method that uses mechanical means such as that explained above, it is possible to use an optical alignment method that uses optical indicators or the like formed on a photoelectric hybrid device. In such a case, the alignment jig 240, the fitting holes 202 of the substrate 200, and the alignment marker holes 226 of the photoelectric hybrid device 220 are not required.

Next, a construction of a cross section within a photoelectric hybrid device, an example of operation of the photoelectric hybrid device and so on will be explained.

Figure 3:
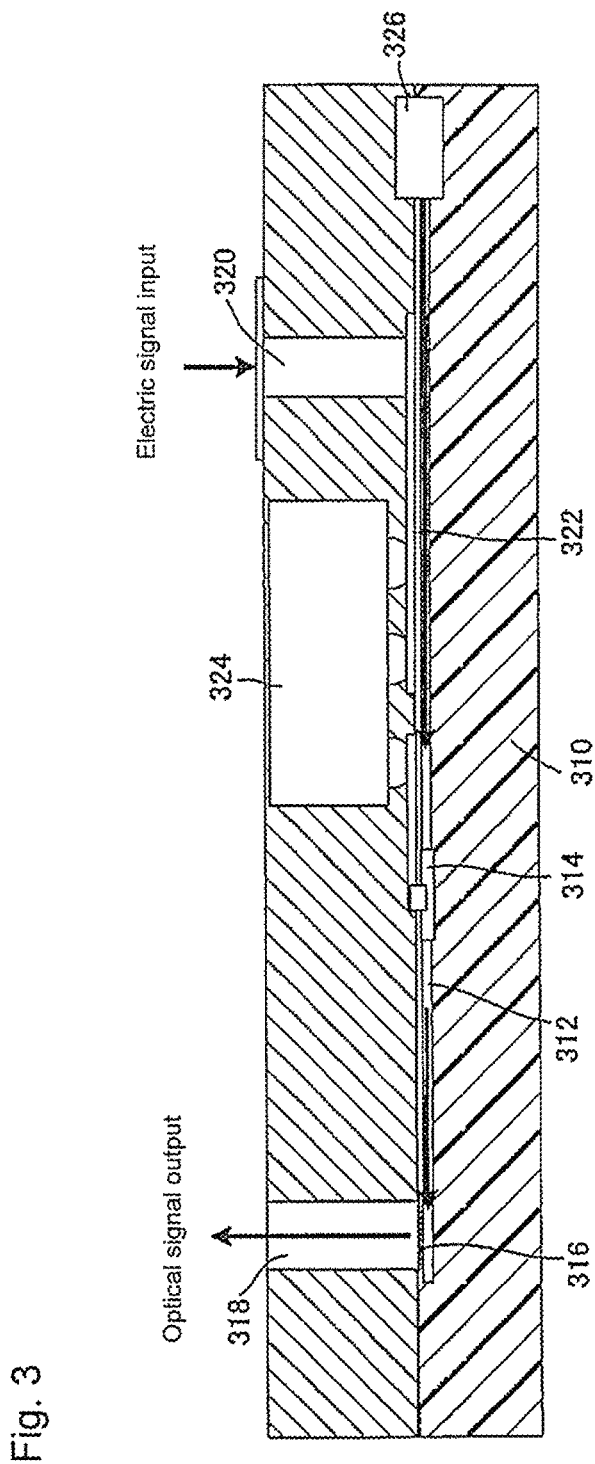
FIG. 3 is a schematic drawing for explaining a construction in a cross section of the optical transmission side of a photoelectric hybrid device.
Figure 4:
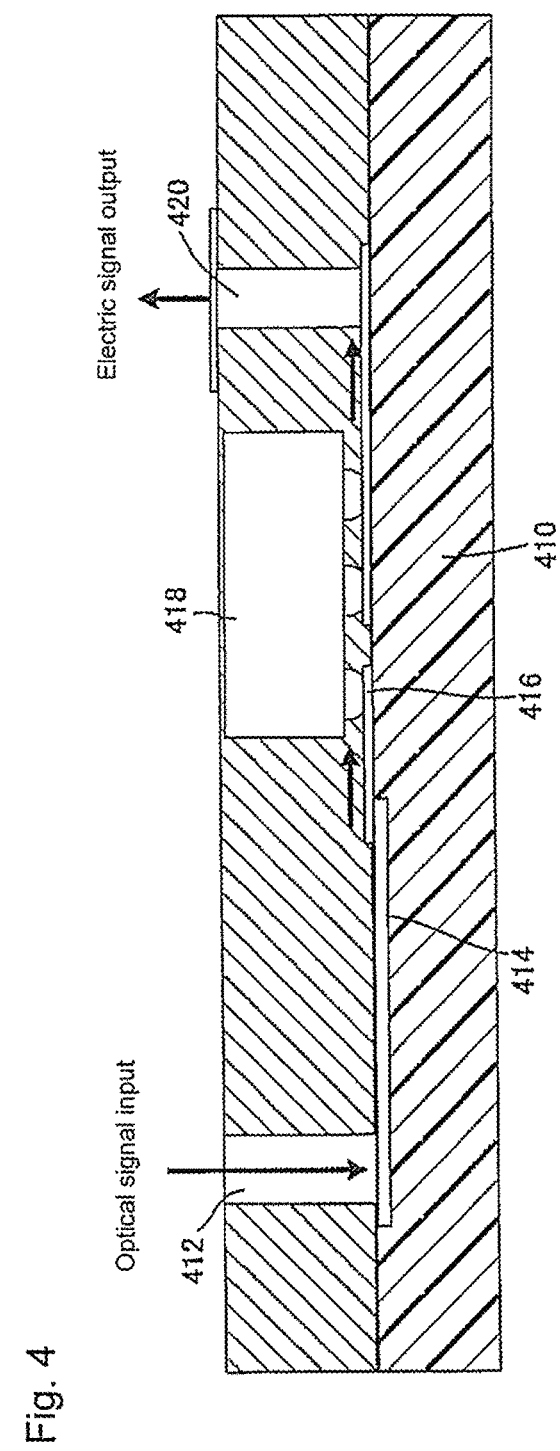
FIG. 4 is a schematic drawing for explaining a construction in a cross section of the optical reception side of a photoelectric hybrid device.

FIGS. 3 and 4 are schematic diagrams for explaining constructions of cross sections within a photoelectric hybrid device; wherein FIG. 3 shows a construction of a cross section of an optical transmission part, and FIG. 4 shows a construction of a cross section of an optical reception part.

Based on FIG. 3 that shows a construction of a cross section of an optical transmission part, an example of operation at the time of transmission of an optical signal will be explained. Light outputted from a semiconductor laser 326 is inputted, via a spot size converter that is not shown and an optical waveguide 312, to an optical modulator 314; and the light is modulated by the optical modulator 314 and outputted as a modulated optical signal. The modulated optical signal propagates the optical waveguide 312 and arrives at a grating coupler 316; and, in the grating coupler 316, the optical signal is diffracted to change its optical axis, and outputted via the optical waveguide 308 to the outside. Note that, an electric signal supplied from the outside via an electrically conductive pin 320 and an electrical line 322 is inputted to a driver IC 324 that controls the optical modulator 314 and the semiconductor laser 326, and supplied as a modulation control signal (an electric signal) to the optical modulator 314 via the electrical line 322. Further note that the optical waveguide 312, the optical modulator 314, the grating coupler 316 and so on are formed in a silicon substrate 310 by use of a silicon photonics technique.

Next, based on FIG. 4 that shows a construction of a cross section of an optical reception part, an example of operation at the time of reception of an optical signal will be explained. An optical signal supplied from the outside is directly received by a surface-incident-type photodiode 414 via an optical waveguide 414 and converted to an electric signal, and the electric signal is inputted to a receiver IC 418 via an electrical line 416. The receiver IC 418 carries out a variety of processes such as signal amplification, amplitude limiting/waveform processing and so on of the input electric signal, and outputs a processed electric signal to the outside via the electrical line 416 and an electrically conducting pin 420. Note that the surface-incident-type photodiode 414 can be formed by epitaxially growing Germanium (Ge) directly on Si; and, regarding reception of the optical signal, note that, instead of directly receiving the light by the surface-incident-type photodiode, it is possible to diffract the optical signal to change the optical axis thereof by use of a grating coupler, and thereafter receive the optical signal via an optical waveguide by the surface-incident-type photodiode, and that, in place of the surface-incident-type photodiode, it is possible to use a type of photodiode that obtains a signal from an optical waveguide (a waveguide-coupling-type PD that will be explained later). Also, note that the photodiode 414 and so on are formed in a silicon substrate 410 by use of a silicon photonics technique. Further, note that, for reducing attenuation of an inputted optical signal, the position of the receiver IC 418 of the optical reception part is placed closer to the side of the optical waveguide 412, compared with the position of the driver 324 of the optical transmission part.

Figure 5:
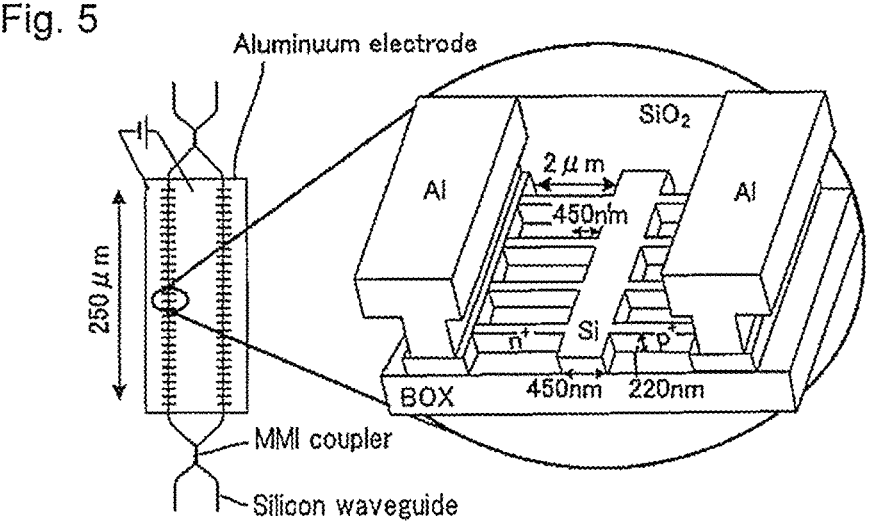
FIG. 5 is an illustration of a construction of a MZI-type optical modulator.
Figure 6:
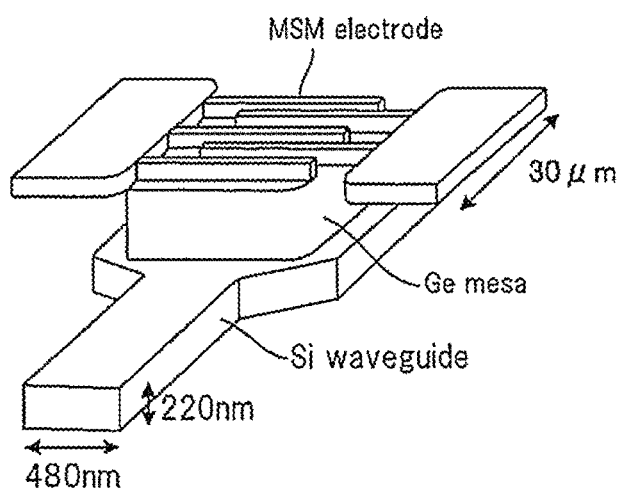
FIG. 6 is an illustration of a construction of a waveguide-coupling-type MSM Ge PD.

In this part, tangible examples of the above optical modulator 314, the waveguide-coupling-type PD and so on will be explained briefly with reference to FIGS. 5 and 6 that are disclosed in Non-patent-related Document 1. FIG. 5 shows an example of a construction of a MZI-type optical converter 500, in which carrier plasma effect (effect that an index of refraction of Si is changed due to carrier density) is produced by applying electric bias to a p-n junction of the Si, and phase modulation of light due to the above effect is converted to intensity modulation by use of a Mach-Zehnder interferometer (this is abbreviated as "MZI"). FIG. 6 shows an example of a construction of a metal-semiconductor-metal Germanium photodiode (MSM Ge PD) 600 that uses Germanium (Ge) that absorbs light in a communication wavelength range. Note that an optical waveguide is a Si waveguide formed in a SiO$_2$ layer and having a length and breadth size of approximately several hundred nanometers, for example.

In the previous description, it is described that the shape of the optical waveguide of the photoelectric hybrid device is cylindrical as shown in (a) of FIG. 7. However, it is possible to adopt optical waveguides having modified shapes such as those shown in (b)-(f) of FIG. 7. The modified shapes of optical waveguides 700 of the photoelectric hybrid device will be explained with reference to (b)-(f) of FIG. 7 (methods for forming these optical waveguides will be explained later). It is possible to adopt a slanted cylindrical shape ((b) of FIG. 7), a tapered shape that has a diameter that gradually reduces along the direction toward the optical waveguide of the photoelectric hybrid substrate ((c) of FIG. 7), or a reverse tapered shape that has a diameter that gradually reduces along the direction toward the optically flat surface ((d) of FIG. 7); and the tapered shape is suitable to converge the light onto the light receiving element, and the reverse tapered shape is suitable to converge the light onto the optical fiber of the optical connector placed on the optically flat surface and is therefore used in the optical transmission part. Further, if a tapered shape having a slanted axis ((e) of FIG. 7) or a reversed tapered shape having a slanted axis ((f) of FIG. 7) is adopted, it will be possible to increase a degree of freedom with respect to positioning of an optical element and allow more efficient optical guiding.

In the above description, a photoelectric hybrid device of the optical transmission/reception type was described. Regarding each of an optical-transmission-type photoelectric hybrid device and an optical-reception-type photoelectric hybrid device, it also has a size similar to that of an optical-transmission/reception-type photoelectric hybrid device, i.e., approximately 5 mm×5 mm. A photoelectric hybrid device of the optical transmission type comprises a construction of an optical-transmission/reception-type photoelectric hybrid device except for the construction of the part of the light reception part (refer to FIG. 4), and an optical-reception-type photoelectric hybrid device comprises a construction of an optical-transmission/reception-type photoelectric hybrid device except for the construction of the part of the light transmission part (refer to FIG. 3).

[Application Examples of the Photoelectric Hybrid Device]

The photoelectric hybrid device is a part that is suitable to be used as a signal conversion element to be incorporated into a data communication module such as an interposer, an AOC (Active Optical Cable) circuit board, and so on. In the following, some examples of data communication modules into which photoelectric hybrid devices are incorporated will be explained.

In the following description, examples that apply photoelectric hybrid devices having transparent members having optically flat surfaces will be explained. However, note that a photoelectric hybrid device that has an optically flat surface on a vertical optical waveguide without having a transparent member can be applied similarly.

Figure 8A:
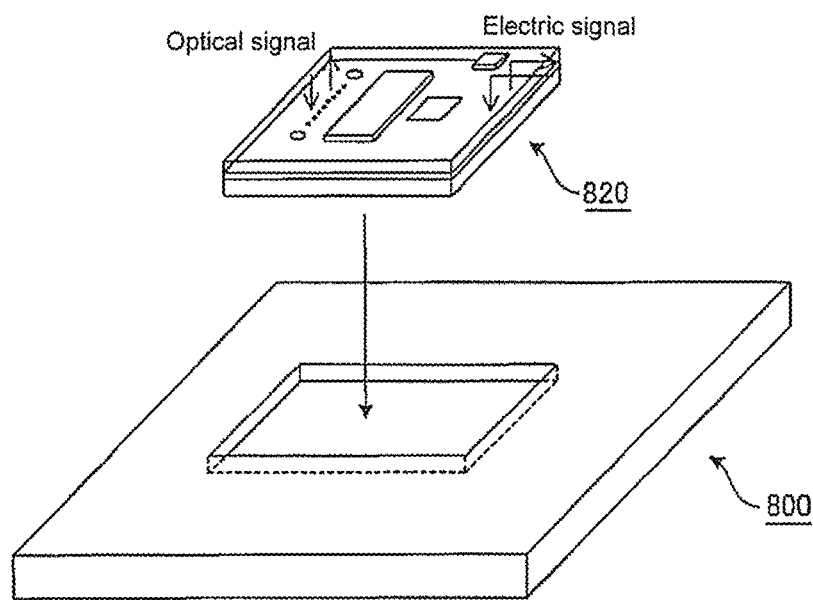
FIG. 8A is a drawing for explaining an example of incorporation of a photoelectric hybrid device into an interposer.
Figure 8B:
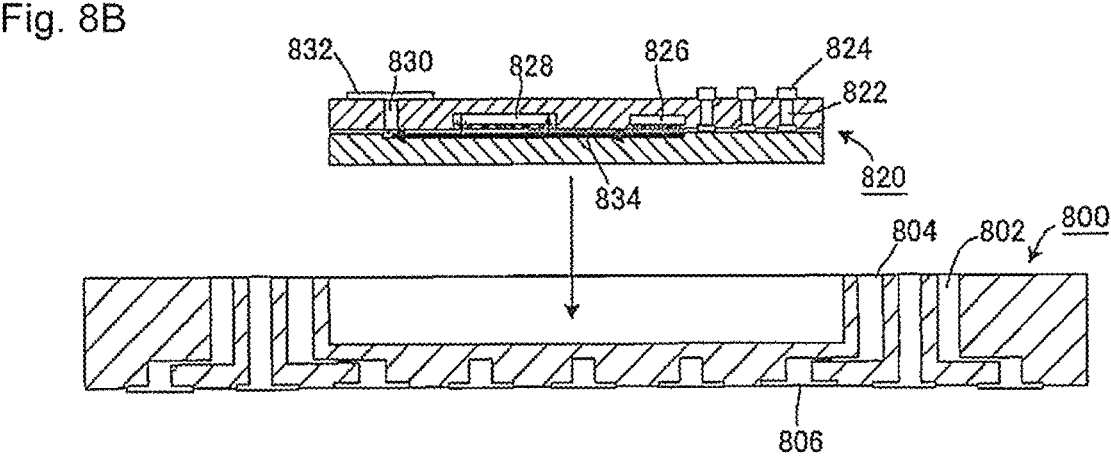
FIG. 8B is a drawing for explaining the example of incorporation of the photoelectric hybrid device into the interposer.
Figure 8C:
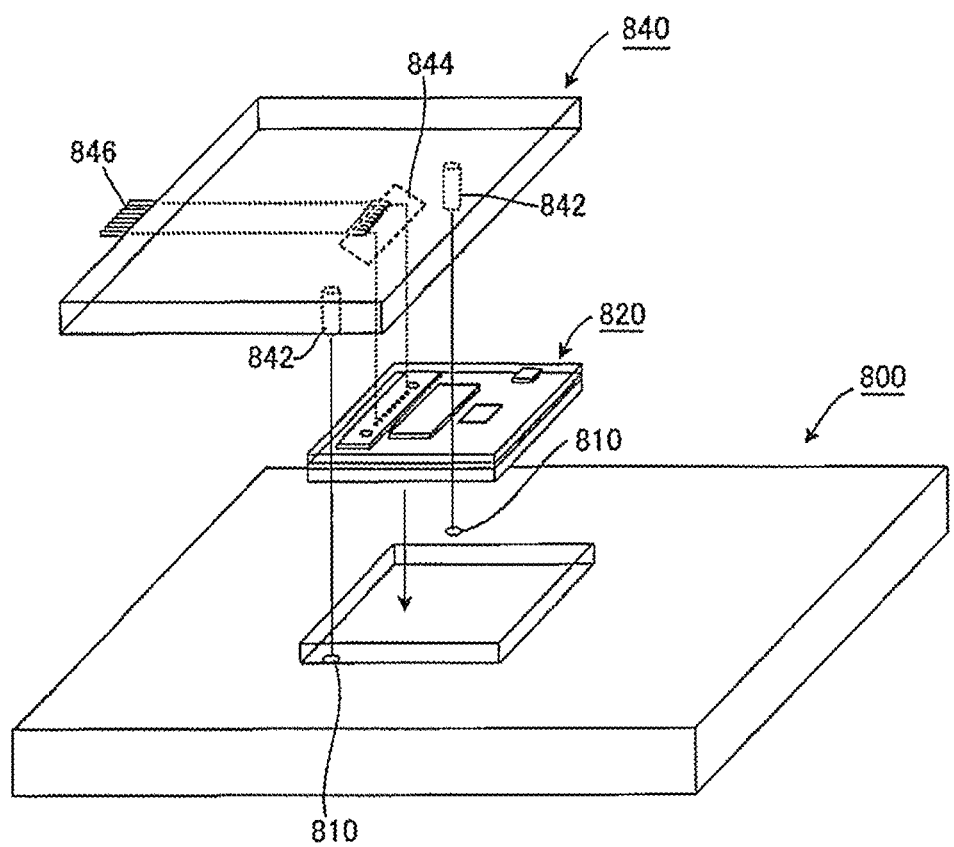
FIG. 8C is a drawing for explaining the example of incorporation of the photoelectric hybrid device into the interposer.

Each of FIGS. 8A, 8B and 8C shows an example of incorporation of a photoelectric hybrid device into an interposer. In this regard, note that an interposer is a repeater (a relay board) that, for example, inputs an optical signal into a top surface and outputs an electric signal from a bottom surface, and/or inputs an electric signal into the bottom surface and outputs an optical signal from the top surface, and has a size of approximately 10 mm×10 mm. As it is obvious from FIG. 8B, plural electrical lines 802 extending from the top surface to the bottom surface are placed within the interposer 800, and the both ends of each electrical line 802 are provided with terminals 804 and 806, respectively.

Electrically conductive pins 822, solder bumps 824, a semiconductor laser 826, a driver IC 828, optical waveguides 830, a glass mask (a transparent member) 832, and optical circuit (optical waveguides, optical modulator, etc.) 834 that comprise the photoelectric hybrid device 820, and manners of operation thereof, are similar to those described above.

When the photoelectric hybrid device 820 is incorporated into the interposer 800, the photoelectric hybrid device 820 is inserted in the interposer 800 in such a manner that the top surface of the photoelectric hybrid device 820 is placed on the side of the top surface of the interposer 800; and the interposer 800 and the photoelectric hybrid device 820 are mechanically aligned by use of, for example, alignment jig 240 such as those shown in (b) and (c) of FIG. 2, and fixed together. Next, the solder bumps 824 of the photoelectric hybrid device 820 and the top-surface-side terminals 804 of the interposer 800 are electrically connected by use of a flexible bridge circuit that is not shown in the figure. Thereafter, as shown in FIG. 8c, by inserting fitting pins 842 of an optical connector 840 into fitting holes 810 of the interposer, alignment of the optical connector 840 and the photoelectric hybrid device 820 is completed, and, consequently, the positions of the optical waveguides 830 and the positions of optical fibers 846 in the optical connector 840 are aligned; so that it becomes possible to make the light emitted from each optical waveguide to enter the optical fibers 846 via 45-degree mirror 844. Note that, in place of the construction that uses the fitting pins 842 and the fitting holes 810, the alignment marker holes 226 of the photoelectric hybrid device 220 in FIG. 2 can be used as alignment members when the optical connector is placed on the optically flat surface of the transparent member 116.

The optical connector 840 is placed on the flat surface of a glass mask 832 of the photoelectric hybrid device 820; and the thickness of the glass mask 832 is not set to be lower than the position of the top parts of the solder bumps 824. Accordingly, the optical connector 840 will never contact with the top parts of the solder bumps 824 (the bridge circuit board placed on the top part), that is, the optical connector 840 and the solder bumps 824 are constructed to avoid collision between them.

Regarding electrical connection between the photoelectric hybrid device 820 and the interposer 800, in addition to the use of a flexible bridge circuit as explained above, it is possible to use wire bonding (WB), a through-silicon via (TSV) and so on.

Figure 9:
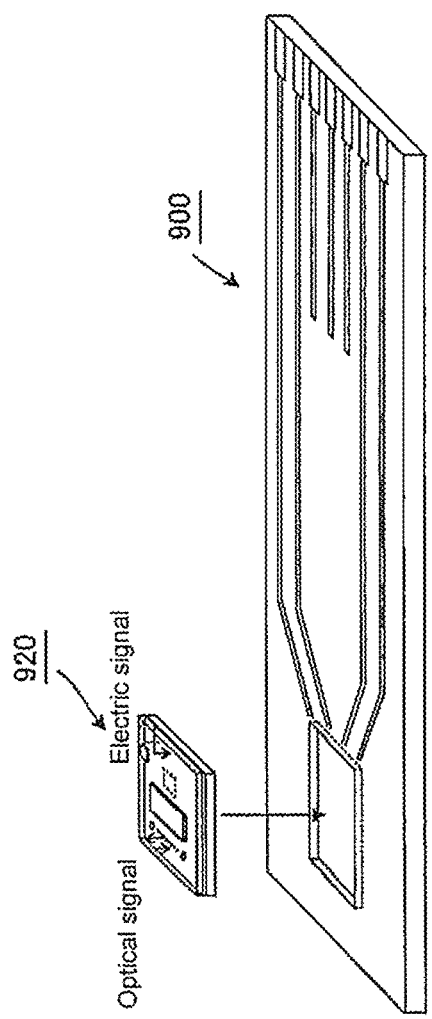
FIG. 9 is a drawing for explaining an example of incorporation of a photoelectric hybrid device into an AOC circuit board.

FIG. 9 shows an example of incorporation of a photoelectric hybrid device 920 into an AOC (Active Optical Cable) circuit board 900. The photoelectric hybrid device 920 comprises a construction similar to that of the photoelectric hybrid device 820 of FIG. 8. The construction of the AOC circuit board 900 is different from that of the interposer 800 in that an edge part of the surface of the AOC circuit board 900 comprises input/output terminals. However, the mode of electrical connection between the photoelectric hybrid device 920 and the AOC (Active Optical Cable) circuit board 900 is not substantially different from the mode of electrical connection between the photoelectric hybrid device 820 and the interposer 800 of FIG. 8; that is, the basic mode of connection is not changed.

Figure 10:
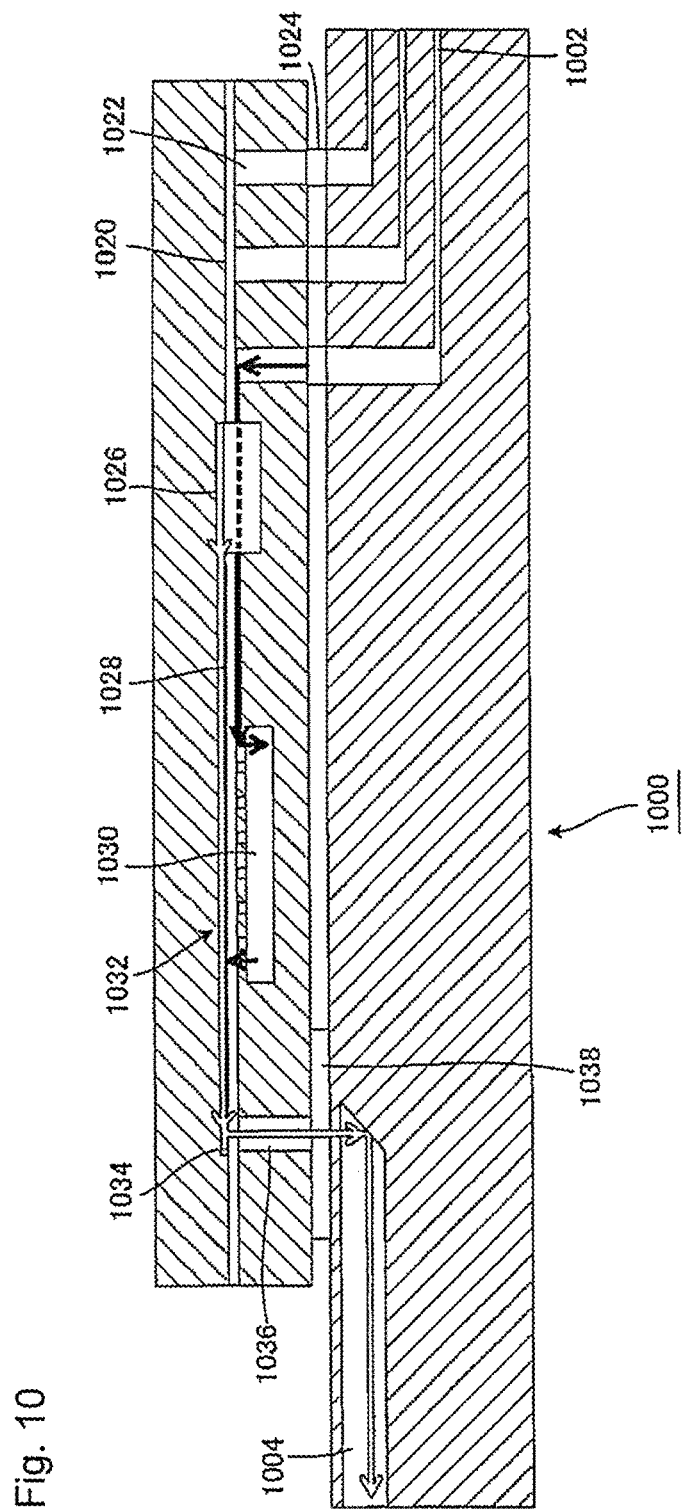
FIG. 10 is a drawing for explaining an example of incorporation of a photoelectric hybrid device into a photoelectric interposer/printed circuit board.

Unlike FIGS. 8 and 9, FIG. 10 shows an example of incorporation of a photoelectric hybrid device 1020 into a photoelectric interposer/printed circuit board 1000; wherein the photoelectric interposer/printed circuit board 1000 comprises electrical wiring 1002 and optical wiring (optical waveguides) 1004 formed in the same substrate, and inputting and outputting of optical signals and electric signals is carried out on the top surface of the substrate; and wherein an input/output surface of the photoelectric hybrid device 1020 is placed to face the input/output surface of the photoelectric interposer/printed circuit board 1000. Electrically conductive pins 1022, solder bumps 1024, a semiconductor laser 1026, optical waveguides 1028, a driver IC 1030, an optical modulator 1032, a grating coupler 1034, optical waveguides 1036, and a glass mask (a transparent member) 1038 that comprise the photoelectric hybrid device 1020, and manners of operation thereof, are similar to those described above.

In the case of FIG. 10, the photoelectric hybrid device is constructed in such a manner that the position, in terms of height, of the optically flat surface of the glass mask (the transparent member) 1038 is set to coincide with the height of each of the top part of the solder bump 1024 placed on the top part of the electrically conductive pin 1022; and it is constructed that, when the photoelectric hybrid device 1020 is incorporated into the photoelectric interposer/printed circuit board 1000, the positions of them are aligned.

Figure 11:
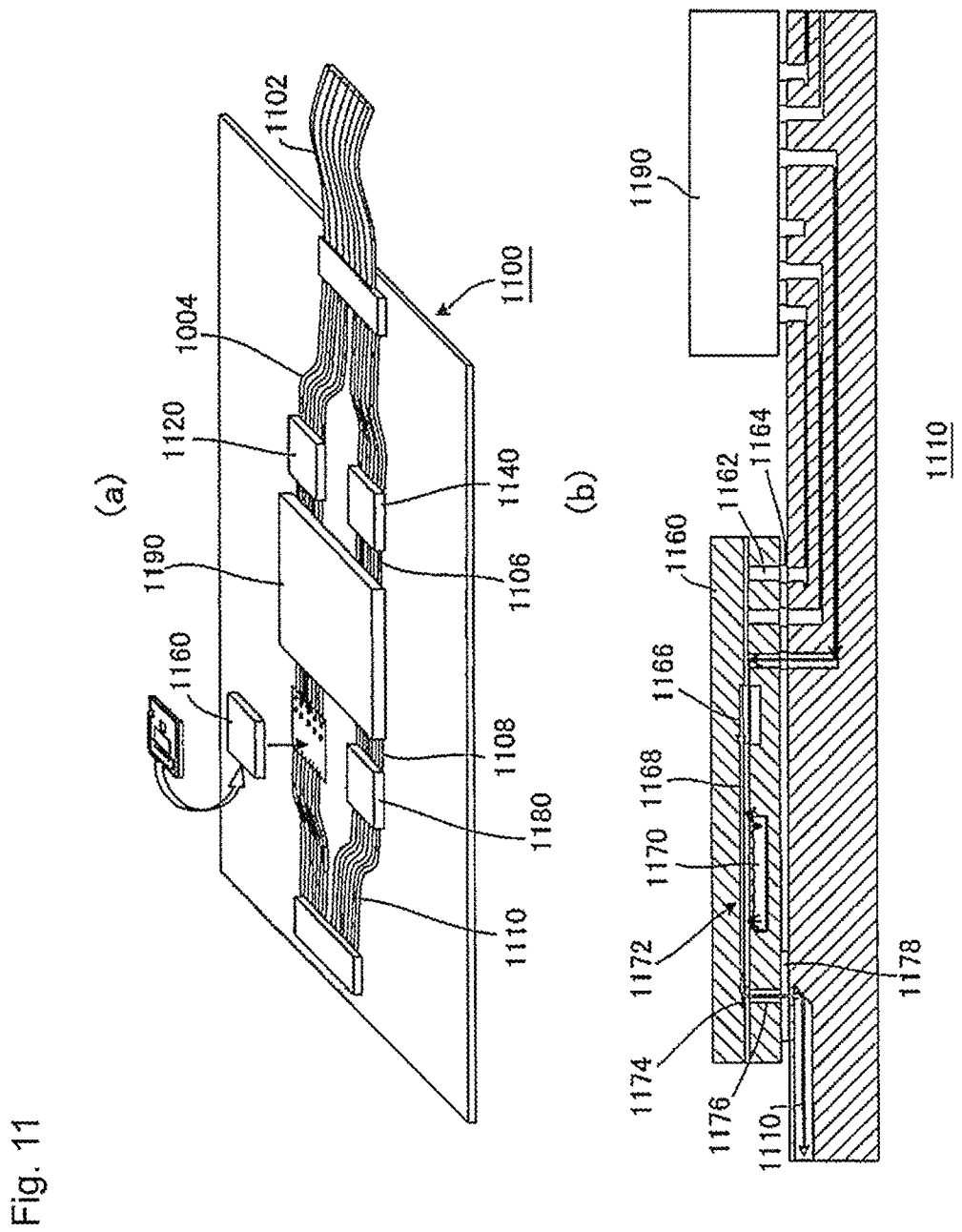
FIG. 11 is an illustration of a construction of installation of a photoelectric interposer/printed circuit board.

FIG. 11 shows an example of a construction of implementation of a photoelectric interposer/printed circuit board 1100 that is expected to be realized in the near future. In this example, it is constructed that of the position, in terms of height, of the optically flat surface of a glass mask (a transparent member) 1178 is set to coincide with the height of each of the top part of a solder bump 1164 placed on the top part of an electrically conductive pin 1162 (refer to (b) of FIG. 11); and it is constructed that, when the photoelectric hybrid device 1160 is incorporated into the photoelectric interposer/printed circuit board 1100, the positions of them are aligned. This construction is similar to that of FIG. 10.

A construction shown in FIG. 11 and a manner of operation thereof will be explained. As shown in (a) of FIG. 11, optical signals are inputted from the outside via an optical fibers 1102, the optical signals are inputted to reception-type photoelectric hybrid device 1120 and 1140 via optical waveguides 1104 in a circuit board of a photoelectric interposer 1100 and converted to electric signals, and the electric signals are inputted to a host LSI 1190 via electrical lines 1106. The host LSI 1190 comprises a CPU, switches and so on, and carries out variety of operational processes based on the inputted electric signals. Results of the operational processes are inputted as electric signals to transmission-type photoelectric hybrid device 1160 and 1180 via electrical lines 1108 in the circuit board of the photoelectric interposer 1100 and converted to optical signals, and the optical signals are outputted to the outside via optical waveguides 1110 in the circuit board of the photoelectric interposer 1100. Electrically conductive pins 1162, solder bumps 1164, a semiconductor laser 1166, optical waveguides 1168, a driver IC 1170, an optical modulator 1172, a grating coupler 1174, optical waveguides 1176, and a glass mask (a transparent member) 1178, that are shown in (b) of FIG. 11, that comprise the transmission-type photoelectric hybrid device 1160, and manners of operation thereof, are similar to those described above. Note that, although (a) of FIG. 11 shows a photoelectric interposer/printed circuit board 1100 on which four photoelectric hybrid devices 1120, 1140, 1160 and 1180 are boarded, the number of onboard photoelectric hybrid devices is not limited to four, i.e., any appropriate number of photoelectric hybrid devices can be boarded thereon.

[Example of a Method for Manufacturing a Photoelectric Hybrid Device]

Figure 12A:
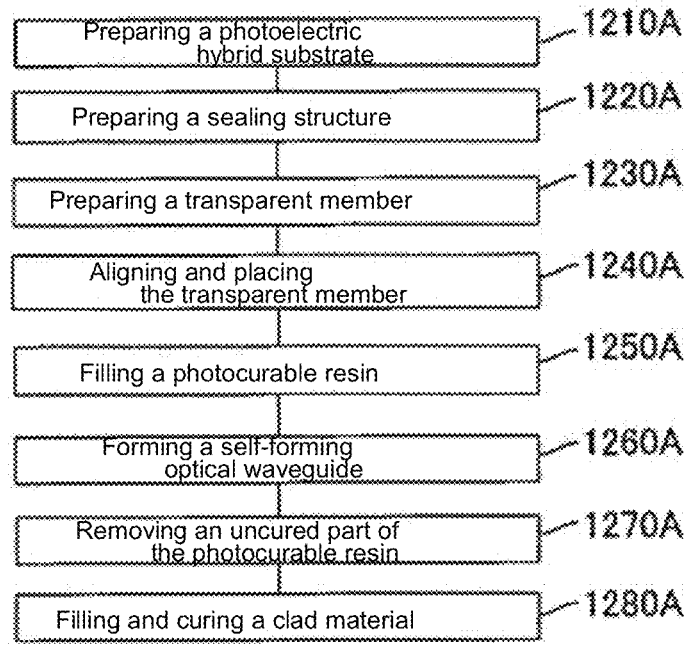
FIG. 12A is a flow chart showing an outline of an example of a manufacturing process of a photoelectric hybrid device.

An example of a method for manufacturing a photoelectric hybrid device will be explained. In the explanation, especially, a method for forming an optical waveguide will be focused on. FIG. 12A is a flow chart showing an outline of an example of a manufacturing method of a photoelectric hybrid device. In the following, each of steps 1210A-1280A will be explained.

(1) Step 1210A for Preparing a Photoelectric Hybrid Substrate

Figure 13:
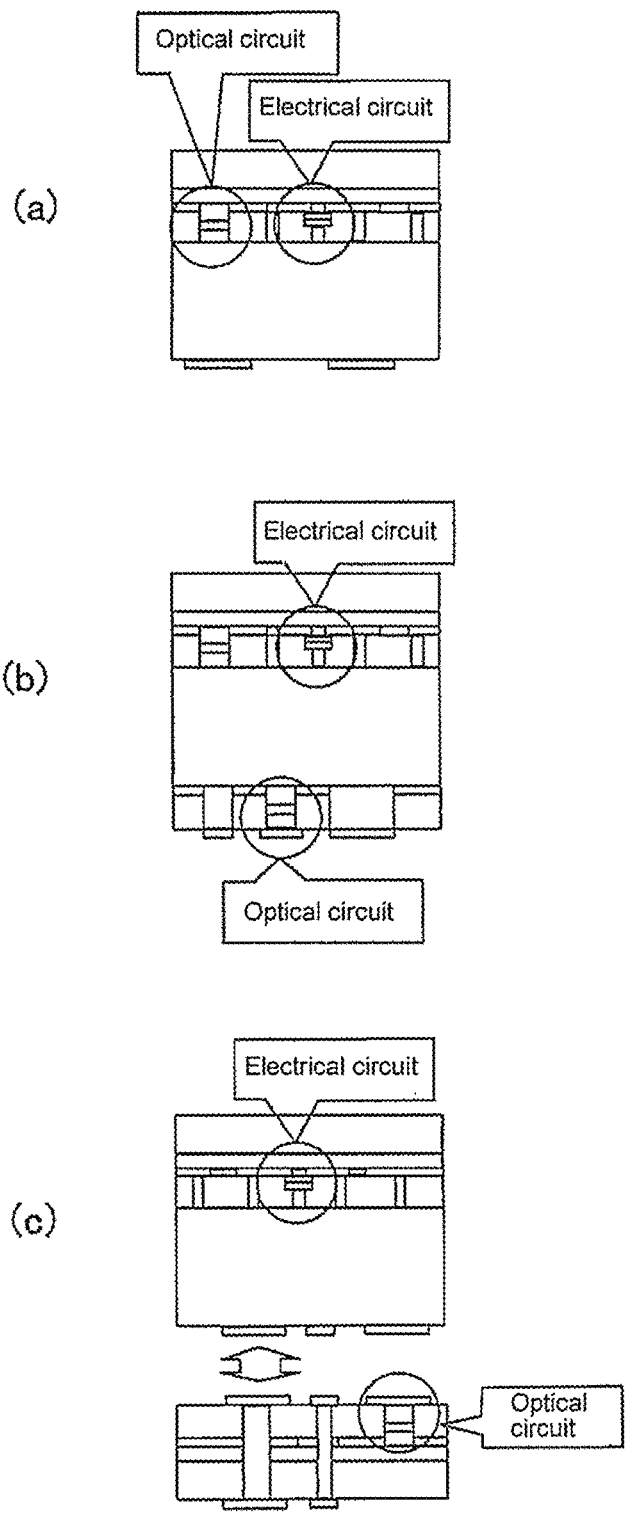
FIG. 13 is a drawing for explaining an outline of a method for integration of an optical circuit and an electronic circuit.

This is a step for preparing a photoelectric hybrid substrate that is provided with an optical waveguide for communicating an optical signal, an electric signal path for communicating an electric signal, an electronic circuit, an optical modulator, and/or a light source. Basically, there are three integration methods for integrating optical circuits and electronic circuits such as those shown in FIG. 13, i.e., (a) front-end integration, (b) back-end integration, and (c) flip-chip bonding; and these methods have characteristics respectively. In the present invention, it is possible to use an integration method such as the front-end integration of item (a) in which both of an optical circuit and an electronic circuit are formed in a Si substrate of a front-end side, or an integration method such as the back-end integration of item (b) in which an electronic circuit is formed in a substrate of a front-end side, and an optical circuit is formed in a substrate of a back-end side, wherein a wiring layer is provided between the front-end side and the back-end side. However, in view of easiness of production, an integration method of item (c), i.e., the flip-chip bonding, in which a substrate for forming an electronic circuit and a substrate for forming an optical circuit are made separately and these substrates are bonded together, is superior to other methods. In the case that the flip-chip bonding integration method of item (c) is used to construct an optical-transmission-type photoelectric hybrid device, in a substrate for forming an optical circuit, a light source (LD), optical waveguides, an optical modulator, and an optical receiver (PD) are one-chip-integrated on a silicon substrate by use of a silicon photonics technique; and a substrate for forming an electronic circuit is constructed by use of a conventional semiconductor circuit technique.

(2) Step 1220A for Preparing a Sealing Structure

A sealing structure to be used is made of a glass material, for example; and, in the case that the sealing structure is placed on the silicon substrate, it has a form that covers the silicon substrate except for a specific part thereof that is used for inputting and outputting optical signals. Also, on the sealing structure, plural holes that pierce through the member from the front side to the back side are formed; electrically conductive pins are fitted into the holes; and solder bumps are formed in advance on the top part of the surface of the electrically conductive pins. The sealing structure having a construction such as that explained above is fixed to the photoelectric hybrid substrate by bonding or the like.

(3) Step 1230A for Preparing a Transparent Member

Figure 14:
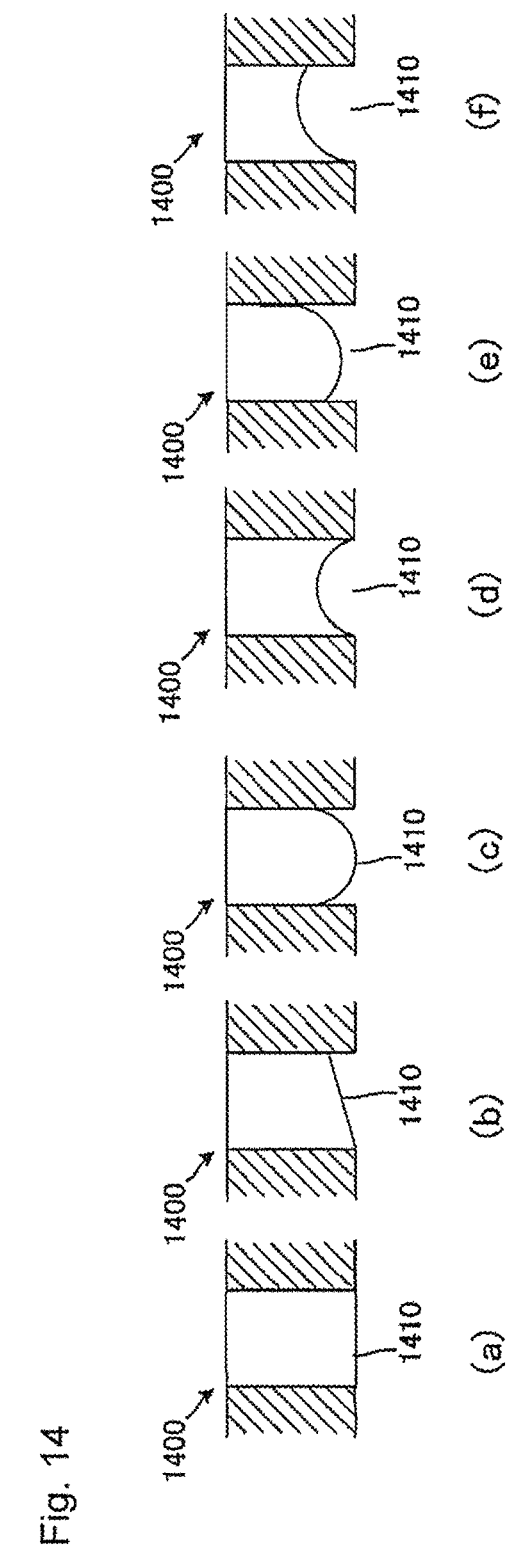
FIG. 14 is a schematic drawing for explaining a form of a cross section of a transparent part of a transparent member of a photoelectric hybrid device.

In a transparent member that is suitable for a photomask transfer method that will be explained later, a transparent part 9 is formed by coating a surface of a glass substrate by a light-shielding chrome film, and carrying out an etching process or the like to form openings having predetermined shapes on predetermined places of the chrome film, for example. As will be explained later, optical waveguides are formed by the light entered through the transparent part, in accordance with a self-forming optical waveguide forming method. The alignment marker holes of the transparent member are formed by etching the glass substrate. (a)-(e) of FIG. 14 show shapes of cross sections of openings of the glass substrate; and the shape of the optical waveguide (cylindrical, tapered, etc.) is determined based on the shape of cross section of the opening. (a) of FIG. 14 represents a shape for making an optical waveguide having a cylindrical shape, (b) of FIG. 14 represents a shape for making an optical waveguide having a slanted cylindrical shape, (c) of FIG. 14 represents a shape for making an optical waveguide having a tapered shape that has a diameter that gradually reduces along the downward direction, (d) of FIG. 14 represents a shape for making an optical waveguide having a reverse tapered shape that has a diameter that gradually increases along the downward direction, (e) of FIG. 14 represents a shape for making an optical waveguide having a tapered shape that has a slanted optical axis, and (f) of FIG. 14 represents a shape for making an optical waveguide having a reversed tapered shape that has a slanted optical axis. Methods for forming optical waveguides having the above shapes will be explained later. Note that, for forming the above optical waveguides, it is possible to carry out an exposure process by use of a photomask that is not shown, in place of carrying out an exposure process by use of the transparent member.

(4) Step 1240A for Aligning and Placing the Transparent Member

Alignment of the transparent member with a silicon substrate is accomplished by using an appropriate method such as a method of optically aligning an alignment mark on the transparent member with a reference point of the silicon substrate or the like. Completion of alignment of the transparent member with the silicon substrate will result in completion of alignment of the optical waveguide and an optical waveguide on the silicon substrate. Consequently, placing the transparent member is completed.

(5) Steps 1250A-1280A for Forming an Optical Waveguide

Step 1250A for filling a photocurable resin, step 1260A for forming a self-forming optical waveguide, step 1270A for removing an uncured part of the photocurable resin, and step 1280A for filling and curing a clad material correspond to a process for forming an optical waveguide. In the following, the steps for forming an optical waveguide will be explained altogether. The self-forming optical waveguide forming method of the present invention uses the so-called photomask transfer process (for a photomask transfer process, refer to Japanese Patent Application Public Disclosure No. 2007-71951, for example); and the transparent member, or a photomask that is not shown, corresponds to a "pattern" in the forming process of the self-forming optical waveguide. In the process for forming the self-forming optical waveguide by use of the photomask transfer process in the case that the transparent member also acts as a photomask, the space under the transparent member is filled by a photocurable resin, and light (ultraviolet rays) is irradiated from above of the transparent member. The light passes through the plural openings of the transparent part and irradiates the photocurable resin. The irradiated light propagates in the photocurable resin, and an index of refraction of a part of the photocurable resin through which the light propagated increases and, at the same time, the part of the photocurable resin is cured. Thereafter, by removing an uncured part of the photocurable resin, the self-forming optical waveguide is formed. Further, a clad material is filled in such a manner that the clad material covers periphery of the formed optical waveguides. For curing the clad material, a heat curing process can be used. Note that the clad material comprises a material that has an index of refraction different from that of the optical waveguide.

[Example of a Method for Manufacturing a Photoelectric Hybrid Device that does not have a Transparent Member]

Figure 12B:
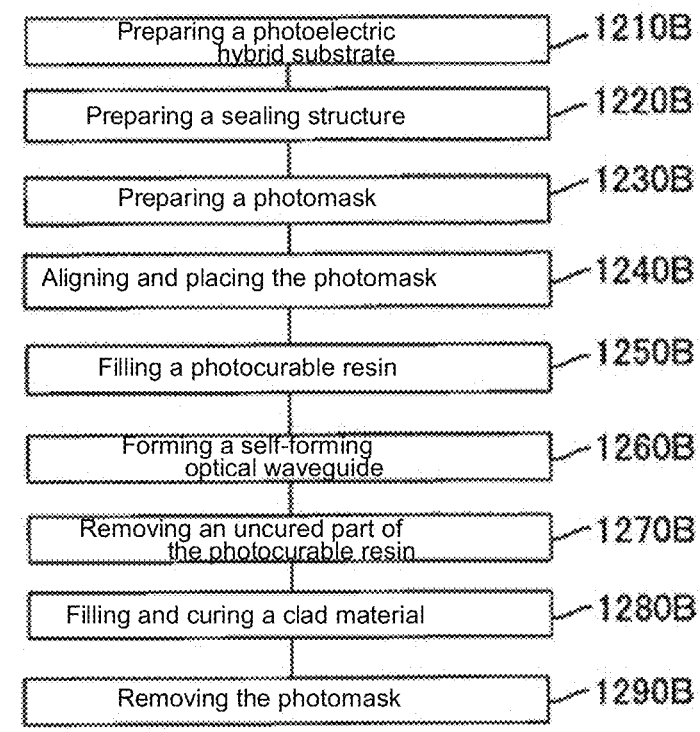
FIG. 12B is a flow chart showing an outline of another example of a manufacturing process of a photoelectric hybrid device.

An example of a method for manufacturing a photoelectric hybrid device that does not have a transparent member will be explained. FIG. 12B is a flow chart showing an outline of a manufacturing method of a photoelectric hybrid device that does not have a transparent member. In the following, steps different from those shown in FIG. 12A will be explained.

Step 1210B for preparing a photoelectric hybrid substrate and the Step 1220B for preparing a sealing structure of FIG. 12B are similar to the step 1210A for preparing a photoelectric hybrid substrate and the Step 1220A for preparing a sealing structure of FIG. 12A.

An outline of step 1230B for preparing a photomask is as follows.

In the process for making the photomask, a surface of a glass substrate is coated by a light-shielding chrome film, and an etching process or the like is carried out to form openings having predetermined shapes on predetermined places of the chrome film, for example. Further, by using a photomask having a prism, a lens or the like, an optical waveguide having a cylindrical shape such as that shown in (a) of FIG. 7, an optical waveguide having a slanted cylindrical shape such as that shown in (b) of FIG. 7, an optical waveguide having a tapered shape that has a diameter that gradually reduces along the downward direction such as that shown in (c) of FIG. 7, an optical waveguide having a reversed tapered shape that has a diameter that gradually increases along the downward direction such as that shown in (d) of FIG. 7, an optical waveguide having a tapered shape having a slanted axis such as that shown in (e) of FIG. 7, or an optical waveguide having a reversed tapered shape having a slanted axis such as that shown in (f) of FIG. 7 can be formed.

Step 1240B for aligning and placing the photomask, step 1250B for filling a photocurable resin, step 1260B for forming a self-forming optical waveguide, step 1270B for removing an uncured part of the photocurable resin, and step 1280B for filling and curing a clad material are similar to the above explained steps 1240A-1280A when the expression "transparent member" in the explanation of the steps 1240A-1280A is read as "photomask."

Step 1290B is a step for completing the photoelectric hybrid device by removing the photomask after the clad material has cured. Note that, after the photomask is removed, the surface of the photoelectric hybrid device on which the photomask was placed becomes an optically flat surface.

In the above step, in place of the construction that uses a photomask only, it is possible to use a construction that uses a thin glass plate and a photomask placed on the thin glass plate can be used. In this case, in the step 1240B for aligning and placing the photomask, it is possible to adopt a step comprising processes for first placing the thin glass plate at a position that is separated by a predetermined distance from the photoelectric hybrid substrate, then placing the photomask on the thin glass plate, and carrying out alignment, a step comprising processes for temporarily fixing the thin glass plate and the photomask, placing the construction comprising the temporarily fixed thin glass plate and photomask at a position that is separated by a predetermined distance from the photoelectric hybrid substrate, and carrying out alignment, or the like.

In the case that the construction comprising the thin glass plate and the photomask placed on the thin glass plate is used, it is possible to add a step for removing the photomask only before the step 1280B for filling and curing a clad material; and, in the step 1280B for filling and curing a clad material, it is possible to use a photocurable resin as the clad material, and form the clad member by fully expose the photocurable resin via the thin glass film to cure the photocurable resin.

Note that a parting agent is applied on the surfaces of the photomask and the thin glass plate that contact with the photocurable resin, so that removal of the photomask and the thin glass plate can be easily carried out.

[Examples for Ameliorating Heat Dissipation and Stabilizing Positioning of Transparent Members]

Figure 15:
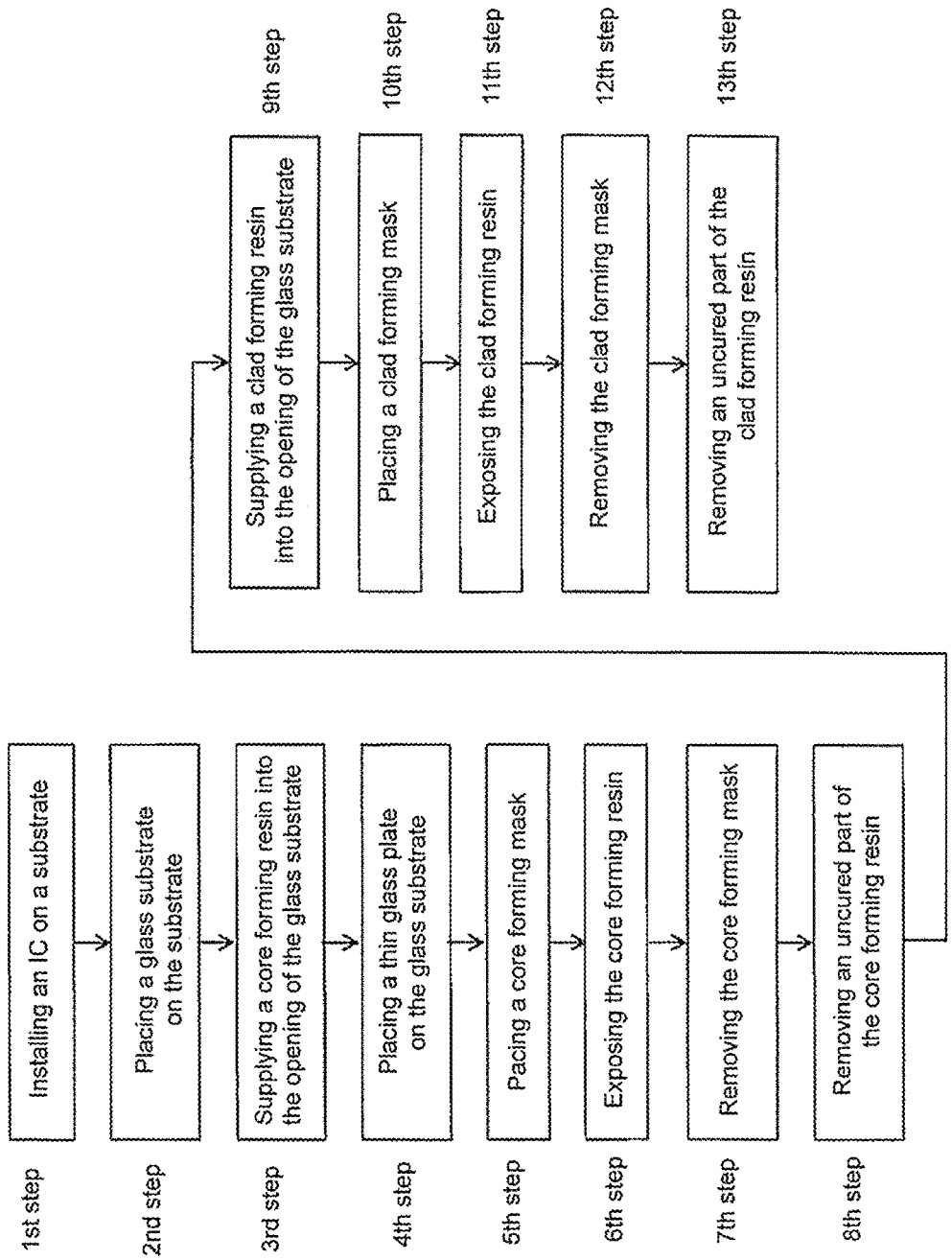
FIG. 15 is a flow chart showing an example of a manufacturing method of a photoelectric hybrid device.

Next, a photoelectric hybrid device manufacturing method for ameliorating heat dissipation and stabilizing positioning of transparent members will be explained with reference to figures. FIG. 15 is a flow chart showing an example of a method for manufacturing a photoelectric hybrid device. The manufacturing method comprises 1st step to 13th step. FIGS. 16-28 respectively show a device corresponding to each step.

Figure 16:
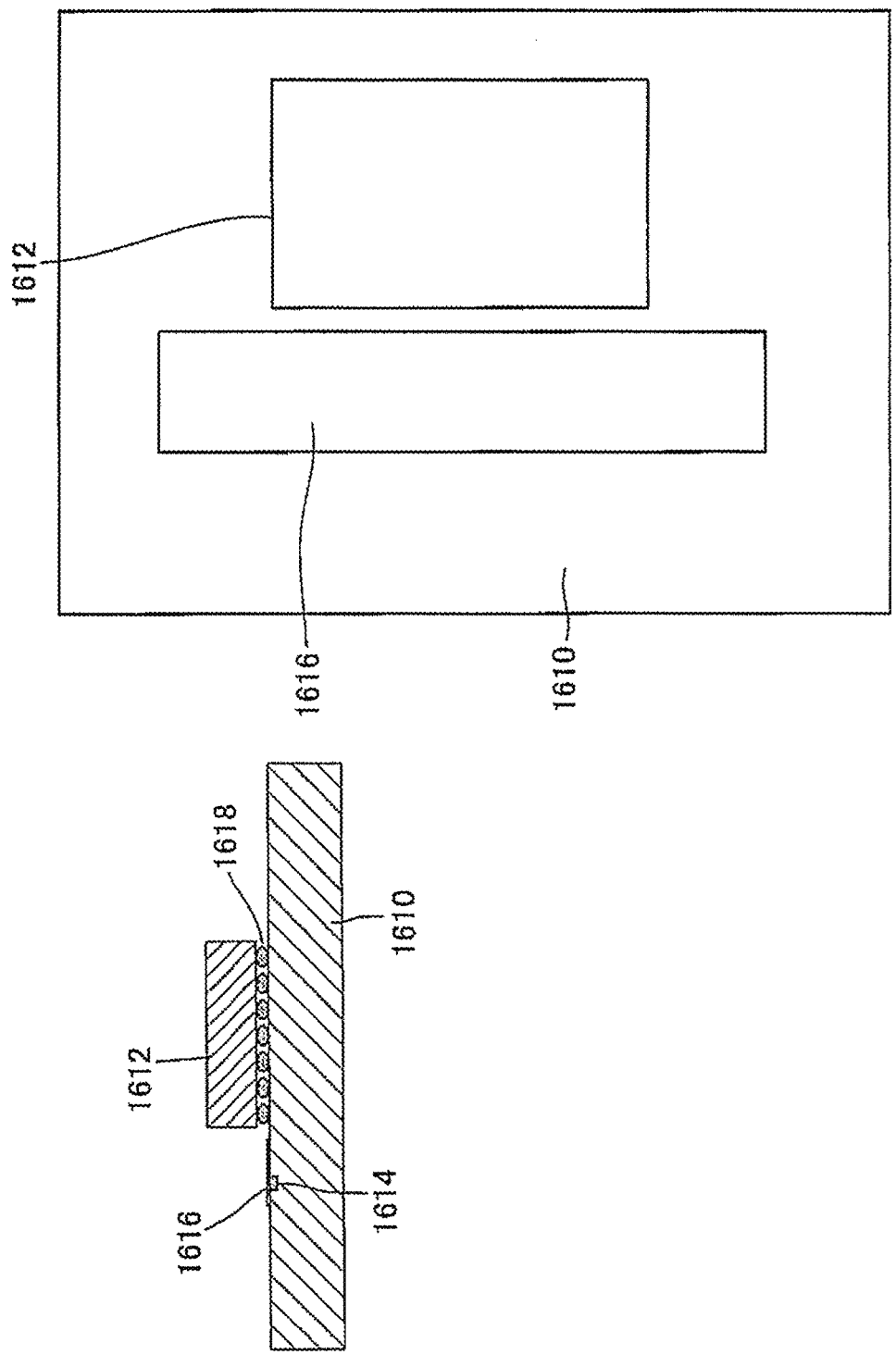
FIG. 16 is a drawing showing the 1st step of the example of the manufacturing method of the photoelectric hybrid device.
Figure 17:
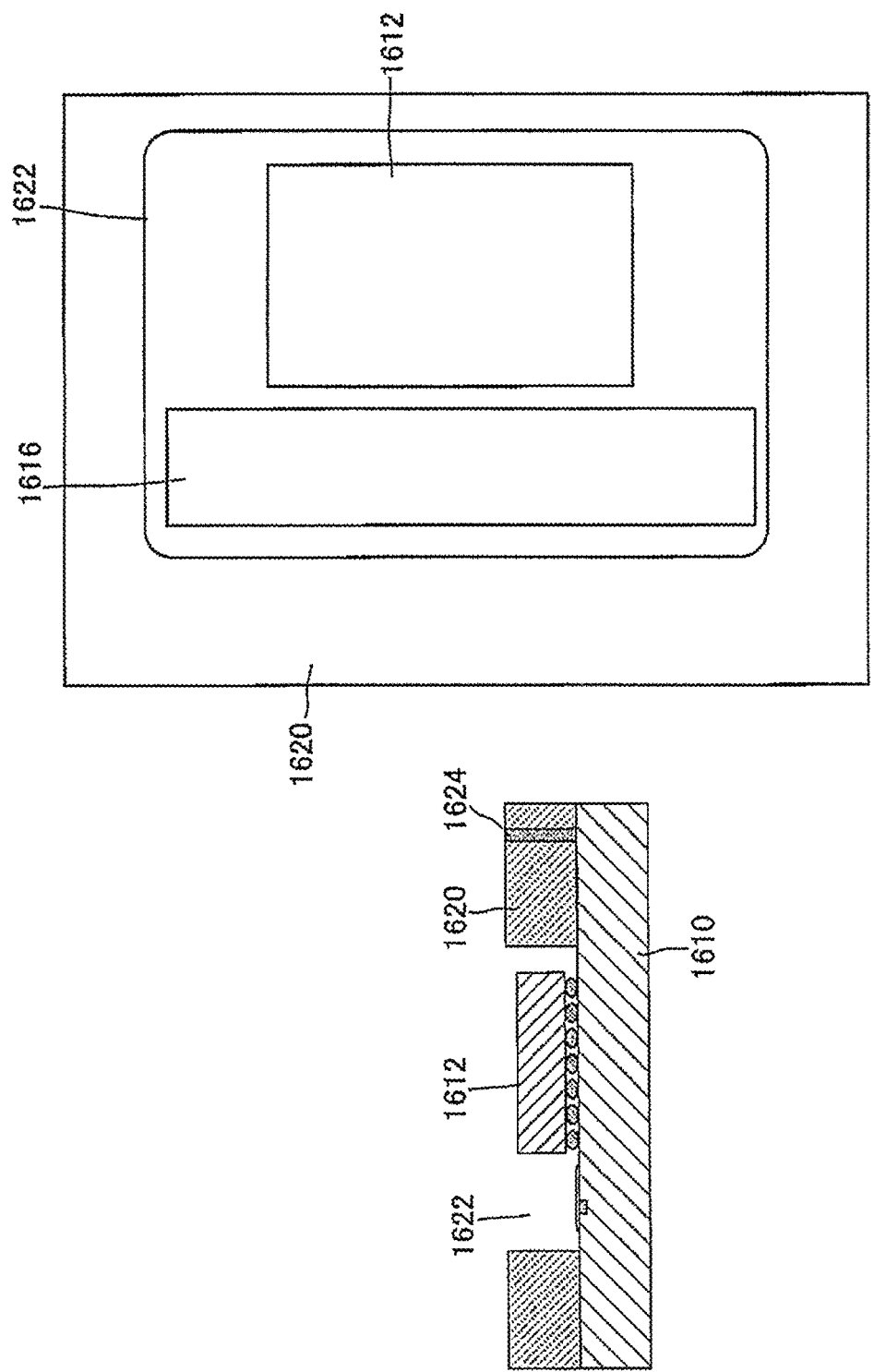
FIG. 17 is a drawing showing the 2nd step of the example of the manufacturing method of the photoelectric hybrid device.

First, in the 1st step, an IC (an electronic component) 1612 is installed on a substrate 1610 (FIG. 16). The substrate 1610 is a SOI substrate, for example; and an optical circuit 1614 is formed on the substrate 1610 in advance. An example of the optical circuit 1614 is a photodiode, a grating coupler, or the like. In the case that the optical circuit 1614 is a photodiode, the photodiode is placed in such a manner that its light receiving surface faces upward; and, on the substrate 1610, an electric wiring (not shown) for communicating a received signal to the IC 1612 is further provided. In the case that the optical circuit 1614 is a grating coupler, on the substrate 1610, a light source, an optical modulator for modulating light from the light source, and a planar optical waveguide for guiding an optical signal (a transmission light) modulated by the optical modulator to the grating coupler are further provided (all of these elements are not shown). The grating coupler is constructed to have a function to upwardly flip up the optical signals propagated through the planar optical waveguide. Further, on the substrate 1610, an antireflection film 1616 for preventing reflection of exposure light from the substrate 1610 during an exposure step, that will be explained later, is formed in advance.

The IC 1612 is a driver IC for electrically driving the above optical modulator, or a transimpedance amplifier (TIA) for carrying out I-V conversion of the received signal (electrical current) from the above photodiode. The IC 1612 is installed on the substrate 1610 in such a manner that each terminal of the IC 1612 side is connected to an electrical wiring (a wiring that electrically connects to the optical modulator or the photodiode) of the substrate 1610 side via connection electrodes 1618 such as a ball grid array (BGA) or the like.

Next, in the 2nd step, a glass substrate (a spacer) 1620 is installed on the substrate 1610 (FIG. 7). The glass substrate 1620 comprises a continuous large opening 1622; and the glass substrate 1620 is installed in such a manner that the IC 1612 and an area for forming vertical optical waveguides (i.e., the portion corresponding to the antireflection film 1616), that will be explained later, are housed inside the opening 1622. The glass substrate 1620 has a thickness larger than the height of the installed IC 1612 (i.e., the height from the surface of the substrate 1610 to the top surface of the IC 1612) and, thus, the top surface of the IC 1612 is located at a dented position that is lower than the upper end of the opening 1622. The glass substrate 1620 further comprises through wiring (TGV) 1624, and the through wiring 1624 is connected to the IC 1612 via electrical wiring (not shown) on the substrate 1610 and the above connection electrodes 1618.

Figure 18:
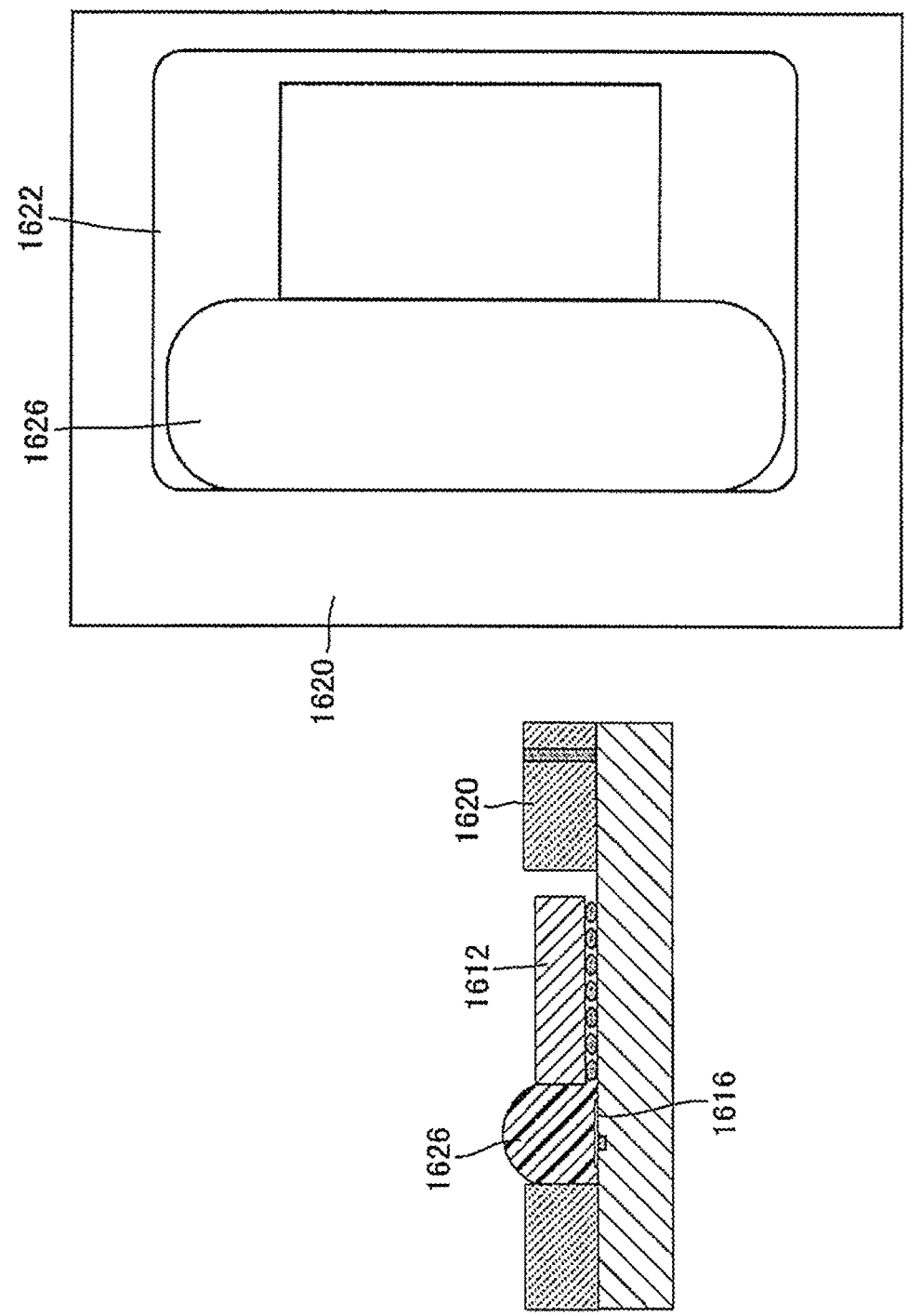
FIG. 18 is a drawing showing the 3rd step of the example of the manufacturing method of the photoelectric hybrid device.

Next, in the 3rd step, a photocurable resin 1626 for forming an optical waveguide core is supplied onto the area for forming the vertical optical waveguides within the opening 1622 of the installed glass substrate 1620 (FIG. 18). The area for forming the vertical optical waveguides corresponds to a part of the antireflection film 1616 located between the IC 1612 and walls of the opening 1622. The resin 1626 for cores is filled into a space between a side surface of the IC 1612 and the walls of the opening 1622 such that the height of the surface of the core resin 1626 slightly exceeds the position of the upper end of the opening 1622.

Figure 19:
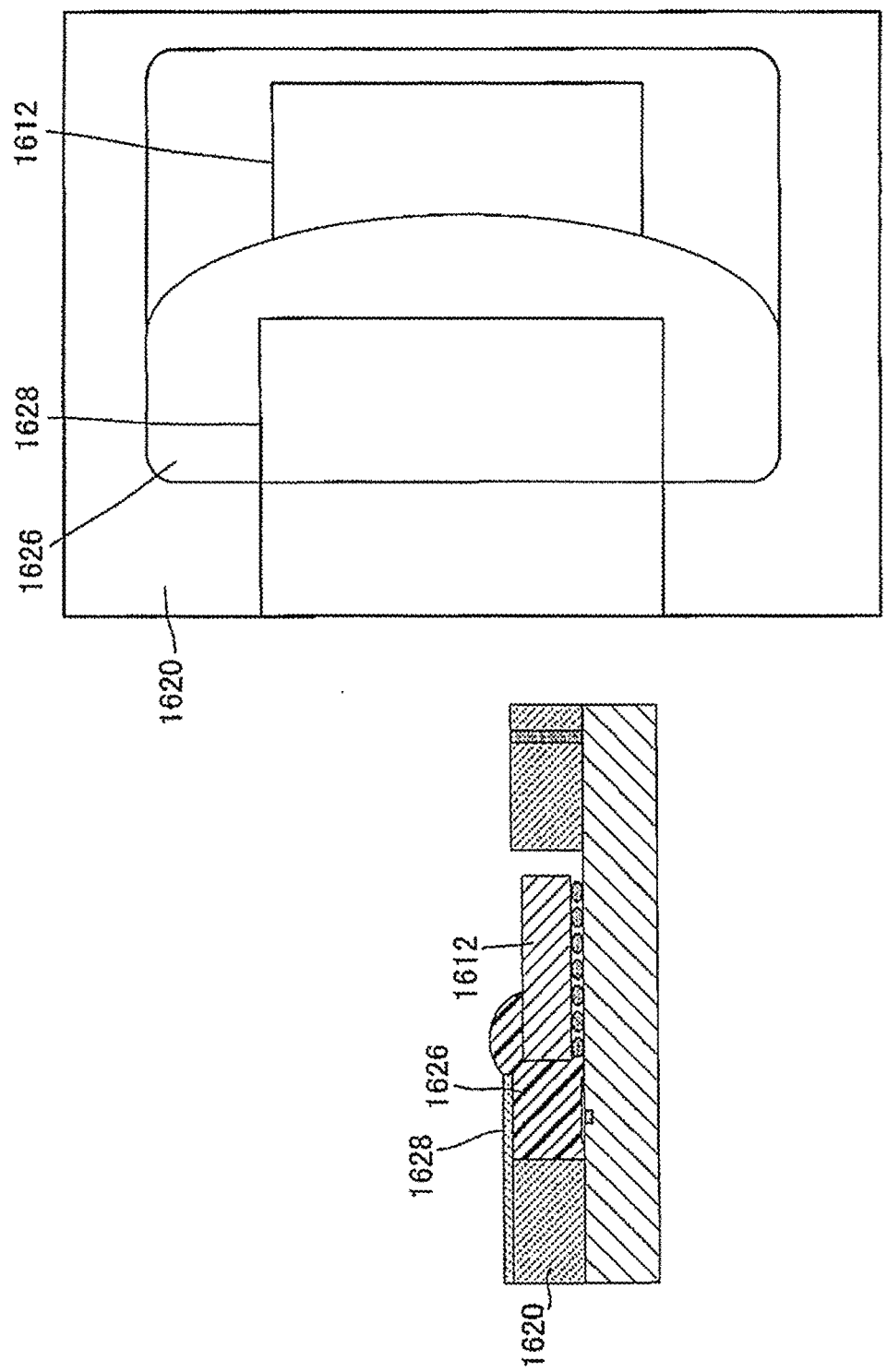
FIG. 19 is a drawing showing the 4th step of the example of the manufacturing method of the photoelectric hybrid device.

Next, in the 4th step, a thin glass plate (a transparent plate material) 1628 is installed on the glass substrate 1620 in such a manner that a part of the thin glass plate 1628 overhangs the area for forming the vertical optical waveguides (FIG. 19). In this regard, the thin glass plate 1628 is placed in such a manner that the part of the thin glass plate 1628 that overhangs from the glass substrate 1620 covers (overlaps) the whole of the area for forming the vertical optical waveguides, when it is viewed from above. As a result, the whole space between the overhung part of the installed thin glass plate 1628 and the area for forming the vertical optical waveguides is filled by the core resin 1626. Note that, when the thin glass plate 1628 is placed on the glass substrate 1620, a redundant portion of the core resin 1626 spreads onto the top surface of the IC 1612, and another portion of the core resin 1626 also enters interstices of a contact surface between the thin glass plate 1628 and the glass substrate 1620. By the core resin 1626 entered the interstices, the thin glass plate 1628 and the glass substrate 1620 are temporarily fixed together.

Figure 20:
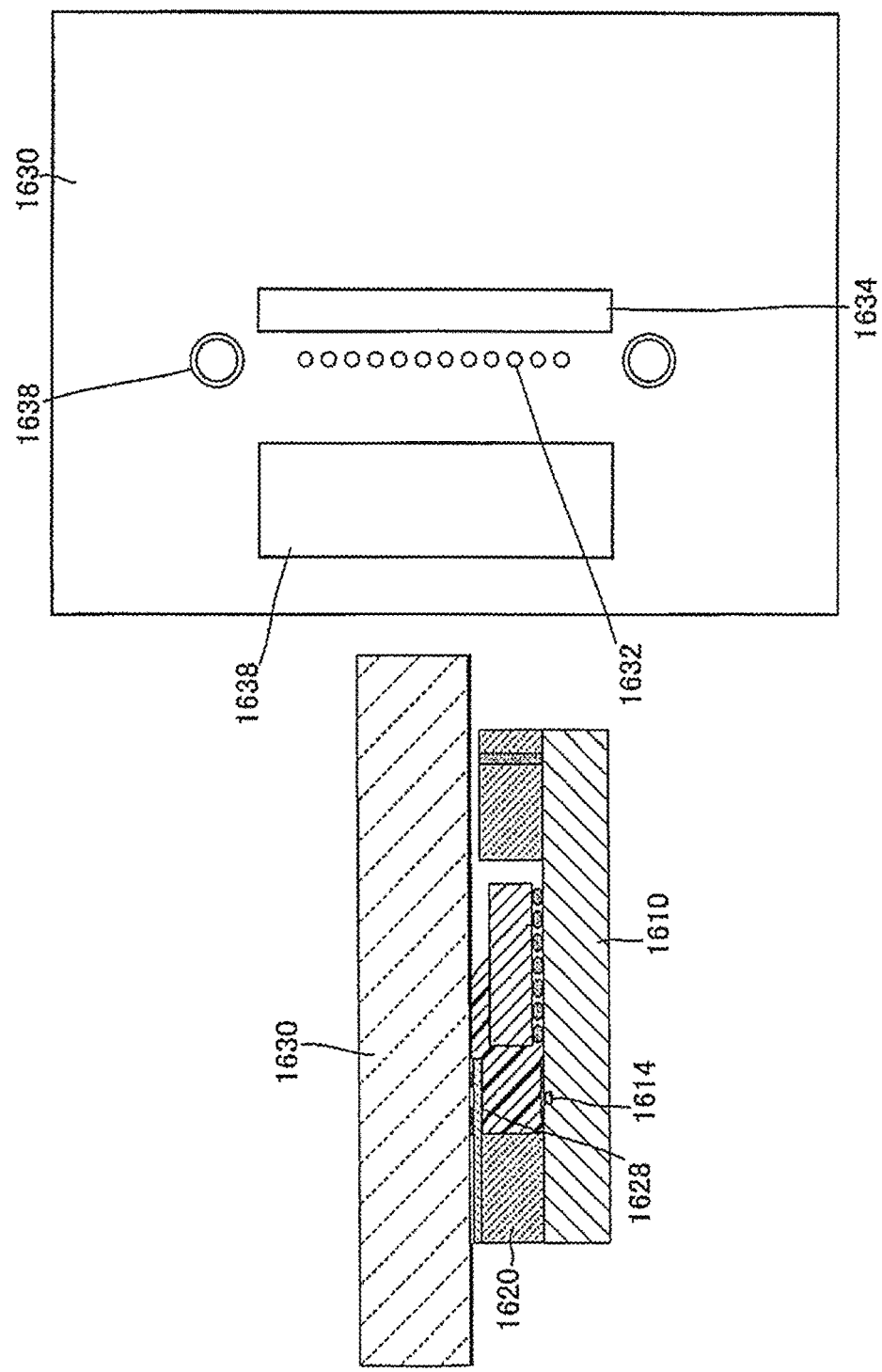
FIG. 20 is a drawing showing the 5th step of the example of the manufacturing method of the photoelectric hybrid device.

Next, in the 5th step, a core forming mask 1630 is placed (FIG. 20). A metal film for shading light when carrying out an exposure process is formed on a side of a glass plate of the core forming mask 1630, except for the places for transparent parts 1632 for forming vertical optical waveguide cores, a transparent parts 1634 for forming thin glass plate supporting part, a transparent parts 1636 for the thin glass plate adhering part, and a transparent parts 1638 for forming alignment holes. The transparent parts 1632 for forming vertical optical waveguide cores are provided to correspond to positions and the number of optical circuits 1614 on the substrate 1610. The transparent parts 1634 for forming thin glass plate supporting part is provided at a place corresponding to the place of the end of the overhung part of the thin glass plate 1628 that overhangs from the glass substrate 1620. The transparent parts 1636 for the thin glass plate adhering part is provided at a place corresponding to the place of the contact surface between the thin glass plate 1628 and the glass substrate 1620. The transparent parts 1638 for forming alignment holes are provided for the purpose of forming holes for alignment that may be used when connecting an optical fiber connector after completion of the photoelectric hybrid device.

Figure 21:
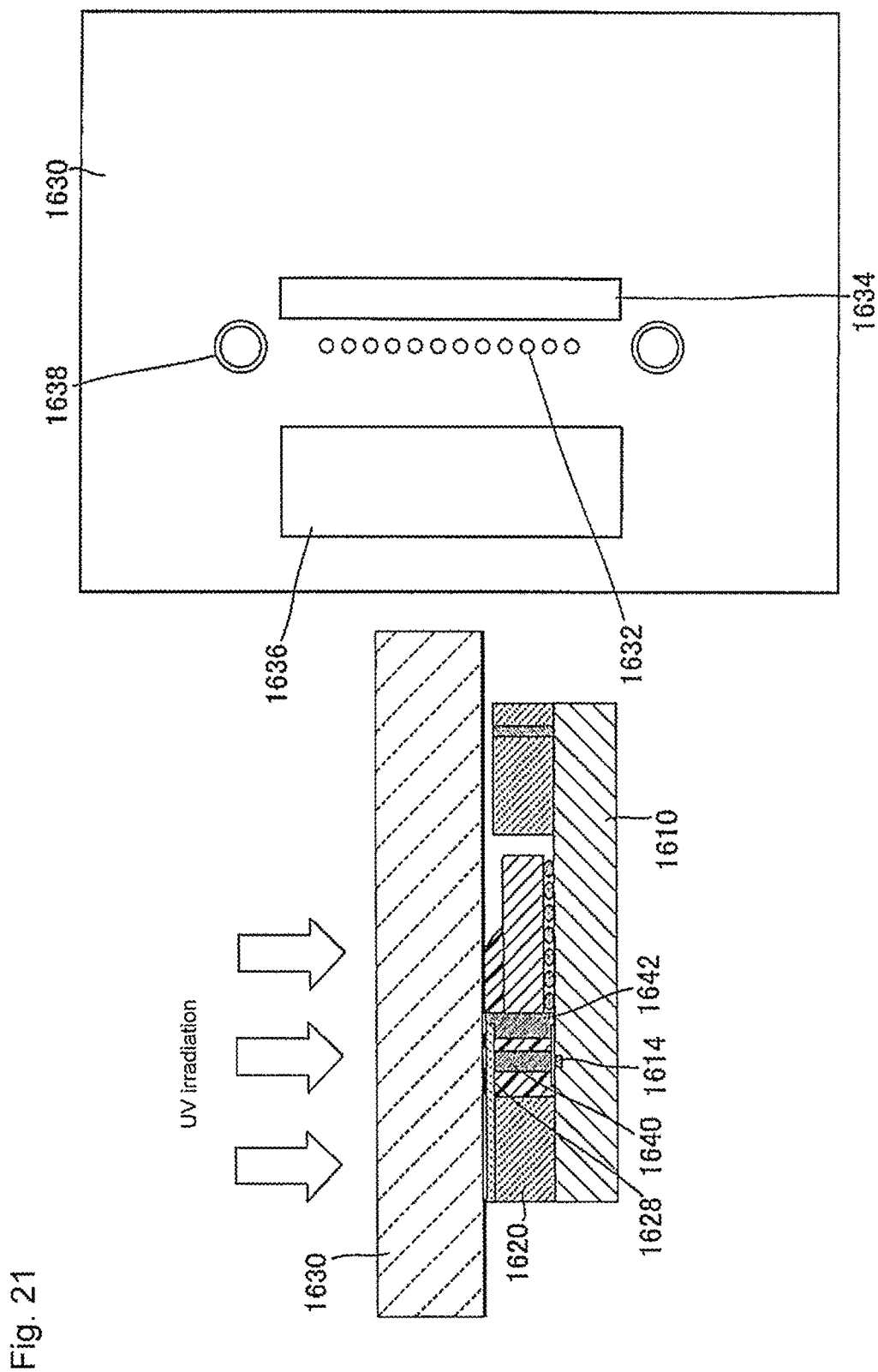
FIG. 21 is a drawing showing the 6th step of the example of the manufacturing method of the photoelectric hybrid device.

Next, in the 6th step, exposure via the core forming mask 1630 is carried out (FIG. 21). Light having a wavelength at which the core resin 1626 can be cured when exposed (for example, UV light) may be used as the exposure light. By exposure, the core resin 1626 that underlies the transparent part 1632, 1634, 1636, and 1638 are cured. As a result, under the transparent parts 1632 for forming vertical optical waveguide cores, pillar-shaped (vertical) optical waveguide cores 1640 are formed between the thin glass plate 1628 and the optical circuits 1614 on the substrate 1610, standing vertically to the substrate 1610. Also, under the transparent parts 1634 for forming thin glass plate supporting part, a thin glass plate supporting part 1642 is formed to intervene between the end of the thin glass plate 1628 overhung from the glass substrate 1620 and the surface of the substrate 1610 and support the end of the thin glass plate 1628 at a position above the substrate 1610. Since the thin glass plate 1628 is firmly supported by the thin glass plate supporting part 1642, the load applied by the overhung part of the thin glass plate 1628 does not concentrate on the optical waveguide cores 1640, i.e., the load is also distributed to the thin glass plate supporting part 1642; thus, it is possible to prevent the optical waveguide cores 1640 from collapsing due to the load applied by the thin glass plate 1628 (after removal of an uncured part of the resin, that will be explained later). Further, under the transparent parts 1636 for the thin glass plate adhering part, the core resin 1626 has entered interstices of a contact surface between the thin glass plate 1628 and the glass substrate 1620, as explained above; and, by exposing and curing the core resin 1626 in the interstices, the thin glass plate 1628 and the glass substrate 1620 are firmly fixed (actually fixed) together.

Figure 22:
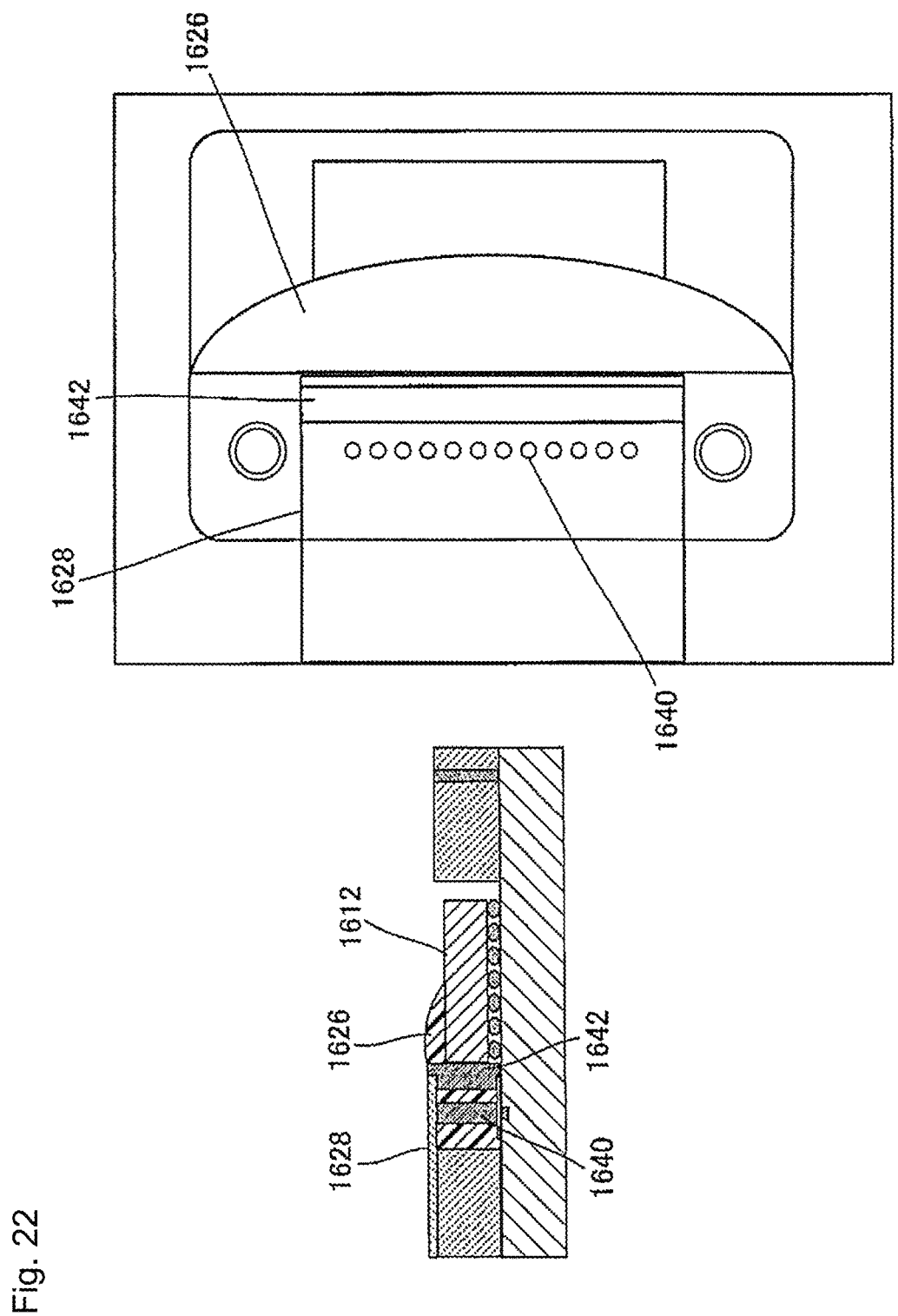
FIG. 22 is a drawing showing the 7th step of the example of the manufacturing method of the photoelectric hybrid device.

Next, in the 7th step, the core forming mask 1630 is removed (FIG. 22).

In this manner, forming of the vertical optical waveguide cores 1640, forming of the thin glass plate supporting part 1642, and fixing of the thin glass plate 1628 to the glass substrate 1620 can be carried out at the same time by the same exposure process. Note that, as shown in the figures, the thin glass plate supporting part 1642 is formed to contact with a side surface of the IC 1612, and to be a part of the opening on the IC 1612 that will be explained later. That is, a part of the opening of the IC 1612 is also formed together by this exposure process.

Figure 23:
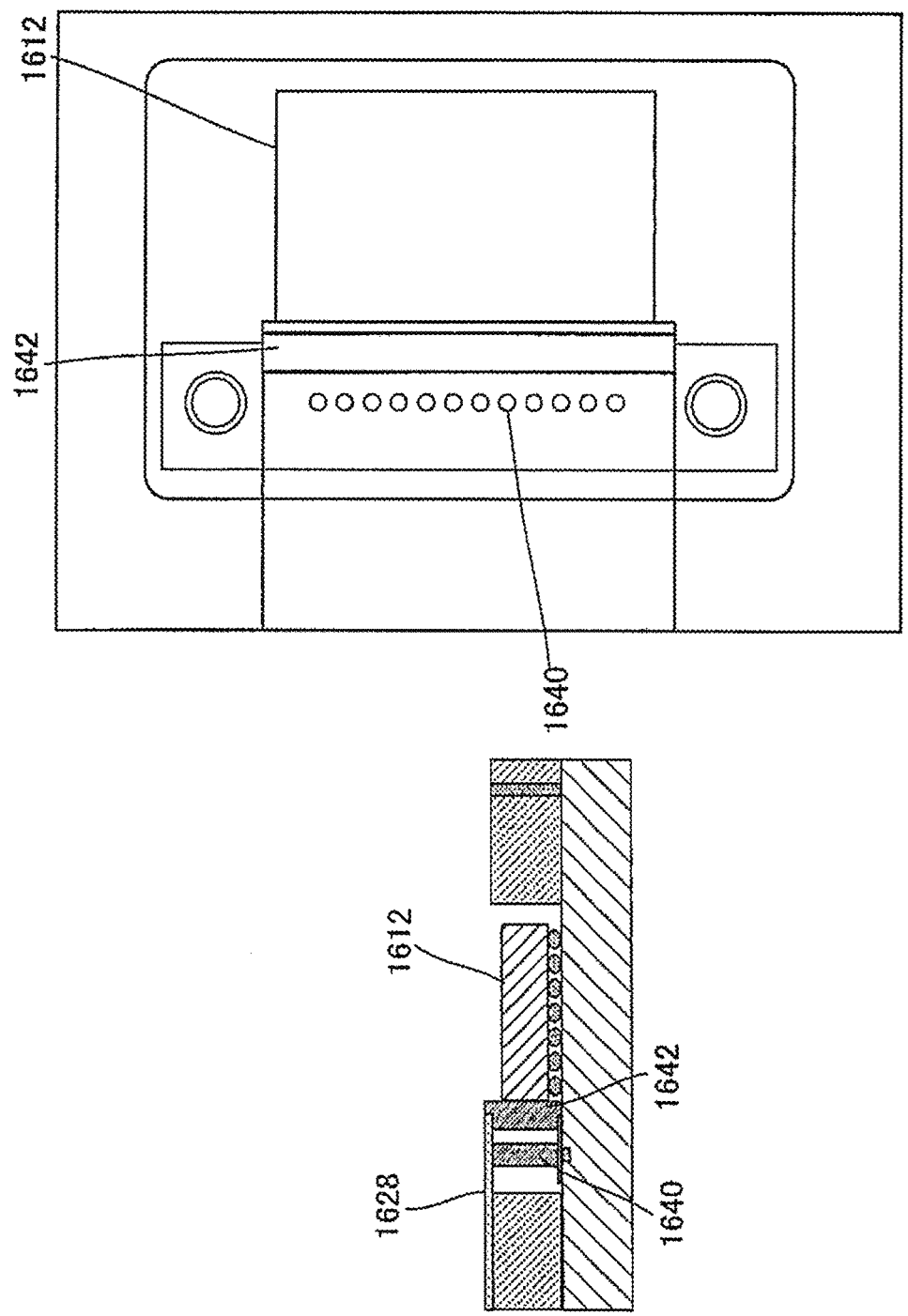
FIG. 23 is a drawing showing the 8th step of the example of the manufacturing method of the photoelectric hybrid device.

Next, in the 8th step, a part of the core resin 1626 that remains uncured after the exposure process, is washed away by a solution (FIG. 23).

Next, in the 9th step, a photocurable resin 1644 for forming an optical waveguide clad is supplied to fill the whole space within the opening 1622 of the glass substrate 1620 (FIG. 24). In this step, the resin 1644 for the clad is filled into the space such that the height of the surface of the clad resin 1644 slightly exceeds the position of the upper end of the opening 1622, and thus, the whole of the top surface of the IC 1612 is covered by the clad resin 1644 completely.

Figure 25:
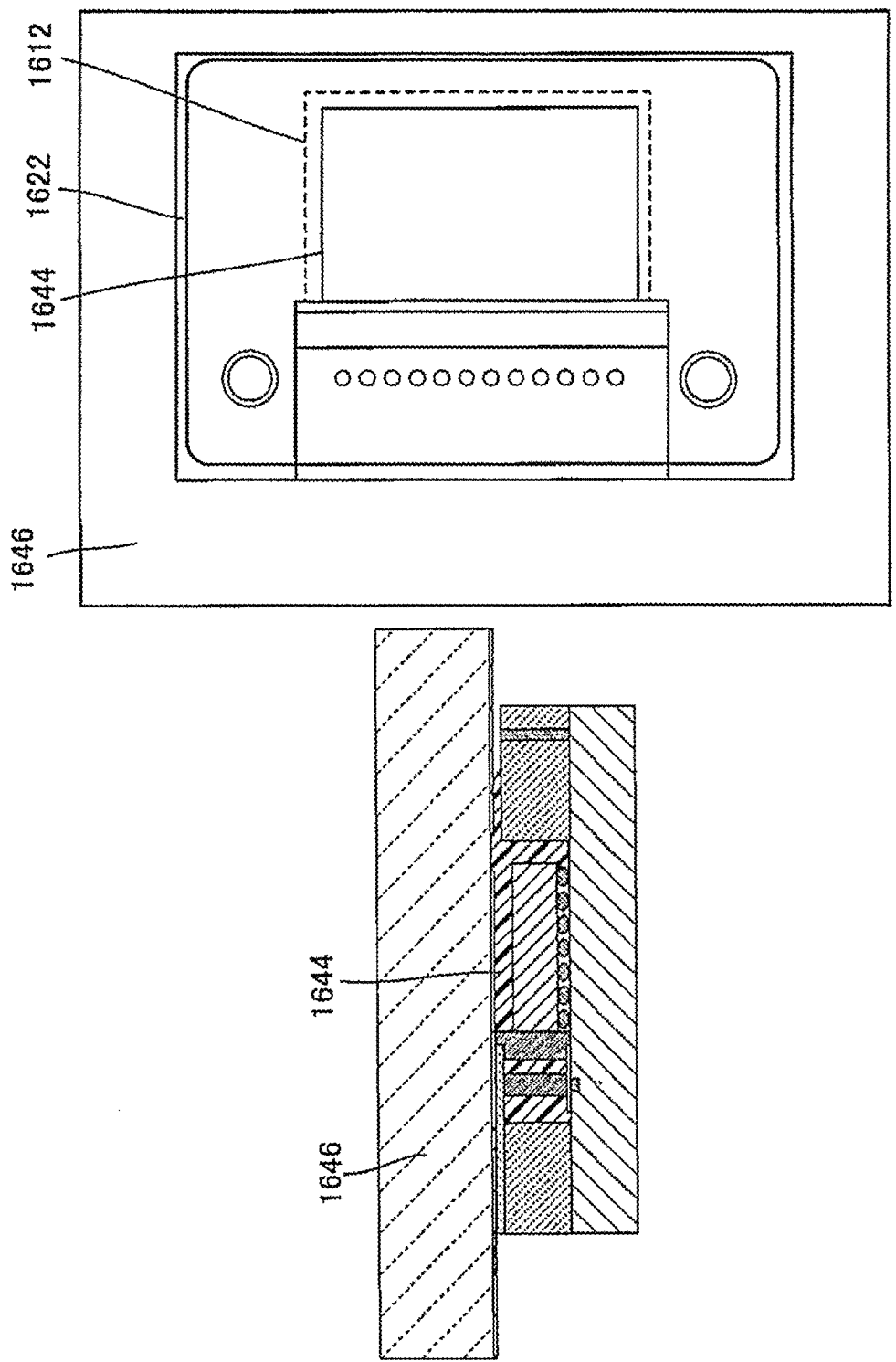
FIG. 25 is a drawing showing the 10th step of the example of the manufacturing method of the photoelectric hybrid device.

Next, in the 10th step, a mask 1646 for forming the clad is placed (FIG. 25). On a side of a glass plate of the clad forming mask 1646, a metal film for shading light when carrying out an exposure process is formed in the area of a shading part 1648 for forming an IC opening and in the peripheral area outside the opening 1622 of the glass substrate 1620. The shading part 1648 for forming the IC opening is provided for forming an opening on the IC 1612 that will be explained later; and the shading part 1648 is located at a place corresponding to the top surface of the IC 1612, and has a shape and a size to cover substantially the whole of the top surface of the IC 1612 (e.g., the area of the shading part 1648 is slightly smaller than that of the top surface of the IC 1612).

Figure 26:
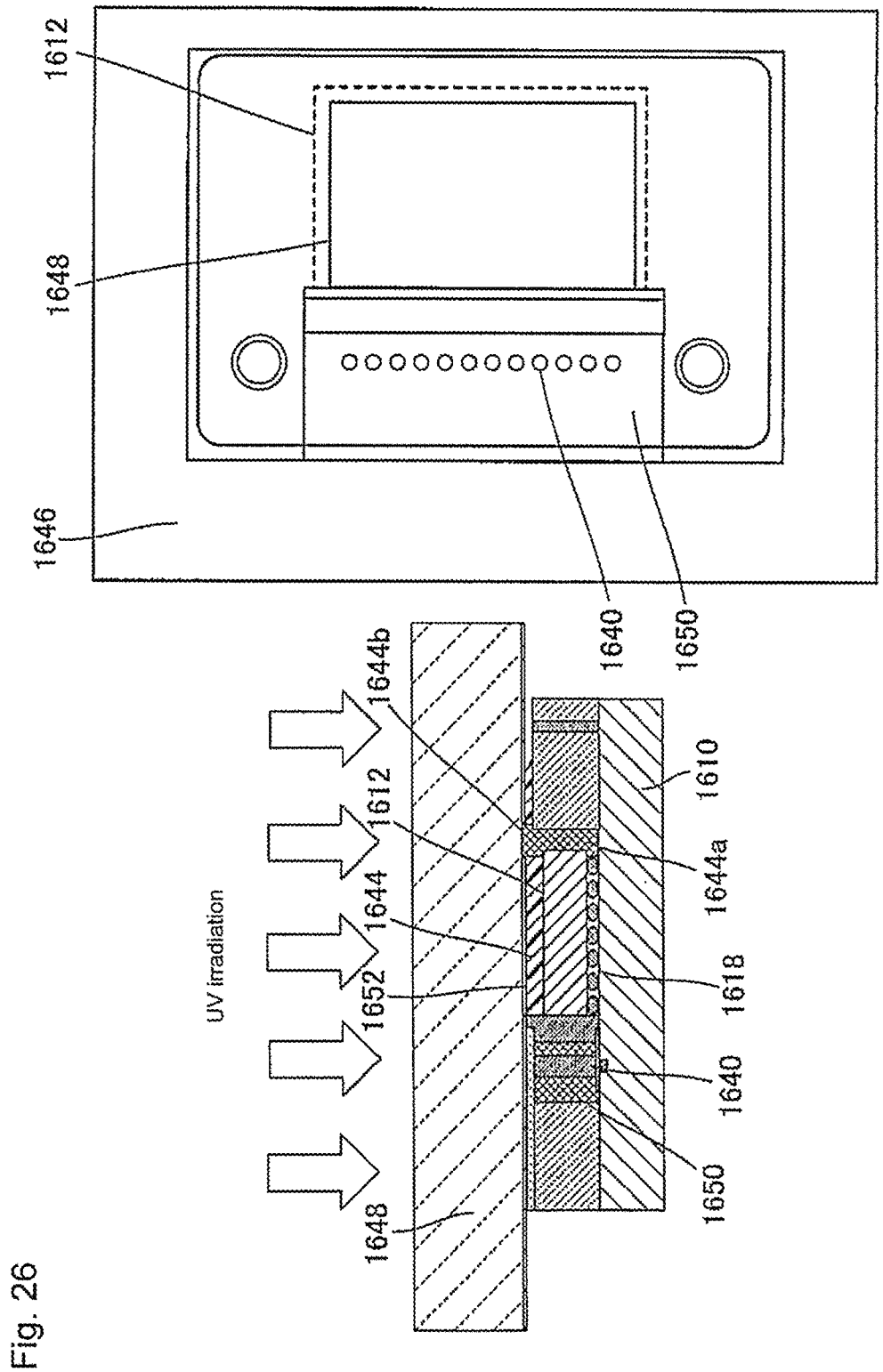
FIG. 26 is a drawing showing the 11th step of the example of the manufacturing method of the photoelectric hybrid device.

Next, in the 11th step, exposure process is carried out by use of the clad forming mask 1646 (FIG. 26). Similar to the manner that the core resin 1626 is exposed, light having a wavelength at which the clad resin 1644 can be cured when exposed (for example, UV light) may be used as the exposure light. By exposure, the clad resin 1644 that has been filled in the opening 1652 of the glass substrate 1620, except for the portion of the resin that underlies the shading part 1648 for forming an IC opening, i.e., except for the portion of the resin that lies on the top surface of the IC 1612, is cured. As a result, a vertical optical waveguide clad 1650 is formed around the vertical optical waveguide cores 1640. In addition, since the clad resin 1644*a* is also cured around the interstices between the bottom surface of the IC 1612 and the substrate 1610 (the interstices in which the connection electrodes 1618 are placed), the connection electrodes 1618 that electrically connect the IC 1612 to the substrate 1610 are sealed. Further, on the top surface of the IC 1612, the clad resin 1644*b* located around the outer boundary of the IC 1612 is cured to form a wall surrounding the outer boundary; and the shading part 1648 for forming the IC opening on the clad forming mask 1646 causes the residual clad resin 1644 to remain uncured. That is, the wall consisting of the cured clad resin 1644*b* that surrounds the outer boundary of the IC 1612 produces the opening 1652 above the top surface of the IC 1612.

Figure 27:
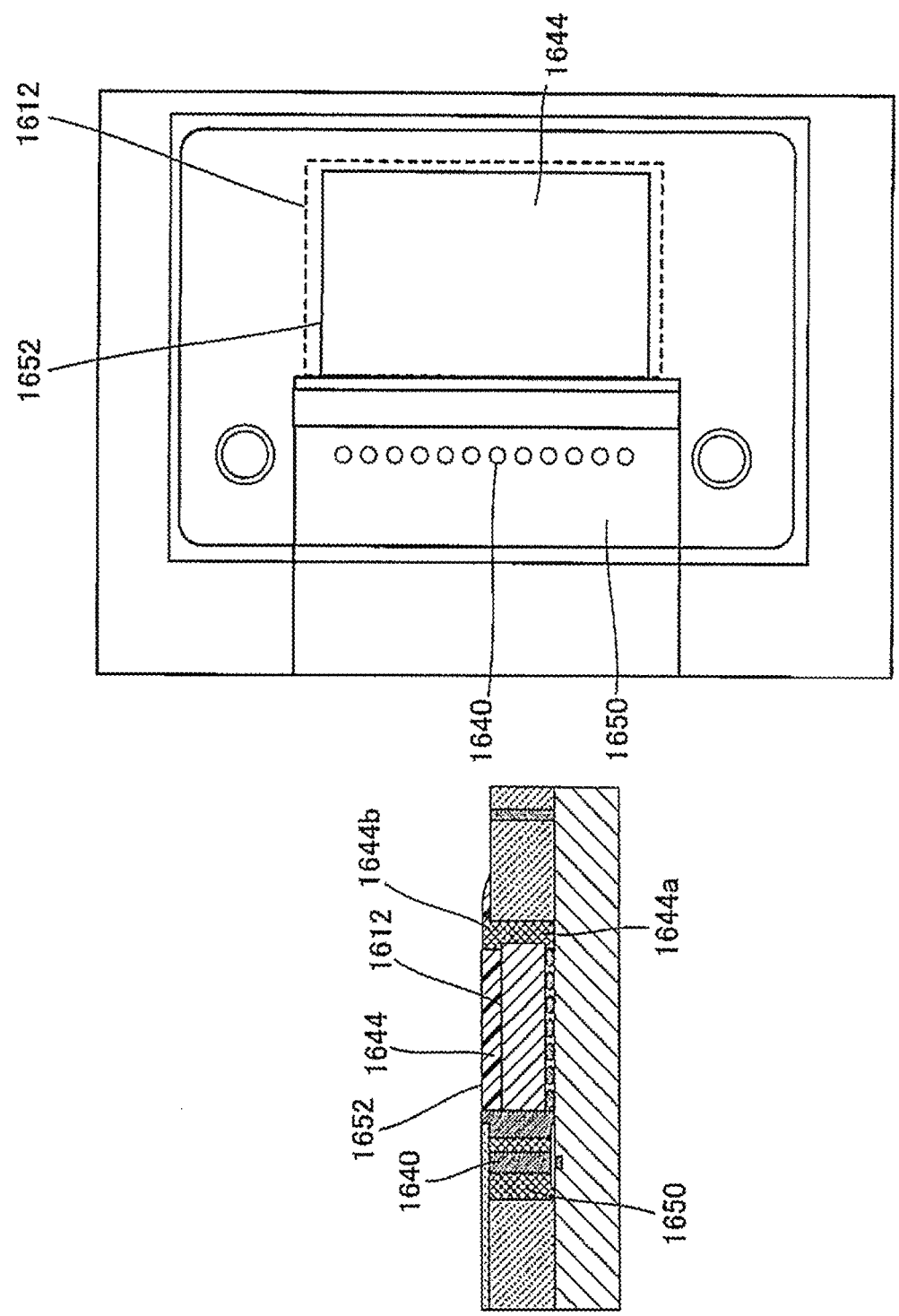
FIG. 27 is a drawing showing the 12th step of the example of the manufacturing method of the photoelectric hybrid device.

Next, in the 12th step, the clad forming mask 1646 is removed (FIG. 27).

In this manner, forming of the vertical optical waveguide clad 1650, forming of the opening 1652 above the top surface of the IC 1612, and sealing of the connection electrode 1618 can be carried out at the same time by the same exposure process.

Figure 28:
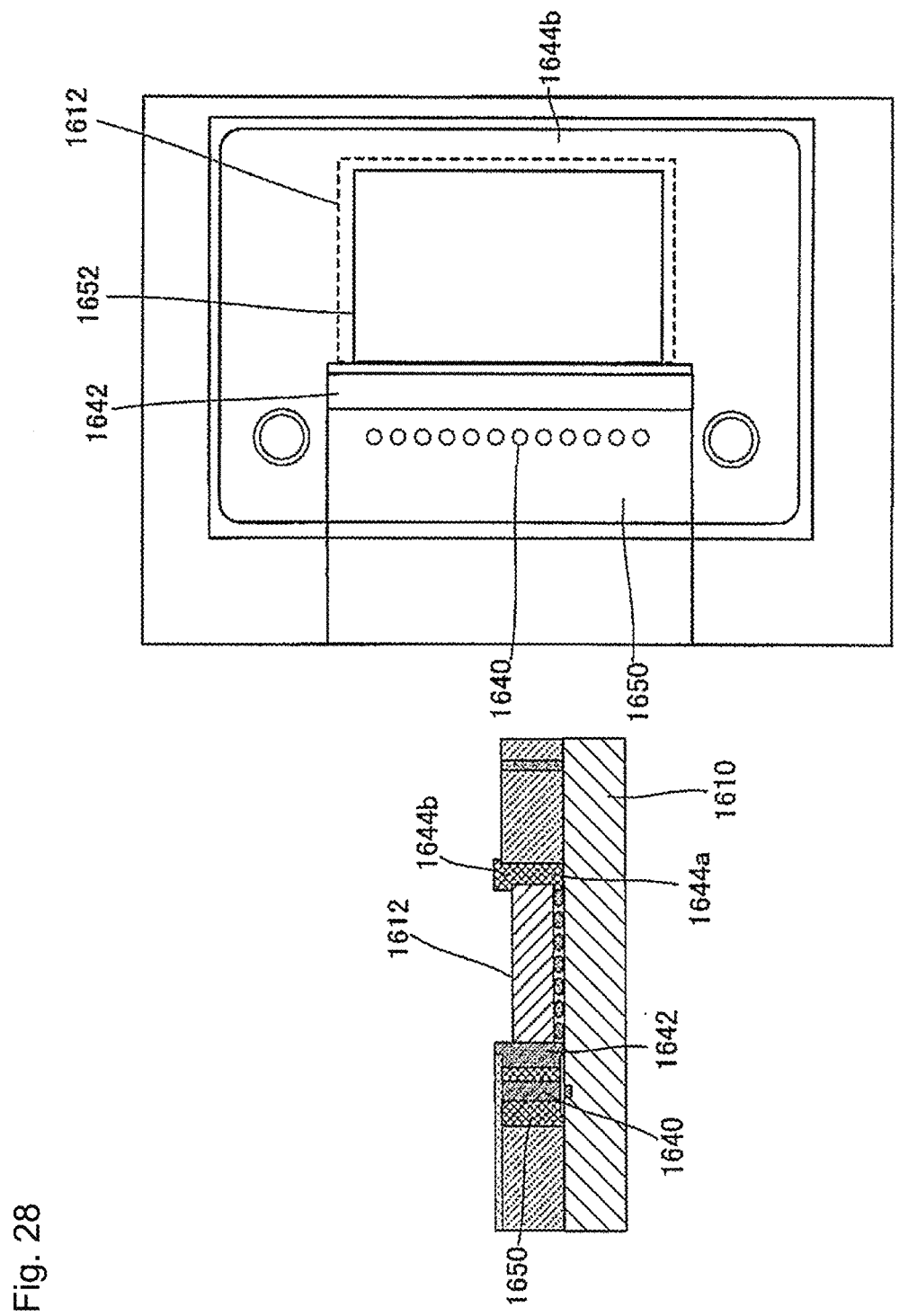
FIG. 28 is a drawing showing the 13th step of the example of the manufacturing method of the photoelectric hybrid device.

Next, in the 13th step, the clad resin within the opening 1652, which remains uncured after the exposure, is removed by washing it by a developing solution (FIG. 28). Note that clad resin also remains uncured around the connection electrode located beneath the IC 1612, since it is shaded by the IC 1612 at the time of exposure process. However, since the IC 1612 is surrounded by the cured clad resin 1644*a* at this point as explained above, it is not possible to remove the uncured clad resin around the connection electrode by the washing process. Accordingly, a heating process may be applied to cure the uncured clad resin around the connection electrode separately. Note that it is also possible to add an underfill resin on the place around the bottom surface of the IC 1612 in advance for preventing the clad resin from entering into interstices below the bottom surface of the IC 1612.

By carrying out the above steps, the photoelectric hybrid device having the opening 1652 above the top surface of the IC 1612 is completed. FIG. 28 shows a completed form of the photoelectric hybrid device. As explained above, since the opening 1652 is formed at the same time as the vertical optical waveguide during the forming (exposing) process of the vertical optical waveguide, it is not necessary to introduce an additional step and, thus, it is possible to simplify the manufacturing method. When the photoelectric hybrid device according to the present embodiment is in operation, it is possible to effectively dissipate heat from the IC 1612 via the opening 1652, by coupling a heat sink to the top surface of the IC 1612 via a resin having a good thermal conductivity.

In the above, although an embodiment of the present invention relating to the photoelectric hybrid device, that is suitable to ameliorate heat dissipation and stabilize positioning of transparent members, has been described, the present invention is not limited to the above embodiment. It is possible to modify the embodiment in a variety of ways without departing from the scope of the gist of the present invention. In the following, examples of some modifications will be explained.

Although it depends on the size of the thin glass plate 1628 overhanging from the glass substrate 1620, the shape and the size of the vertical optical waveguide core 1640, and so on, it may be possible that the vertical optical waveguide core 1640 maintains the standing state, i.e., the vertical optical waveguide core 1640 may not collapse, even if the thin glass plate supporting part 1642 does not exist. In such a case, the thin glass plate supporting part 1642 can be omitted, and the whole of the wall of the opening 1652 above the top surface of the IC 1612 will be made of the clad resin 1644.

It is also possible to fabricate the photoelectric hybrid device according to the present invention without using the glass substrate 1620. Specifically, prior to exposing the core resin 1626, the thin glass plate 1628 is attached (temporarily fixed) to the core forming mask 1630, and the height of the core forming mask 1630 is adjusted by holding the core forming mask 1630 by the exposure device. The core resin 1626 is then exposed to cure a portion for supporting the thin glass plate 1628 as well as the vertical optical waveguide core 1640. If the supporting part is formed to have a size that is sufficiently large, the supporting part can be used in place of the glass substrate 1620 to support the thin glass plate 1628. Note that, for temporarily fixing thin glass plate 1628 to the core forming mask 1630, an adhesive having adhesiveness allowing an element to be attachable and detachable, vacuum suction, and so on may be used.

[Methods for Making Optical Waveguides having Modified Shapes]

In the photomask transfer method explained above, it is possible to form self-forming optical waveguides having a variety of shapes, by changing a plane shape and/or a cross sectional shape of the opening of the transparent member or by using a photomask that provides effect similar to that of the above method. In the following description, the method for forming self-forming optical waveguides having a variety of shapes by changing a plane shape and/or a cross sectional shape of the opening of the transparent member will be explained mainly.

The transparent member 1400 of FIG. 14 is in the shape of a plane board and, except for the opening 1400, masked by chrome or the like that is deposited by metal deposition to prevent light from transmitting through the transparent member 1400. Accordingly, the photocurable resin is irradiated by the light that passed through the opening 1410. In the example of (a) of FIG. 14, the bottom surface of the opening 1410 is flat, and an optical waveguide having a cylindrical shape such as that shown in (a) of FIG. 7 will be formed accordingly. However, regarding the examples of the openings 1410 shown in (b)-(f) of FIG. 14, one of the cross sections of these openings 1410 is formed to have a slanted plane shape, and some cross sections are formed to be provided with convex and concave microlenses. Further, by changing the focal length of the microlens and/or the slope of the optical axis, it becomes possible to appropriately change the shape of the self-forming optical waveguide to be formed.

That is, by using a slanted plane shape such as that shown in (b) of FIG. 14, the optical axis can be slanted, and an optical waveguide having a cylindrical shape such as that shown in (b) of FIG. 7 is formed. Also, by using a convex microlens such as that shown in (c) of FIG. 14, the light can be converged, and an optical waveguide having a tapered shape that has a diameter that gradually reduces along the downward direction such as that shown in (c) of FIG. 7 is formed. Further, by using a concave microlens such as that shown in (d) of FIG. 14, the light can be diverged, and an optical waveguide having a reverse tapered shape that has a diameter that gradually reduces along the upward direction such as that shown in (d) of FIG. 7 is formed. Still further, by slanting the optical axes of the microlenses (refer to (e) and (f) of FIG. 14), an optical waveguide having a tapered shape that has a slanted optical axis (refer to (e) of FIG. 7) and an optical waveguide having a reversed tapered shape that has a slanted optical axis (refer to (f) of FIG. 7) are formed.

Note that a process for peeling and removing a transparent member is included in a regular photomask transfer method; however, in the example explained above, the transparent member is not peeled or removed, and the unpeeled transparent member, that is remaining, is used as an optical flat. By adopting a construction such as that explained above, in the case that an optical connector is placed on the photoelectric hybrid device, and in the case that the photoelectric hybrid device is brought to contact with a photoelectric interposer/printed circuit board, it becomes possible to precisely align the two objects for alignment respectively.

Also, although the method for forming the self-forming optical waveguide described above is based on the photomask transfer method, the self-forming optical waveguide may be formed by placing an end of an optical fiber in close proximity to a transparent member, applying light in such a manner that the incident light is transmitted through a photocurable resin to cure a part irradiated by the incident light, and removing an uncured part of the photocurable resin (for example, refer to Japanese Patent Application Public Disclosure No. 2003-131064). Even in such a case, by adjusting a direction of an optical axis an optical fiber and/or placing one of a variety of lenses on an end of the optical fiber, it becomes possible to form an optical waveguide having one of a variety of forms, and it becomes possible to use the transparent part as an optical flat. Note that the transparent member in this case can be constructed by use of a transparent glass plate.

Note that a transparent member is used as a mask in the photomask transfer method in the above example; however, instead of using the transparent member that also functions as the mask, it is possible to prepare and use another mask to carry out operations similar to those carried out by use of the transparent member.

[Example for Preventing Curing of the Photocurable Resin Due to Reflection from a Substrate, at a Place at which Curing of the Photocurable Resin is not Desired]

As explained above, when forming an optical waveguide having a slanted optical axis, there is a risk that the photocurable resin is cured at a place at which curing of the photocurable resin is not desired, due to reflection from a substrate. Thus, it is necessary to prevent unnecessary curing of the photocurable resin at a place at which curing of the photocurable resin is not desired. Embodiments described below show a preferable technique for preventing curing of the photocurable resin at a place at which curing of the photocurable resin is not desired; and the embodiments will be explained with reference to figures.

<First Embodiment>

Figure 29:
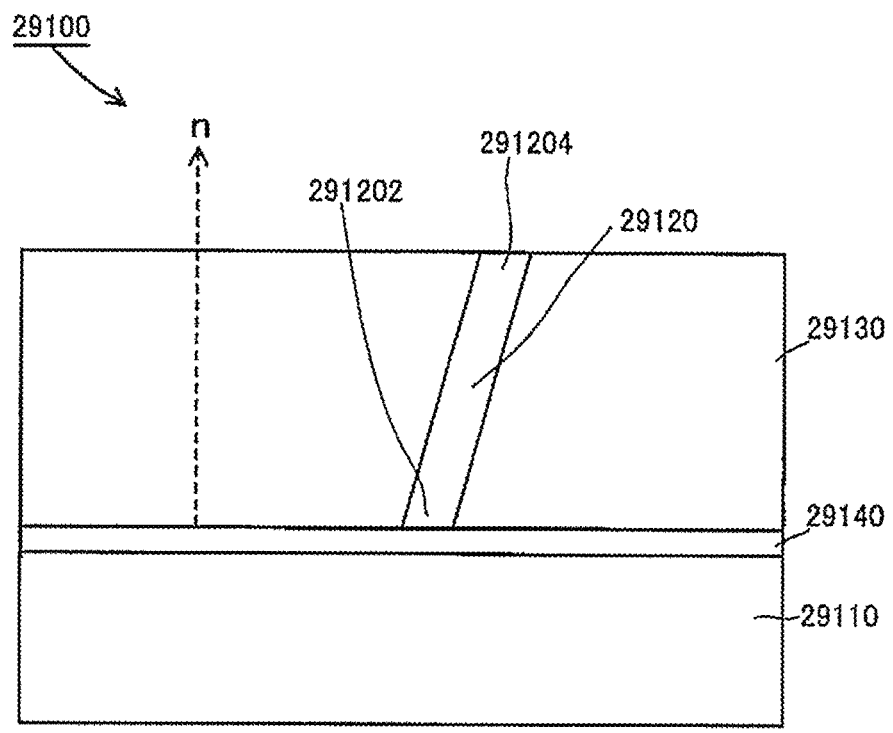
FIG. 29 is a drawing of a construction of a cross section of a photoelectric hybrid device 29100 according to the first embodiment.

FIG. 29 is a cross-sectional view showing a construction of a photoelectric hybrid device 29100 according to a first embodiment. In the figure, an optical waveguide core 29120 comprising a photocurable resin is formed on an upper part of a substrate 29110 in such a manner that it stands slantingly relative to the substrate 29110 (i.e., the optical waveguide core 29120 extends along a direction of an axis that is slanted by several degrees with respect to the normal line n of the substrate 29110). An end 291202 of the optical waveguide core 29120 located on the substrate 29110 side is optically coupled to an optical element (such as an optical circuit, etc.) formed or installed on the substrate 29110, although the optical element is not shown in the figure. An example of the optical element comprises an optical waveguide, a light emitting element, or a light receiving element. A periphery of the optical waveguide core 29120 is covered by a resin that functions as a clad layer 29130. An upper-side end 291204 (located on a side opposite to the substrate 29110 side) of the optical waveguide core 29120 is optically coupled to an optical element (such as an optical fiber, etc.) placed on the clad layer 29130, although the optical element is not shown in the figure.

An antireflection layer 29140, which affects reflection of light at a photosensitive wavelength of the photocurable resin that comprises the optical waveguide core 29120, is formed on the surface of the substrate 29110. The top surface of the antireflection layer 29140 is in contact with the end 291202 of the optical waveguide core 29120 located on the substrate 29110 side. Thus, the end 291202 of the optical waveguide core 29120 located on the substrate 29110 side is optically coupled, via the antireflection layer 29140, to an optical element (such as an optical circuit, a light emitting element, a light receiving element, or the like) formed or installed on the substrate 29110. The antireflection layer 29140 is transparent to the wavelength of the light that is transmitted/received by the optical element formed or installed on the substrate 29110 (the light propagating through an optical waveguide, the light emitted by a light emitting element, the light received by a light receiving element). The photosensitive wavelength of the photocurable resin refers to a wavelength of light that is capable of curing the photocurable resin by irradiation of light. For example, it is possible to utilize a photocurable resin that is sensitive to UV (ultraviolet) light; and, in such a case, the antireflection layer 29140 is configured to have an optical characteristic to sufficiently prevent or reduce reflection of the UV light from the surface of the substrate 29110. For example, it is possible to use a UV absorption layer having an appropriate absorption coefficient and an appropriate film thickness as the antireflection layer 29410. Also, it is possible to use a dielectric multilayer film that comprises layers that are each set to have appropriate film thicknesses and appropriate indexes of refraction.

Next, a method for manufacturing the above explained photoelectric hybrid device 29100 will be explained with reference to FIGS. 30A-30E.

Figure 30A:
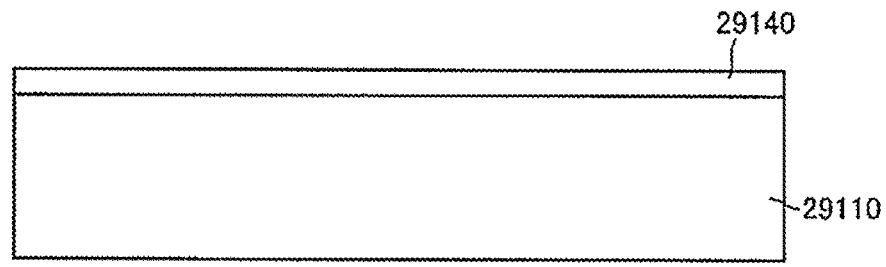
FIG. 30A is a drawing for explaining a manufacturing method of the photoelectric hybrid device 29100 according to the first embodiment.

First, the antireflection layer 29140 is formed on the substrate 29110 (FIG. 30A). In this embodiment, it is supposed that a UV absorption layer is utilized as the antireflection layer 29140. Specifically, a UV absorption layer (the antireflection layer 29140) is formed by supplying a resin, that is made by combining a photocurable resin (resin curable by UV light) used for forming the optical waveguide core 29120 and a material having a characteristic to absorb the UV light, to the whole surface of the substrate 29110, and irradiating the whole surface by the UV light to cure the resin. The absorption coefficient of the UV absorbing material, the ratio of the photocurable resin and the UV absorbing material in the composition, the film thickness of the UV absorption layer, and so on are adjusted to make the absorption ratio of the UV light sufficiently large (i.e., so that reflection of the UV light from the surface of the substrate 29110 may be effectively prevented or reduced). Note that it is possible to further add a different material to the mixed resin comprising the photocurable resin and the UV absorbing material, as necessary. Also, it is possible to form the antireflection later 29140 only on a part of the surface of the substrate 29110 that is in the proximity of the area at which the optical waveguide core 29120 should be formed, instead of forming the antireflection later 29140 on the whole surface of the substrate 29110.

Figure 30B:
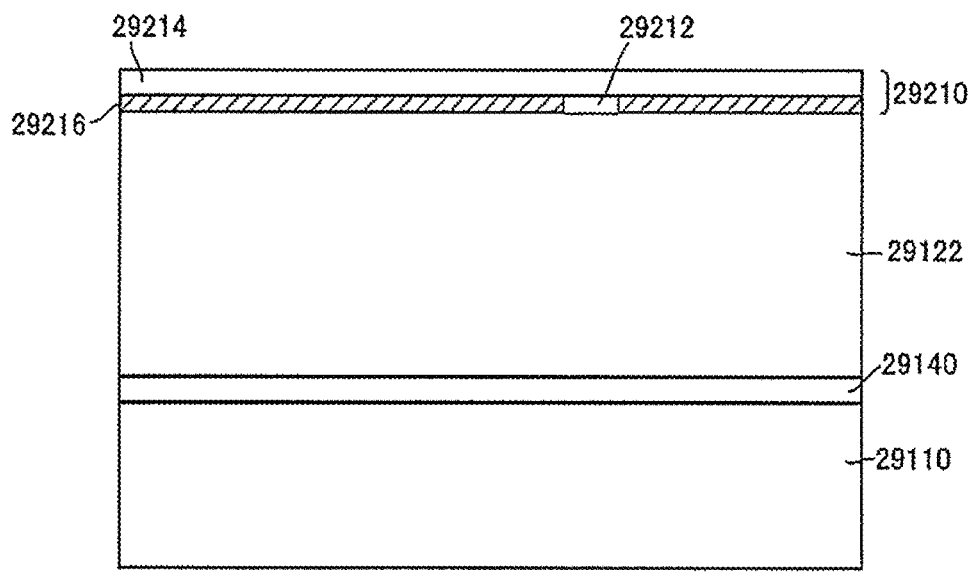
FIG. 30B is a drawing for explaining the manufacturing method of the photoelectric hybrid device 29100 according to the first embodiment.

Next, a photocurable resin 29122 is supplied onto the antireflection layer 29140, and an optical waveguide core forming mask 29210 is placed thereon (FIG. 30B). The mask 29210 comprises a glass plate 29214 and a thin film, such as a chrome film 29216 or the like, that is opaque to the UV light and formed on one of the surfaces of the glass plate 29214; and, in the chrome film 29216, an opening 29212 is provided to have a shape corresponding to a core shape of the optical waveguide core 29120 that is to be fabricated. For example, the opening diameter of the opening 29212 is approximately 30-40 micrometers; and, in such a case, a multimode optical waveguide core 29120 may be fabricated. Also, if plural openings 29212 are provided on the mask 29210, it is possible to form plural optical waveguide cores 29120 at the same time. Note that, for controlling the film thickness of the photocruable resin 29122, a spacer, which is not shown in the drawing, is placed on the substrate 29110 (the antireflection layer 29140), for example.

Figure 30C:
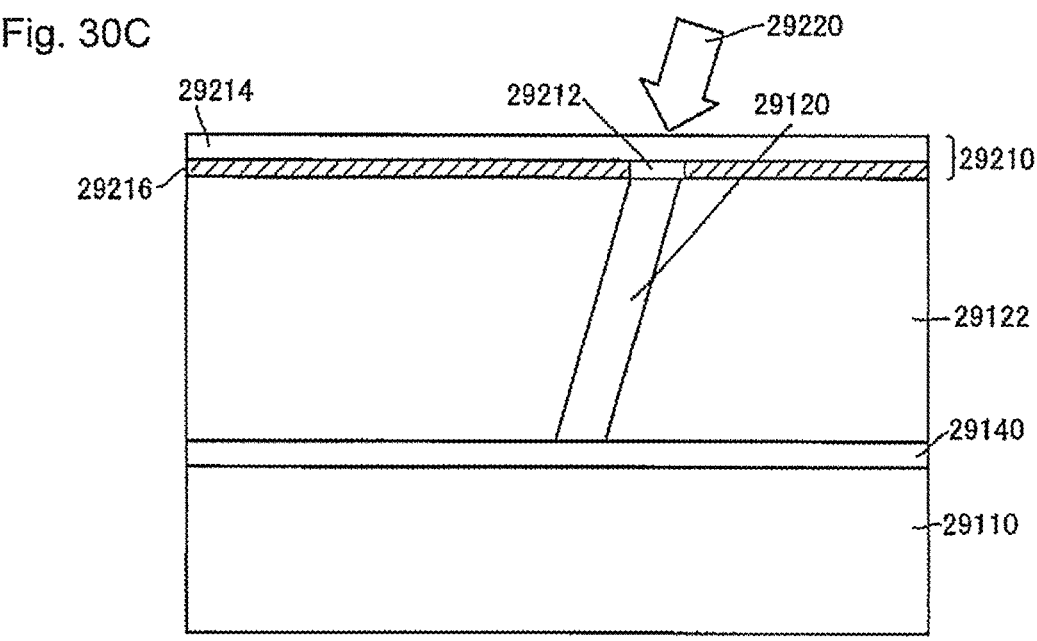
FIG. 30C is a drawing for explaining the manufacturing method of the photoelectric hybrid device 29100 according to the first embodiment.

Next, the photocurable resin 29122 is irradiated by UV light 29220 from a direction that is oblique to the substrate 29110, via the mask 29210 (FIG. 30C). The UV light passing through the opening 29212 of the mask 29210 propagates through the photocurable resin 29122 along the direction that is oblique to the substrate 29110, and causes the curing of portions of the photocurable resin 29122 through which the UV light propagated. By the above process, the optical waveguide core 29120 comprising the cured photocurable resin is formed, which stands slantingly on the substrate 29110.

During the above process, since a UV absorption layer (the antireflection film 29140) has been formed on the substrate 29110, the UV light that has propagated through the photocurable resin 29122 and entered the UV absorption layer is absorbed by the UV absorption layer; and, if the light absorption ratio of the UV absorption layer is sufficiently high, reflection of the UV light from the substrate 29110 is substantially prevented, and, even if reflection occurs, the intensity of the reflected light is lower than the intensity that is required to cure the photocurable resin 29122. Thus, curing of a part of the photocurable resin 29122 at which curing is not desired (i.e., a part other than the part for the optical waveguide core 29120), due to the light reflected from the substrate 29110, is prevented. As explained above, according to the present embodiment, it is possible to form the optical waveguide core 29120, which stands slantingly on the substrate 29110, to have an intended shape (a shape provided by curing only the part of the photocurable resin at which the optical waveguide core is to be fabricated).

Figure 30D:
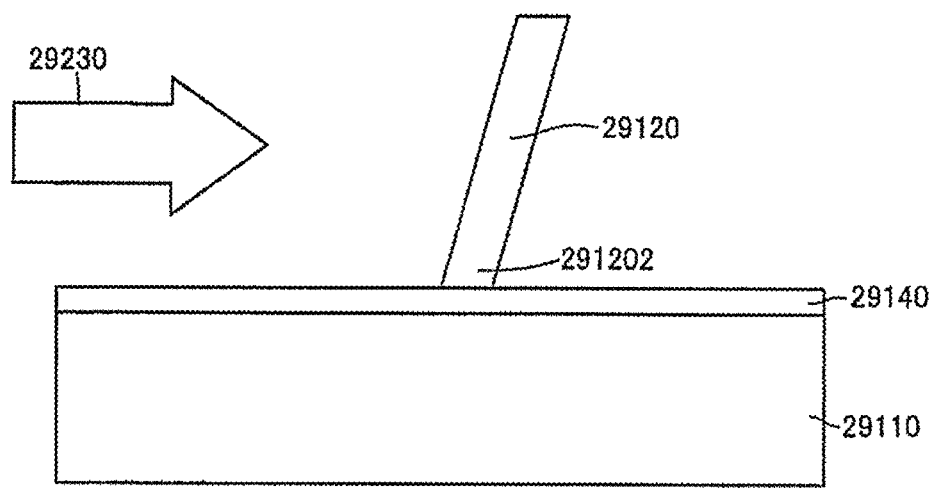
FIG. 30D is a drawing for explaining the manufacturing method of the photoelectric hybrid device 29100 according to the first embodiment.

Next, the mask 29210 is removed, and the uncured portion of the photocurable resin 29122 is removed by washing it with a given developing solution (a solvent) 29230 (FIG. 30D). In the prior art, during this developing process, a problem such that the cured optical waveguide core is also washed out by the developing solution might be occurred, since it was not possible to obtain sufficient adhesion strength between the substrate and the optical waveguide core because of the small diameter of the optical waveguide core and the small contacting area between the substrate and the optical waveguide core. However, in the present embodiment, the UV absorption layer (the antireflection film 29140), which is in contact with the end 291202 of the optical waveguide core 29120 on the substrate 29110 side, comprises as a component thereof the photocurable resin that is also a component of the optical waveguide core 29120. That is, both the optical waveguide core 29120 and the UV absorption layer comprise the same component (the photocurable resin), and are in contact with each other. Thus, the adhesion strength between the end 291202 of the optical waveguide core 29120 on the substrate 29110 side and the UV absorption layer (the antireflection film 29140) is greater than the adhesion strength between an optical waveguide core and a substrate (a silicon substrate or the like) of a prior art; and, accordingly, the problem such that the cured optical waveguide core 29120 is washed out by the developing solution will hardly occur. Also, for the same reason, when removing the mask 29210 before the developing process, a problem such that the cured optical waveguide core 29120 is peeled off of the antireflection film 29140 is prevented.

Next, the space around the optical waveguide core 29120 is filled by a photocurable resin or a thermosetting resin, and the resin is cured by irradiation of light or application of heat to form the clad layer 29130 (FIG. 29). By completing the above steps, the photoelectric hybrid device is completed.

<Second Embodiment>

Figure 31:
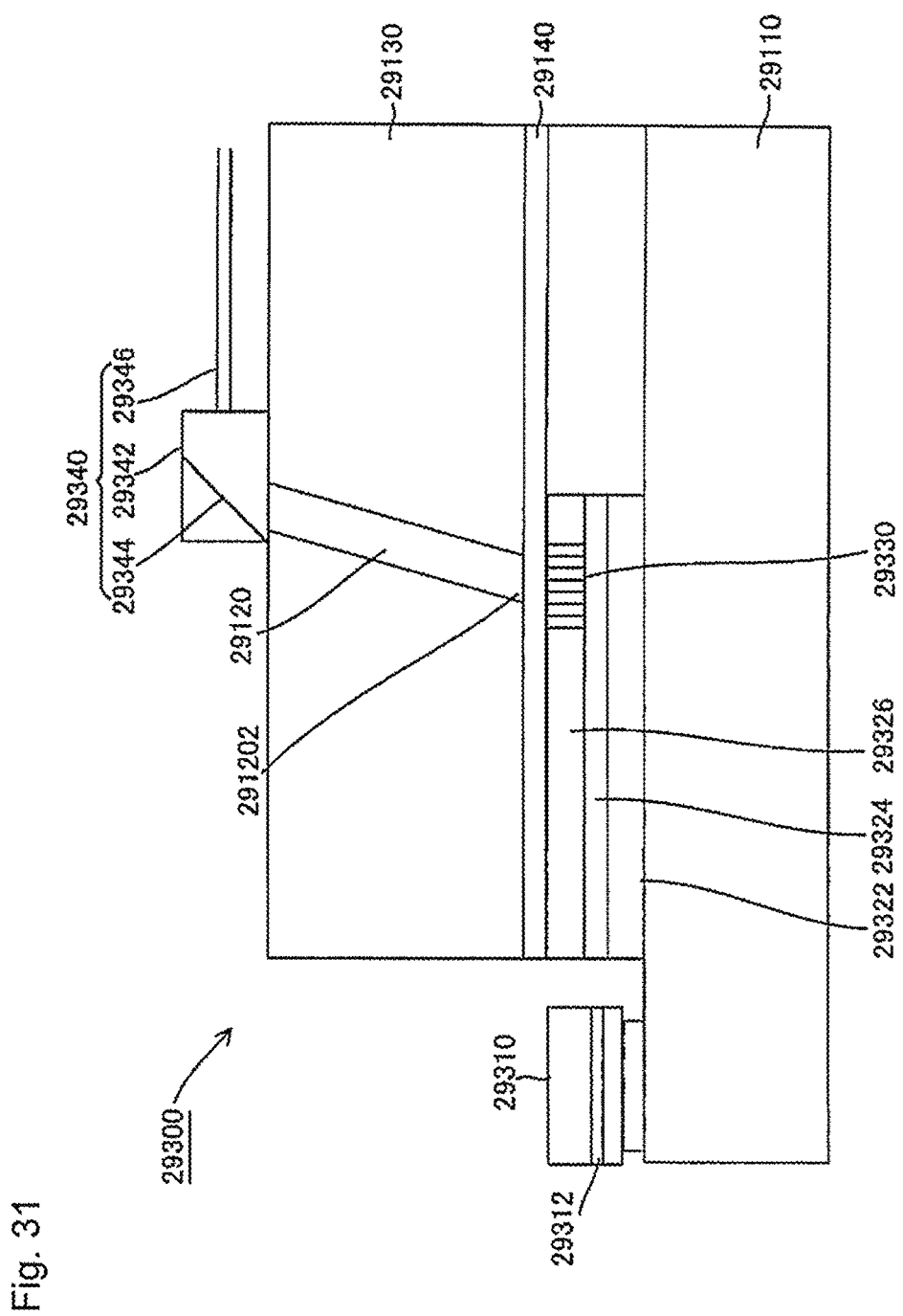
FIG. 31 is a drawing of a construction of a cross section of a photoelectric hybrid device 29300 according to the second embodiment.
Figure 32:
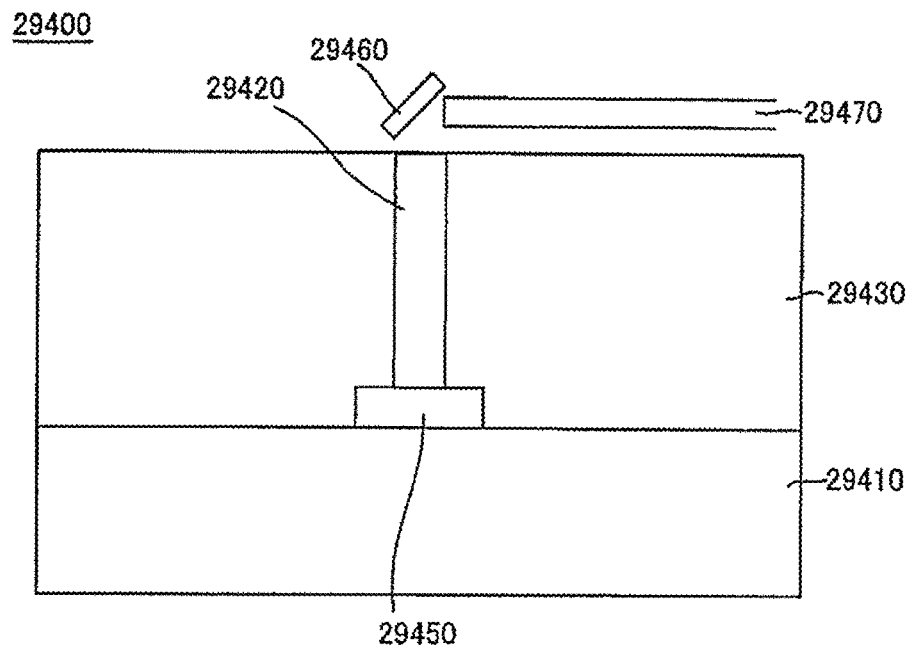
FIG. 32 is a drawing of a construction of a cross section of a prior-art photoelectric hybrid device 29400.
Figure 33A:
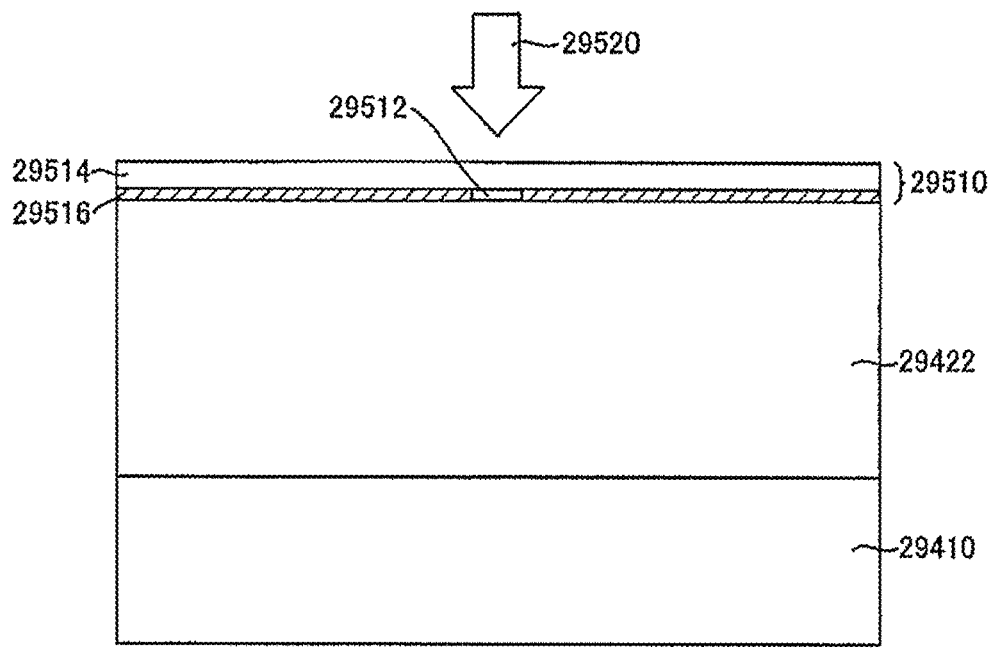
FIG. 33A is a drawing for explaining a manufacturing method of the prior-art photoelectric hybrid device 29400.
Figure 33B:
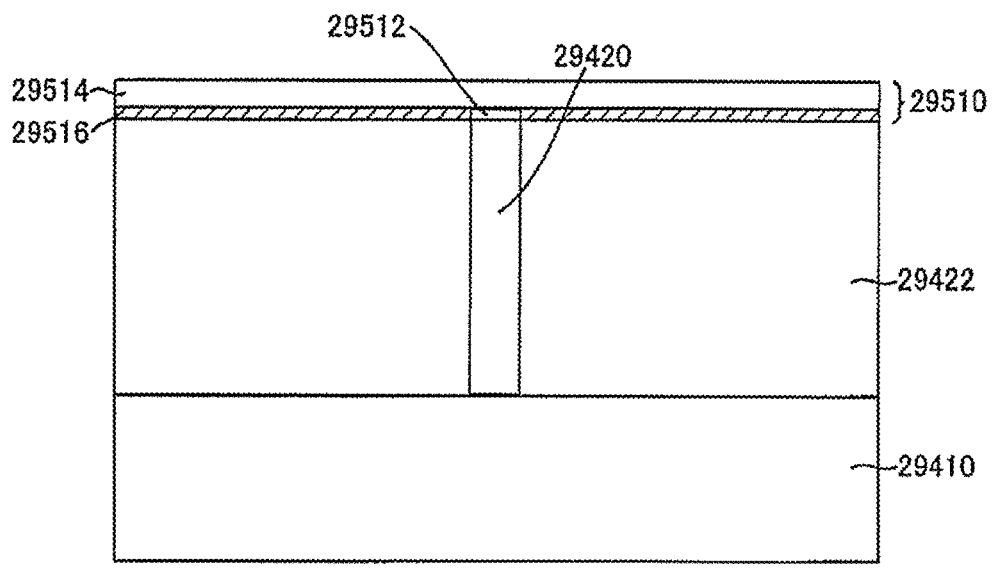
FIG. 33B is a drawing for explaining the manufacturing method of the prior-art photoelectric hybrid device 29400.
Figure 34:
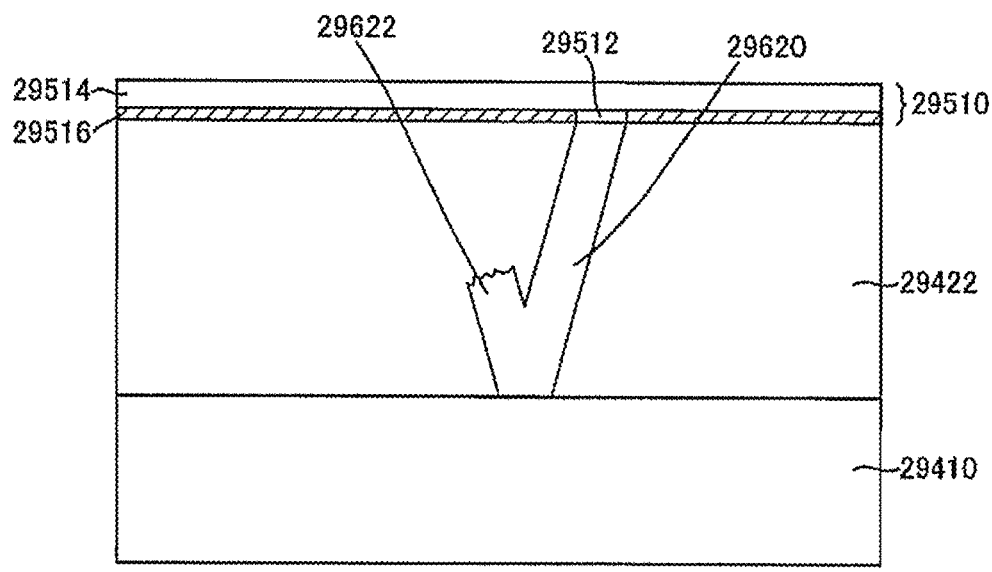
FIG. 34 is a drawing of a construction of a cross section of a prior-art photoelectric hybrid device.

FIG. 31 is a cross-sectional view showing a construction of a photoelectric hybrid device 29300 according to a second embodiment. In the photoelectric hybrid device 29300, the optical element that is not shown in the first embodiment is tangibly shown; and reference numbers, that are the same as those given to the elements of the photoelectric hybrid device 29100 according to the first embodiment, are given to the elements of the photoelectric hybrid device 29300 that are the same as those of the photoelectric hybrid device 29100.

In the figure, a light emitting element 29310 is installed on the substrate 29110. For example, the light emitting element 29310 is a semiconductor laser, and the antireflection film 29140 is transparent at the emission wavelength of the semiconductor laser. Also, on the substrate 29110, an optical waveguide 29320 comprising a lower clad layer 29322, a core layer 29324, and an upper clad layer 29326 is formed. On the optical waveguide 29320, the antireflection layer 29140 is formed. On the antireflection layer 29140, an optical waveguide core 29120 is formed, which stands slantingly with respect to the substrate 29110 and in contact with the antireflection layer 29140. The position of the semiconductor laser is aligned in such a manner that an optical axis of its active layer 29312 coincides with an optical axis of the core layer 29324 of the optical waveguide 29320; and the laser light emitted from the active layer 29312 is coupled, with optimum optical coupling efficiency, to the core layer 29324 of the optical waveguide 29320.

On the substrate 29110, a grating coupler 29330 is further formed in the vicinity of the end 291202 of the optical waveguide core 29120 on the substrate 29110 side, which may allow the laser light transmitted via the core layer 29324 of the optical waveguide 29320 to be flipped up slantingly and upwardly with respect to the substrate 29110 (in other words, which may bend the optical path of the laser light). The laser light refracted by the grating coupler 29330 is coupled to the optical waveguide core 29120 that stands slantingly with respect to the substrate 29110.

In this manner, since the laser light from the semiconductor laser (the light emitting element 29310) is flipped up upwardly and slantingly with respect to the substrate 29110, a phenomenon of operational instability of the semiconductor laser, which may result from the back-reflection light from an optical interface, that may exist in an optical path in a subsequent stage, being transmitted toward the semiconductor laser and injected thereinto, can be suppressed. The optical waveguide core 29120 is especially effective in a construction of a photoelectric hybrid device such as that explained above, because it is formed to stand slantingly with respect to the substrate 29110.

On the clad layer 29130, an optical fiber connector 29340 is placed that comprises a connector 29342 and a reflection mirror 29344 embedded within the connector 29342. The laser light transmitted through the optical waveguide core 29120 is reflected by the reflection mirror 29344 and coupled to an optical fiber 29346.

By using the above embodiment, it becomes possible to prevent curing of the photocurable resin, due to reflection from a substrate, at a place at which curing of the photocurable resin is not desired.

[Another Example of a Method for Manufacturing a Photoelectric Hybrid Device]

Instead of using the example in which a vertical optical waveguide is formed by use of a self-forming optical waveguide technique after placing a transparent member to form a photoelectric hybrid device, it is possible to form a photoelectric hybrid device by preparing a vertical optical waveguide unit that is made by forming a vertical optical waveguide on a glass wafer to form a unit, and incorporating the vertical optical waveguide unit into the photoelectric hybrid device. In the following, an example of a method for constructing a photoelectric hybrid device by use of such a vertical optical waveguide unit will be explained.

Figure 35:
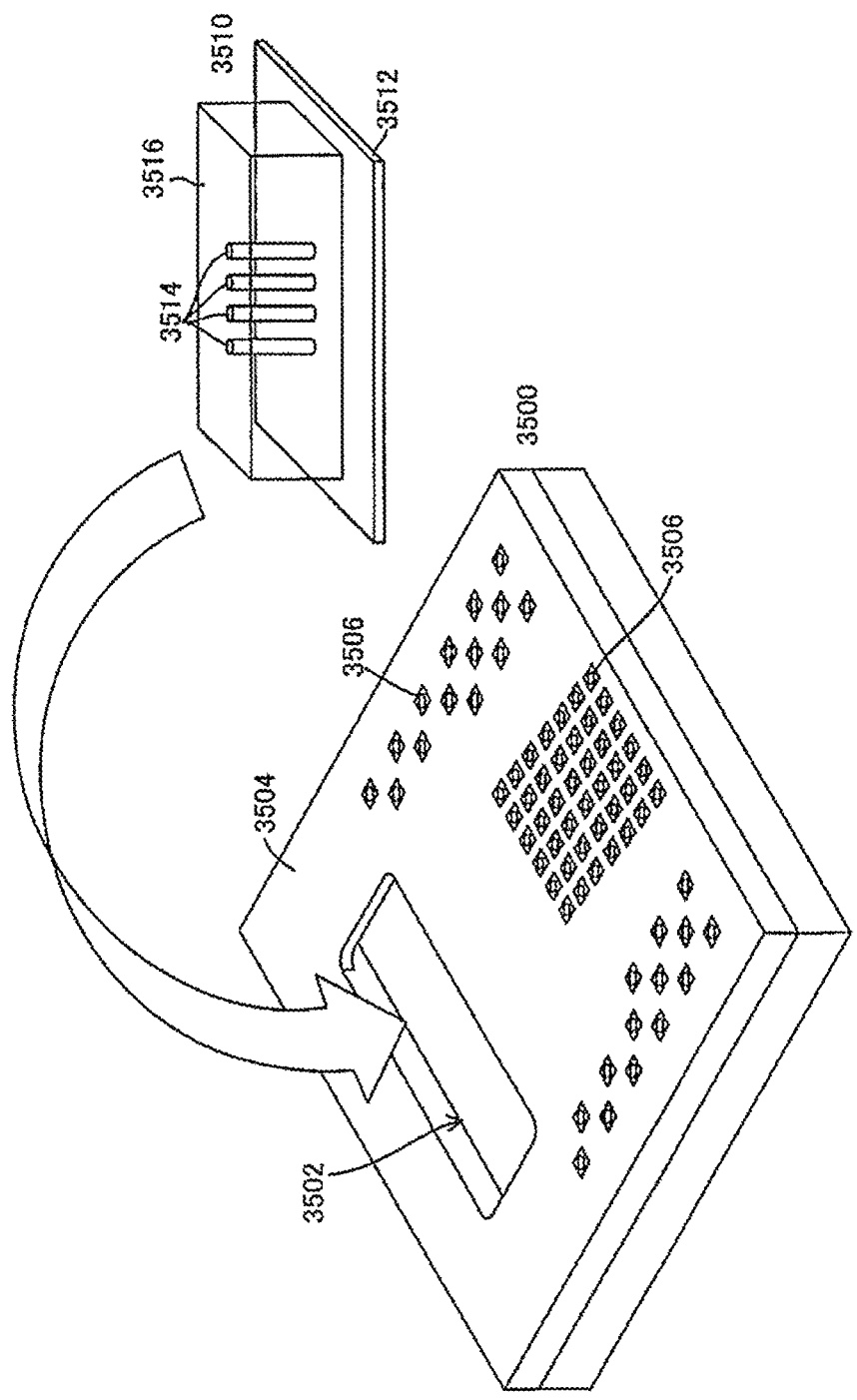
FIG. 35 is an illustration of an outline of an example for completing a photoelectric hybrid device 3500 by incorporating a vertical optical waveguide unit into the photoelectric hybrid device 3500.

FIG. 35 is a schematic diagram showing an outline of an example to complete a photoelectric hybrid device 3500: wherein a vertical optical waveguide unit 3510 comprises a vertical optical waveguide that is formed on a glass wafer 3512 and comprises plural optical waveguides 3514 and a clad member 3516; the vertical optical waveguide unit 3510 is placed on an opening part 3502 of the photoelectric hybrid device 3500 in such a manner that the glass wafer 3512 faces upward, to align the vertical optical waveguide unit 3510 with the photoelectric hybrid device 3500; and, after completion of alignment, the glass wafer 3512 is fixed to an upper surface 3504 of the photoelectric hybrid device 3500. In the example of the above completed photoelectric hybrid device 3500, the upper surface of the glass wafer 3512 constitutes an optically flat surface. By the above construction of the photoelectric hybrid device 3500, it becomes possible to place an optical connector on the optically flat surface precisely and easily; and, since the position of the optically flat surface does not become lower than the position of the upper surface 3504 of the photoelectric hybrid device 3500, collision between an optical connector and a top part of each of electrical connection parts (electrically conductive pins) 3506, that are used for inputting/outputting electric signals of the photoelectric hybrid device 3500, can be avoided when the optical connector is placed on the optically flat surface. Note that, regarding alignment of the vertical optical waveguide unit 3510, it is possible to carry out alignment of the position of optical waveguide 3514 and the position of the receiver (in the case of a reception mode) or the grating coupler (in the case of a transmission mode) by use of a well known image recognition method; and a desired alignment precision can be obtained by use of such a method.

Figure 36:
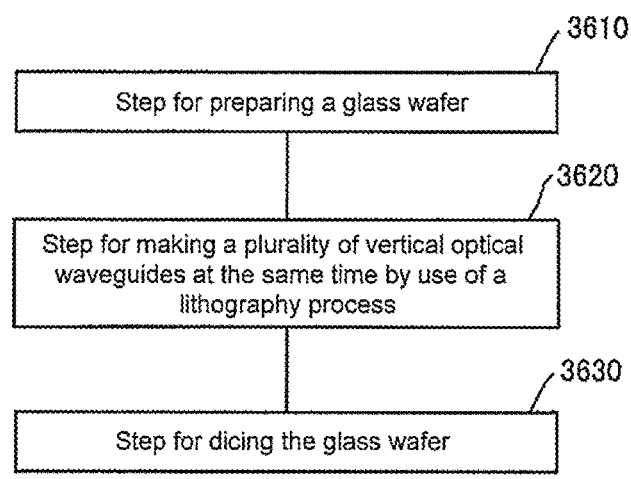
FIG. 36 is a flow chart for explaining an example of a method for making the vertical optical waveguide unit.

FIG. 36 is a flowchart showing an example of a method for constructing the vertical optical waveguide unit 3510. In the following, each of steps 3610-3630 will be explained.

(1) Step 3610 for Preparing a Glass Wafer This is a step for preparing a glass wafer that has a size sufficient to form a plurality of vertical optical waveguides at the same time on the glass wafer. For example, the glass wafer is made by dicing a glass block by a blade; and the surface of the glass wafer has high flatness, and functions as an optically flat surface.

(2) Step 3620 for making a Plurality of Vertical Optical Waveguides at the same time by use of Lithography This is a step for preparing a photomask, and making a plurality of vertical optical waveguides at the same time on the glass wafer. A plurality of optical waveguides that constitutes the vertical optical waveguide is formed by exposing, via the optical waveguide forming photomask, an optical-waveguide-forming photocurable resin that has been filled in a space between the glass wafer and the optical waveguide forming photomask. Thereafter, an uncured part of the resin is removed by use of a solvent, and the optical waveguide forming photomask is removed. Note that a parting agent is applied on the surface of the optical waveguide forming photomask that contacts with the optical-waveguide-forming photocurable resin, so that removal of the optical waveguide forming photomask can be easily carried out. Thereafter, a clad material is filled and cured to form a clad member and, as a result, the vertical optical waveguide is completed. Note that it is also possible to form a clad member by using a clad-forming photocurable resin as a clad material, and exposing the whole surface of the clad-forming photocurable resin or exposing the clad-forming photocurable resin via a clad member forming mask. By this process, a plurality of vertical optical waveguides will be formed at the same time on the glass wafer.

Note that, as explained above, self-forming optical waveguides having a variety of shapes, that will become plural optical waveguides constituting a vertical optical waveguide, can be formed by changing the shape and so on of the photomask.

(3) Step 3630 for Dicing the Glass Wafer

This is a step for dividing a glass wafer on which plural vertical optical waveguides are formed into plural glass wafers on which vertical optical waveguides are formed respectively, by carrying out a dicing process to form separate vertical optical waveguide units.

By using the vertical optical waveguide unit obtained by carrying out the above steps, the photoelectric hybrid device can be constructed (completed) as explained above.

[Matters that Require Attention]

Embodiments of the present invention have been explained with reference to the drawings. It should be reminded that it is possible for a person skilled in the art to use other embodiments similar to those described above, and carry out modification of embodiments and addition of constructions to the embodiments without departing from the present invention.

The present invention should not be limited by the above embodiments; and the present invention should be construed based on the descriptions of the claims.

REFERENCE SIGNS LIST

100, 220, 820, 920, 1020, 1120, 1140, 1160, 1180, 3500, 29100, 29300: Photoelectric hybrid device

102, 310, 410: Silicon substrate

104, 324, 418, 828, 1030, 1170: IC

106: Sealing structure

108, 320, 420, 822, 1022, 1162, 3506: Electrically conductive pin

110, 824, 1024, 1164: Solder bump

112, 326, 826, 1026, 1166: Laser element (LD)

116, 222, 832, 1038, 1178: Transparent member (glass mask)

118: Transparent part
120, 226: Marker hole for alignment
122, 318, 412, 700, 830, 1036, 1176, 3514: Optical waveguide
202, 810: Fitting hole
842: Fitting pin
240: Alignment jig
242: Leg of an alignment jig
244: Hemispherical projection of an alignment jig
312, 1028, 1168: Optical waveguide
314, 500, 1032, 1172: Optical modulator
316, 1034, 1174: Grating coupler
414, 600: Optical receiver (PD)
200, 800: Interposer
840: Optical connector
900: AOC circuit board
1000, 1100: Photoelectric interposer/printed circuit board
1190: Host LSI
1610: Substrate
1612: IC (electronic component)
1614: Optical circuit
1616: Antireflection film
1618: Connection electrode
1620: Glass substrate (spacer)
1622: Opening of a glass substrate
1624: Through wiring
1626: Resin for a core
1628: Thin plate glass (transparent plate material)
1630: Mask for forming a core
1632: Transparent part for forming a vertical optical waveguide core
1634: Transparent part for forming a thin glass plate supporting part
1636: Transparent part for a thin glass plate adhering part
1638: Transparent part for forming an alignment hole
1640: Vertical optical waveguide core
1642: Thin glass plate supporting part
1644: Resin for a clad
1646: Mask for forming a clad
1648: Shading part for forming an opening of an IC
1650: Vertical optical waveguide clad
1652: Opening on a top surface of an IC
29110: Substrate
29120: Optical waveguide core
29122: Photocurable resin
29130: Clad layer
29140: Antireflection layer
29210: Mask
29212: opening
29214: Glass plate
29216: Chrome film
29220: UV light
29230: Developing solution
29310: Light emitting element
29320: Optical waveguide
29330: Grating coupler
29340: Optical fiber connector having a reflection mirror
3502: Opening
3510: Vertical optical waveguide unit
3512: Glass wafer
3516: Clad member

The invention claimed is:
1. A photoelectric hybrid device comprising:
  a photoelectric hybrid substrate provided with optical waveguides for communicating optical signals, electric signal paths for communicating electric signals, and an electronic circuit, and further provided with an optical modulator and a light source, and/or an optical receiver;
  a sealing structure placed on the photoelectric hybrid substrate for covering the photoelectric hybrid substrate except for a specific part thereof, wherein the specific part is used for inputting/outputting optical signals to/from the photoelectric hybrid substrate;
  a translucent member placed to cover the specific part and having a flat optical surface and a translucent part; and
  a vertical optical waveguide forming optical paths between the translucent part of the translucent member and the optical waveguides,
  wherein the photoelectric hybrid device is constructed to input electric signals to or output electric signals from the photoelectric hybrid substrate, and input optical signals to or output optical signals from the photoelectric hybrid substrate vial the vertical optical waveguide, and
  wherein the photoelectric hybrid device is used as a signal conversion element when the photoelectric hybrid device is incorporated into a module for data communication.
2. The photoelectric hybrid device according to claim 1 wherein the translucent member is placed in such a manner that the translucent member does not entirely cover an upper surface of the electronic circuit.
3. The photoelectric hybrid device according to claim 1 comprising a resin layer that forms a clad of the vertical optical waveguide covers at least part of the photoelectric hybrid substrate such that an opening is formed above the electronic circuit.
4. The photoelectric hybrid device according to claim 1 wherein a supporting member that supports the translucent member is placed on the photoelectric hybrid substrate.
5. The photoelectric hybrid device according to claim 4 wherein the supporting member comprises a material that is the same as a material forming a core of the vertical optical waveguide.
6. The photoelectric hybrid device according to claim 1 wherein a spacer is placed on the photoelectric hybrid substrate, and the translucent member is placed above the spacer in such a manner that the translucent member overhangs from the spacer.
7. The photoelectric hybrid device according to claim 1 wherein the translucent member comprises marker holes for alignment that are used when the photoelectric hybrid device is placed on the module for data communication, and
  wherein alignment of the photoelectric hybrid device and the module for data communication is carried out by mechanically aligning the marker holes and holes formed on the module for data communication by use of jigs.
8. The photoelectric hybrid device according to claim 1 wherein an edge part of the translucent member is constructed to be used for alignment when the photoelectric hybrid device is placed on the module for data communication.
9. The photoelectric hybrid device according to claim 1 wherein the sealing structure comprises one or more electrically conductive members that pierce through the sealing structure and couple to the electric signal paths, and one or more electric connection parts placed respectively on the top parts of the one or more electrically conductive members, and wherein inputting or outputting of electric signals is carried out via the one or more electrically conductive members, and wherein the photoelectric hybrid device is constructed in such a manner that the position, in terms of height, of the flat optical surface is not set to be lower than the position of the top part of each electric connection part.

10. The photoelectric hybrid device according to claim 9 wherein the module for data communication comprises an
    interposer or an AOC (active optical cable) printed board,
    wherein an optical connector comprises optical waveguides for communicating optical signals with the vertical optical waveguide, and the position of the flat optical surface is set for avoiding collision between the optical connector, and
    wherein a bridge substrate that integrally connects to the one or more electric connection parts and inputs/outputs electric signals from/to an external part, when the optical connector is placed on the flat optical surface.

11. The photoelectric hybrid device according to claim 9 wherein the position, in terms of height, of the flat optical surface is set to be coincide with the position of the top part of each electric connection part on the top of the electrically conductive member; and, as a result thereof, when the photoelectric hybrid device is incorporated into a module for data communication, that carries out inputting/outputting of optical signals and electric signals on an upper surface of a substrate, in such a manner that an input/output surface of the photoelectric hybrid device faces an input/output surface of the photoelectric interposer/printed board, inputting/outputting of optical signals and electric signals are carried out on the same plane.

12. The photoelectric hybrid device according to claim 11 wherein the module for data communication is a photoelectric interposer/printed board that comprises an optical circuit and an electric circuit formed in the same substrate.

13. The photoelectric hybrid device according to claim 1 wherein the vertical optical waveguide comprises plural optical waveguides.

14. The photoelectric hybrid device according to claim 13 wherein each of the plural optical waveguides has a cylindrical shape.

15. The photoelectric hybrid device according to claim 13 wherein each of the plural optical waveguides has a tapered shape that has a diameter that gradually reduces along the direction toward each of the plural optical waveguides, or a reverse tapered shape that has a diameter that gradually reduces along the direction toward the flat optical surface.

16. The photoelectric hybrid device according to claim 13 wherein each of the plural optical waveguides has a shape that has a slanted axis.

17. The photoelectric hybrid device according to claim 13 wherein each of the plural optical waveguides has a slanted cylindrical shape, or a tapered shape or a reverse tapered shape having a slanted axis.

18. The photoelectric hybrid device according claim 16
    wherein the plural optical waveguides comprise a photocurable resin and an antireflection layer for light having a photosensitive wavelength of the photocurable resin, and
    wherein the antireflection layer is formed on an optical-waveguide-side of an optical waveguide core to contact with the end of the optical-waveguide-side of the optical waveguide core.

19. The photoelectric hybrid device according to claim 18 wherein the antireflection layer is a light absorbing layer including, as a component, a light absorbing material that absorbs light having the photosensitive wavelength of the photocurable resin.

20. The photoelectric hybrid device according to claim 19 wherein the light absorbing layer further including, as a component, the photocurable resin.

21. The photoelectric hybrid device according to claim 18 wherein the antireflection layer is transparent to an emission wavelength of the light source or a wavelength to be sensed by the optical receiver.

22. A manufacturing method of a photoelectric hybrid device, the method comprising:
    preparing a photoelectric hybrid substrate provided with optical waveguides for communicating optical signals, electric signal paths for communicating electric signals, an electronic circuit, an optical modulator, an optical receiver, and/or a light source;
    preparing a translucent member having a translucent part and a flat optical surface;
    aligning the translucent member with the photoelectric hybrid substrate, and installing the translucent member to the photoelectric hybrid substrate;
    supplying a photocurable resin, that is cured by applying light thereto, to a space between the photoelectric hybrid substrate and the translucent member;
    exposing the photocurable resin to the light for forming a vertical optical waveguide in a place between the translucent part and the optical waveguides; and
    removing part of the photocurable resin that is not cured,
    wherein the photoelectric hybrid device is constructed to input and output electric signals, and input and output optical signals via the vertical optical waveguide, and
    wherein the photoelectric hybrid device is used as a signal conversion element when the photoelectric hybrid device is incorporated into a module for data communication.

23. The manufacturing method according to claim 22 wherein the translucent member is used as a mask for exposure for forming the vertical optical waveguide, and translucent member is not removed after exposure.

24. The manufacturing method according to claim 22 wherein the step for preparing a translucent member comprises a step for forming marker holes for alignment for aligning the photoelectric hybrid device with the module for data communication.

25. A manufacturing method of a photoelectric hybrid device, the method comprising:
    preparing a photoelectric hybrid substrate provided with optical waveguides for communicating optical signals, electric signal paths for communicating electric signals, an electronic circuit, an optical modulator, an optical receiver, and/or a light source;
    preparing a translucent member having a translucent part and a flat optical surface;
    aligning the translucent member with the photoelectric hybrid substrate, and installing the translucent member to the photoelectric hybrid substrate;
    supplying a photocurable resin, that is cured by applying light thereto, into a space between the photoelectric hybrid substrate and the translucent member, and onto the photoelectric hybrid substrate;
    exposing the photocurable resin to the light for forming a vertical optical waveguide in a place between the translucent part and the optical waveguides, and also exposing the photocurable resin located on a peripheral part of the electronic circuit; and removing part of the photocurable resin that is not cured,
wherein the photoelectric hybrid device is constructed to input and output electric signals, and input and output optical signals via the vertical optical waveguide, and
wherein the photoelectric hybrid device is used as a signal conversion element when the photoelectric hybrid device is incorporated into a module for data communication.

26. A manufacturing method of a photoelectric hybrid device, the method comprising:
preparing a photoelectric hybrid substrate provided with optical waveguides for communicating optical signals, electric signal paths for communicating electric signals, an electronic circuit, an optical modulator, an optical receiver, and/or a light source;
preparing a translucent member having a translucent part and a flat optical surface;
aligning the translucent member with the photoelectric hybrid substrate, and installing the translucent member to the photoelectric hybrid substrate;
supplying a photocurable resin for a core, for forming a core part of a vertical optical waveguide;
exposing the photocurable resin for the core to the light for forming a core part of the vertical optical waveguide in a place between the translucent part and the optical waveguides;
removing part of the photocurable resin for the core that is not cured;
supplying a photocurable resin for a clad into a space between the photoelectric hybrid substrate and the translucent member and onto the photoelectric hybrid substrate, for forming a clad part of the vertical optical waveguide;
exposing the photocurable resin for the clad, that is located in the clad part and on a peripheral part of the electronic circuit, to the light; and
removing part of the photocurable resin for the clad that is not cured,
wherein the photoelectric hybrid device is constructed to input and output electric signals, and input and output optical signals via the vertical optical waveguide, and
wherein the photoelectric hybrid device is used as a signal conversion element when the photoelectric hybrid device is incorporated into a module for data communication.

27. A manufacturing method of a photoelectric hybrid device, the method comprising:
preparing a photoelectric hybrid substrate provided with optical waveguides for communicating optical signals, electric signal paths for communicating electric signals, an electronic circuit, an optical modulator, an optical receiver, and/or a light source;
preparing a translucent member having a translucent part and a flat optical surface;
aligning the translucent member with the photoelectric hybrid substrate, and installing the translucent member to the photoelectric hybrid substrate;
supplying a photocurable resin for a core into a space between the photoelectric hybrid substrate and the translucent member and onto the photoelectric hybrid substrate, for forming a core part of a vertical optical waveguide;
exposing the photocurable resin for the core, that is located in the core part and on part of a peripheral part of the electronic circuit, to the light;
removing part of the photocurable resin for the core that is not cured;
supplying a photocurable resin for a clad into a space between the photoelectric hybrid substrate and the translucent member and onto the photoelectric hybrid substrate, for forming a clad part of the vertical optical waveguide;
exposing the photocurable resin for the clad, that is located in the clad part and the remainder of the peripheral part of the electronic circuit, to the light; and
removing part of the photocurable resin for the clad that is not cured,
wherein the photoelectric hybrid device is constructed to input and output electric signals, and input and output optical signals via the vertical optical waveguide, and
wherein the photoelectric hybrid device is used as a signal conversion element when the photoelectric hybrid device is incorporated into a module for data communication.

28. The manufacturing method according to claim 24 wherein, by exposing the photocurable resin to light, the vertical optical waveguide and an opening on the electronic circuit, that is not covered by the photocurable resin, are formed at the same time.

29. The manufacturing method according to claim 28 wherein a mask is used when carrying out exposure, wherein the mask is constructed in such a manner that a part corresponding to the vertical optical waveguide transmits light, and a part corresponding to the opening on the electronic circuit blocks light.

30. The manufacturing method according to claim 28 wherein, after the photocurable resin located on the peripheral part of the opening is cured, the cured photocurable resin covers side surfaces of the electronic circuit and seals a bottom surface of the electronic circuit.

31. The manufacturing method according to claim 22 wherein the method further comprises a step of placing a spacer on the photoelectric hybrid substrate, and
wherein the translucent member is placed above the spacer in such a manner that the translucent member overhangs from the spacer.

32. The manufacturing method according to claim 31 wherein, by exposing the photocurable resin in such a manner that an end of the overhung part of the translucent member is irradiated by light, a supporting member for supporting the end of the translucent member and the vertical optical waveguide are formed at the same time.

33. The manufacturing method according to claim 31 wherein, by illuminating a part of the translucent member that is in contact with the spacer to cure the photocurable resin supplied into the part between the translucent member and the spacer, the translucent member and the spacer are fixed together by the photocurable resin at the same time as forming of the vertical optical waveguide.

34. The manufacturing method according to claim 22 wherein the translucent member is placed on the photoelectric hybrid substrate in such a manner that the translucent member is in contact with the photocurable resin and that the height of the translucent member is maintained at a predetermined height; and, by exposing the photocurable resin in such a manner that the translucent member except for a part corresponding to a part of the vertical optical waveguide is irradiated by light, a supporting member for supporting the translucent member on the photoelectric hybrid substrate is formed at the same time as forming of the vertical optical waveguide.

35. A manufacturing method of a photoelectric hybrid device, the method comprising:

preparing a photoelectric hybrid substrate provided with optical waveguides for communicating optical signals, electric signal paths for communicating electric signals, an electronic circuit, an optical modulator, an optical receiver, and/or a light source;

aligning a photomask with the photoelectric hybrid substrate, and placing the photomask in relation to the photoelectric hybrid substrate;

supplying a photocurable resin to a space between the photoelectric hybrid substrate and the photomask, wherein the photocurable resin is cured when irradiated with light;

exposing the photocurable resin via the photomask to form a vertical optical waveguide that becomes an input/output path of an optical signal;

removing part of the photocurable resin that is not cured; and removing the photomask, wherein the photoelectric hybrid device is constructed to input and output electric signals, and input and output optical signals via the vertical optical waveguide, and wherein the photoelectric hybrid device is used as a signal conversion element when the photoelectric hybrid device is incorporated into a module for data communication.

36. A manufacturing method of a photoelectric hybrid device, the method comprising:

on a photoelectric hybrid substrate provided with optical waveguides for communicating optical signals, electric signal paths for communicating electric signals, and an electronic circuit, and further provided with an optical modulator and a light source, and/or an optical receiver, placing a sealing structure for covering the photoelectric hybrid substrate except for a specific part used for inputting/outputting optical signals to/from the photoelectric hybrid substrate;

preparing a glass wafer;

preparing a photomask, supplying a photocurable resin into a space between the glass wafer and the photomask, forming plural optical waveguides at the same time on the glass wafer by exposing the photocurable resin through the photomask by light, and filling and curing a clad member, thereby forming plural vertical optical waveguides on the glass wafer;

dicing the glass wafer, on which the plural vertical optical waveguides are formed, to form respective vertical optical waveguide units; and integrating the vertical optical waveguide unit into the specific part used for inputting/outputting optical signals to/from the photoelectric hybrid substrate, in such a manner that a back surface of a surface on which the vertical optical waveguide is formed is defined to be a flat optical surface and placed to be an upper surface, wherein the photoelectric hybrid device is constructed to input and output electric signals, and input and output optical signals via the vertical optical waveguide, and wherein the photoelectric hybrid device is used as a signal conversion element when the photoelectric hybrid device is incorporated into a module for data communication.

37. The manufacturing method according to claim 22 wherein:

the photoelectric hybrid device comprises one or more electrically conductive members coupled to the electric signal paths, and one or more electric connection parts placed respectively on the top parts of the one or more electrically conductive members; and the photoelectric hybrid device is constructed in such a manner that the position, in terms of height, of the flat optical surface is not set to be lower than the position of the top part of each electric connection part; and, as a result thereof, when an optical connector comprising optical waveguides for communicating optical signals with the vertical optical waveguide is placed onto the flat optical surface, collision between the optical connector and a bridge substrate, that integrally connects to the one or more electric connection parts and inputs/outputs electric signals from/to an external part, is avoided.

38. The manufacturing method according to claim 22 wherein the vertical optical waveguide comprises plural optical waveguides.

39. The manufacturing method according to claim 38 wherein each of the plural optical waveguides has a cylindrical shape.

40. The manufacturing method according to claim 38 wherein each of the plural optical waveguides has a tapered shape that has a diameter that gradually reduces along the direction toward the optical waveguide, or a reverse tapered shape that has a diameter that gradually reduces along the direction toward the flat optical surface.

41. The manufacturing method according to claim 38 wherein each of the plural optical waveguides has a shape that has a slanted axis.

42. The manufacturing method according to claim 41 wherein each of the plural optical waveguides has a slanted cylindrical shape, or a tapered shape or a reverse tapered shape having a slanted axis.

* * * * *